(12) United States Patent
Kayukawa et al.

(10) Patent No.: US 9,009,948 B2
(45) Date of Patent: *Apr. 21, 2015

(54) METHOD OF MANUFACTURING STATOR COIL FOR ELECTRIC ROTATING MACHINE

(75) Inventors: Kimiharu Kayukawa, Nagoya (JP); Masaomi Dobashi, Kariya (JP); Hideji Shimaoka, Anjo (JP); Youichi Kamakura, Anjo (KR)

(73) Assignee: Denso Corporation, Kariya (JP)

( * ) Notice: Subject to any disclaimer, the term of this patent is extended or adjusted under 35 U.S.C. 154(b) by 133 days.

This patent is subject to a terminal disclaimer.

(21) Appl. No.: 13/548,261

(22) Filed: Jul. 13, 2012

(65) Prior Publication Data

US 2013/0014381 A1      Jan. 17, 2013

(30) Foreign Application Priority Data

Jul. 13, 2011  (JP) .................................. 2011-154717

(51) Int. Cl.
*H02K 3/28* (2006.01)
*H02K 15/04* (2006.01)

(52) U.S. Cl.
CPC .............. *H02K 3/28* (2013.01); *H02K 15/0478* (2013.01)

(58) Field of Classification Search
CPC .............................. H02K 3/28; H02K 15/0478
USPC ......................................................... 29/596
See application file for complete search history.

(56) References Cited

U.S. PATENT DOCUMENTS

| 6,710,501 | B1 | 3/2004 | Kusumoto et al. |
| 8,371,020 | B2 | 2/2013 | Gorohata et al. |
| 8,413,314 | B2 | 4/2013 | Nakamura |
| 2010/0077599 | A1 | 4/2010 | Tokizawa |
| 2011/0041319 | A1 | 2/2011 | Gorohata et al. |
| 2011/0095639 | A1* | 4/2011 | Nakamura ................... 310/207 |

FOREIGN PATENT DOCUMENTS

| JP | 2001-145286 | 5/2001 |
| JP | 2010-075035 | 4/2010 |
| JP | 2010-110199 | 5/2010 |
| JP | 2011-109899 | 6/2011 |
| JP | 2012-090375 | 5/2012 |

OTHER PUBLICATIONS

Office Action (1 page) dated Jun. 25, 2013, issued in corresponding Japanese Application No. 2011-154717 and English translation (1 page).

* cited by examiner

*Primary Examiner* — Livius R Cazan
(74) *Attorney, Agent, or Firm* — Nixon & Vanderhye P.C.

(57) ABSTRACT

A method of manufacturing a stator coil includes the steps of: (1) forming substantially planar electric wires each including in-slot portions to be received in slots of a stator core and turn portions to be located outside of the slots to connect the in-slot portions; (2) rolling each of the planar electric wires into a spiral shape by plastically deforming the turn portions; and (3) assembling the rolled electric wires through relative axial movements therebetween, each of the relative axial movements being made by axially moving first and second components relative to each other with both the first and second components radially elastically deformed and with each of the first and second components circumferentially positioned by at least one positioning member, each of the first and second components being one of the rolled electric wires or an electric wire sub-assembly comprised of a plurality of the rolled electric wires.

11 Claims, 31 Drawing Sheets

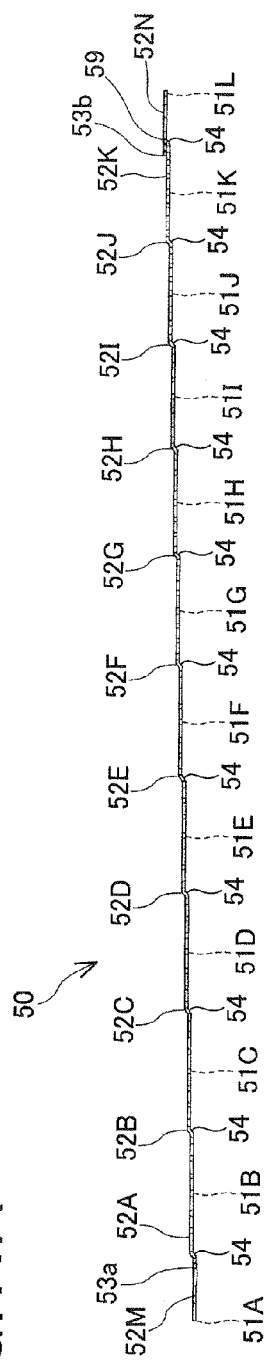
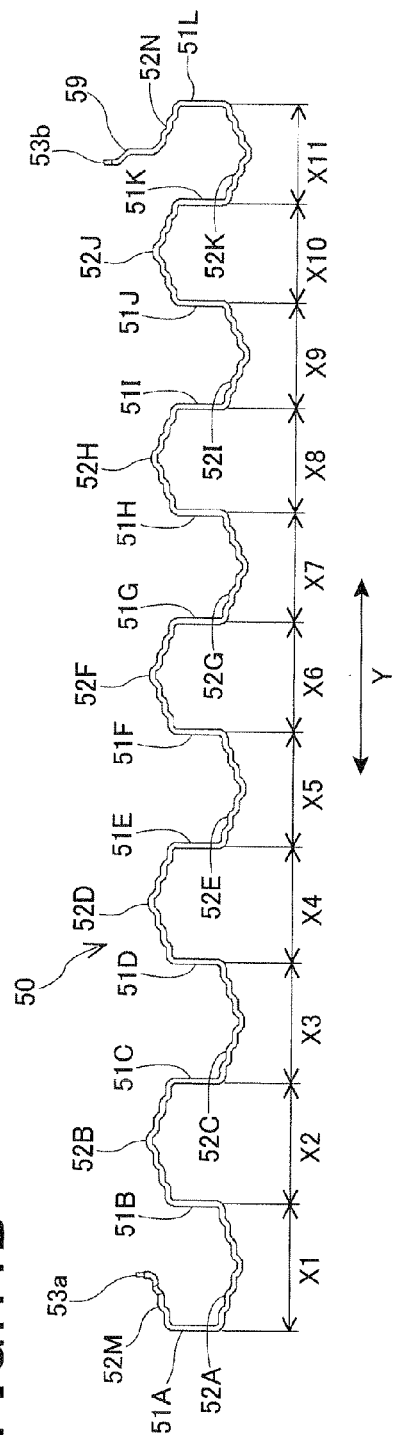
FIG.11A
FIG.11B

FIG. 16A

| SLOT NUMBER | OUTERMOST LAYER | INNERMOST LAYER |
|---|---|---|
| 1 | U1-1 | U1-3' |
| 2 | U2-1 | U2-3' |
| 3 | W1-1' | W1-3 |
| 4 | W2-1' | W2-3 |
| 5 | V1-1 | V1-3' |
| 6 | V2-1 | V2-3' |
| 7 | U1-1' | U1-4 |
| 8 | U2-1' | U2-4 |
| 9 | W1-1 | W1-4' |
| 10 | W2-1 | W2-4' |
| 11 | V1-1' | V1-4 |
| 12 | V2-1' | V2-4 |
| 13 | U1-2 | U1-4' |
| 14 | U2-2 | U2-4' |
| 15 | W1-2' | W1-4 |
| 16 | W2-2' | W2-4 |
| 17 | V1-2 | V1-4' |
| 18 | V2-2 | V2-4' |
| 19 | U1-2' | U1-1 |
| 20 | U2-2' | U2-1 |
| 21 | W1-2 | W1-1' |
| 22 | W2-2 | W2-1' |
| 23 | V1-2' | V1-1 |
| 24 | V2-2' | V2-1 |

| SLOT NUMBER | OUTERMOST LAYER | INNERMOST LAYER |
|---|---|---|
| 25 | U1-3 | U1-1' |
| 26 | U2-3 | U2-1' |
| 27 | W1-3' | W1-1 |
| 28 | W2-3' | W2-1 |
| 29 | V1-3 | V1-1' |
| 30 | V2-3 | V2-1' |
| 31 | U1-3' | U1-2 |
| 32 | U2-3' | U2-2 |
| 33 | W1-3 | W1-2' |
| 34 | W2-3 | W2-2' |
| 35 | V1-3' | V1-2 |
| 36 | V2-3' | V2-2 |
| 37 | U1-4 | U1-2' |
| 38 | U2-4 | U2-2' |
| 39 | W1-4' | W1-2 |
| 40 | W2-4' | W2-2 |
| 41 | V1-4 | V1-2' |
| 42 | V2-4 | V2-2' |
| 43 | U1-4' | U1-3 |
| 44 | U2-4' | U2-3 |
| 45 | W1-4 | W1-3' |
| 46 | W2-4 | W2-3' |
| 47 | V1-4' | V1-3 |
| 48 | V2-4' | V2-3 |

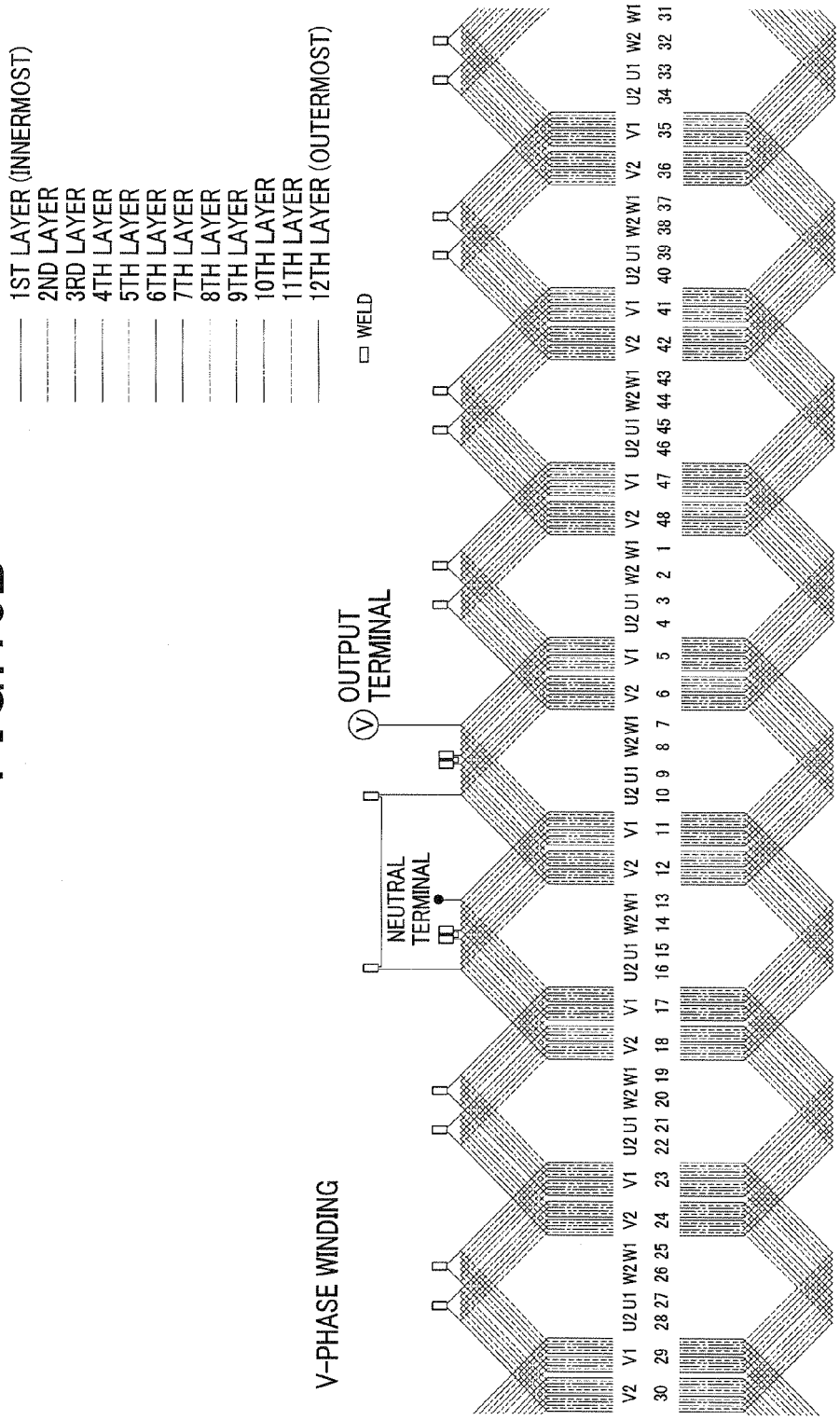

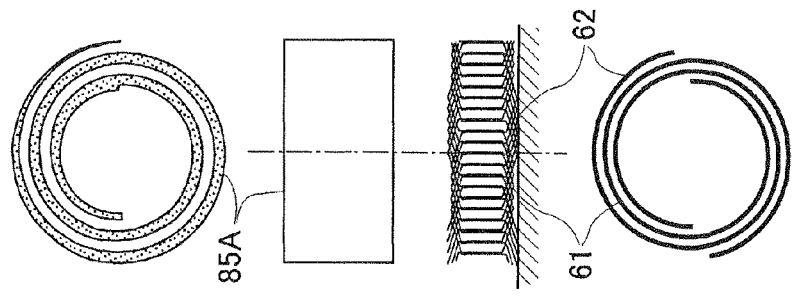
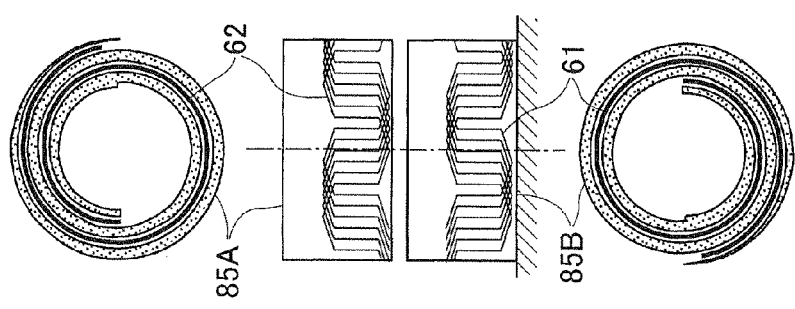
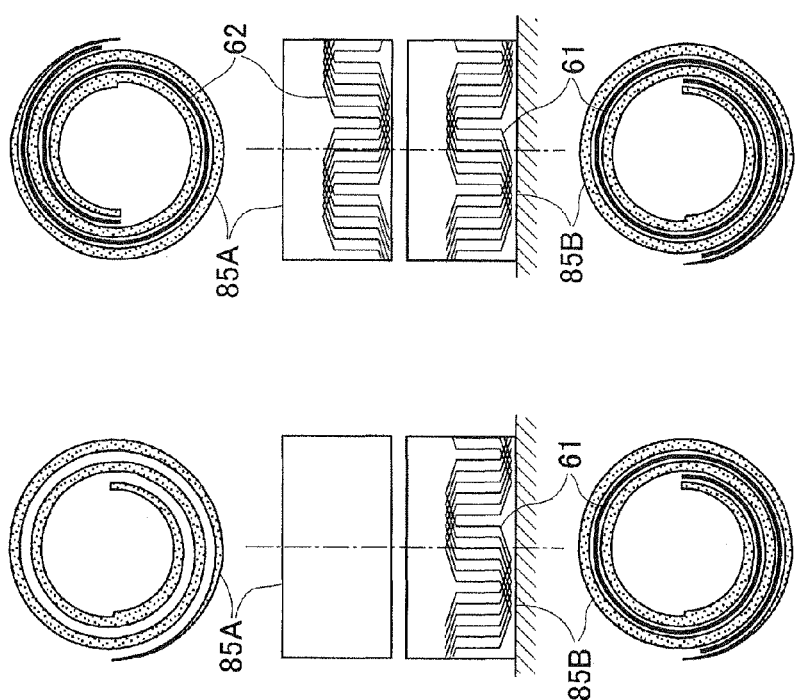
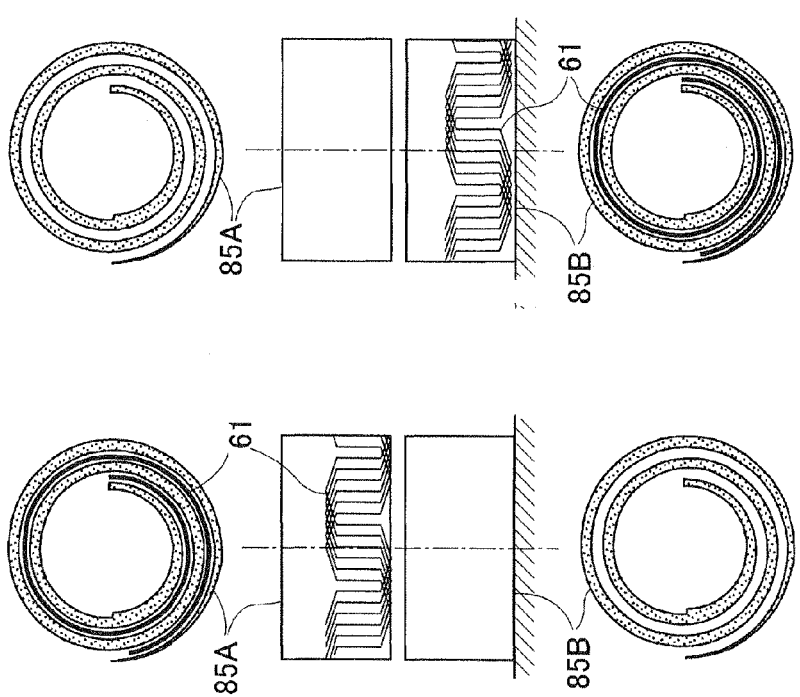

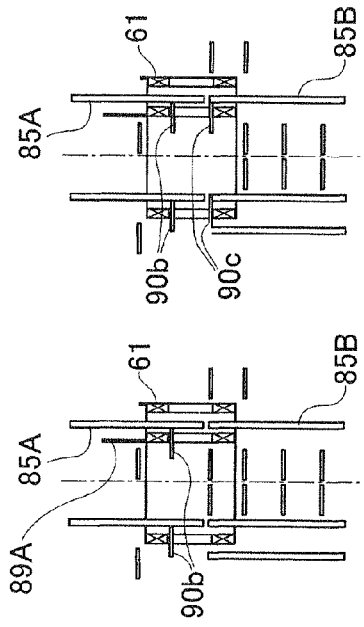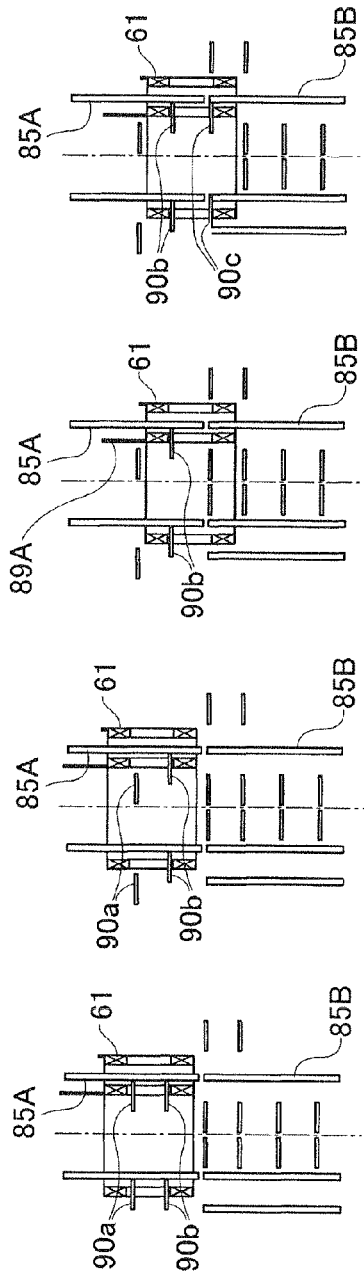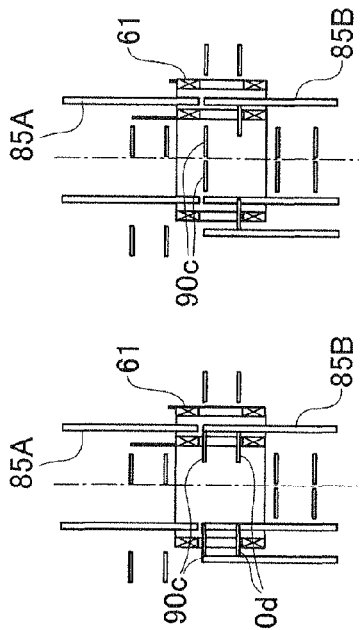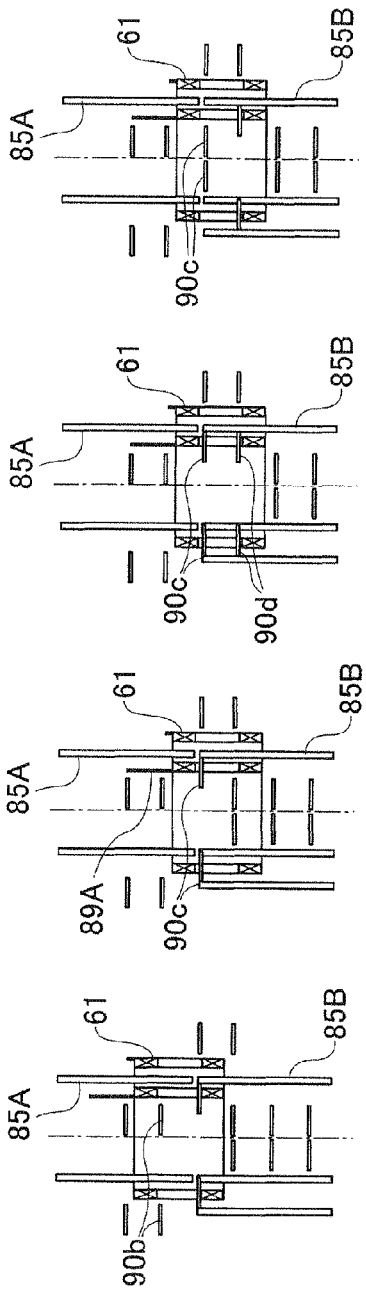

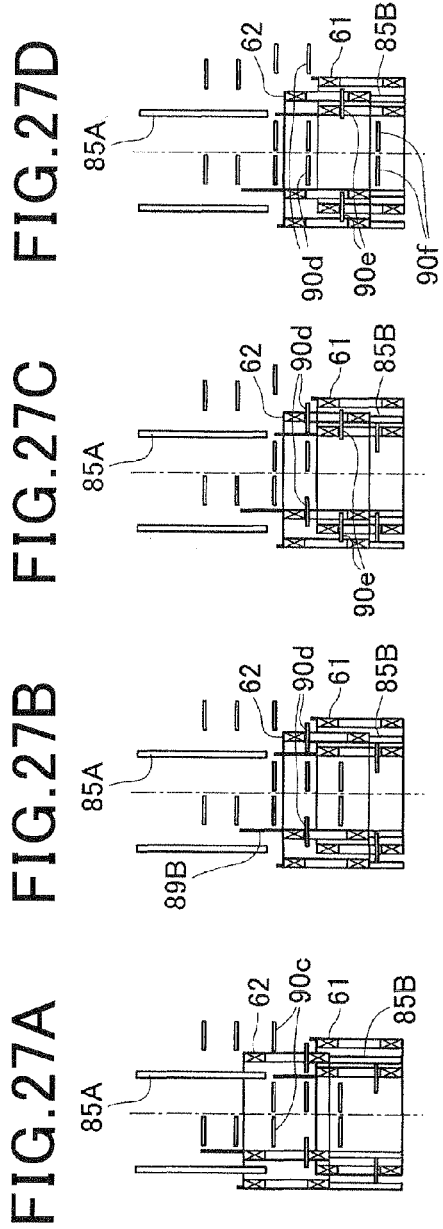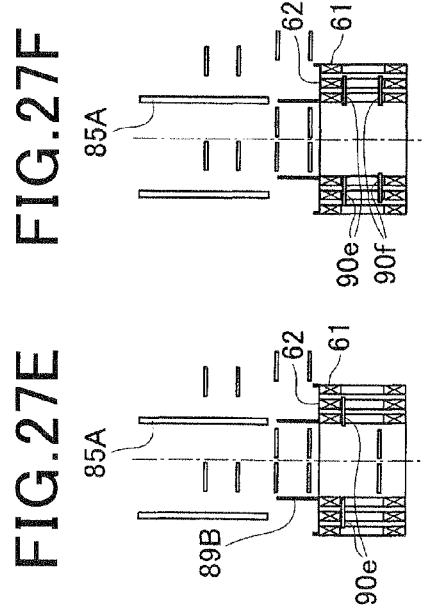

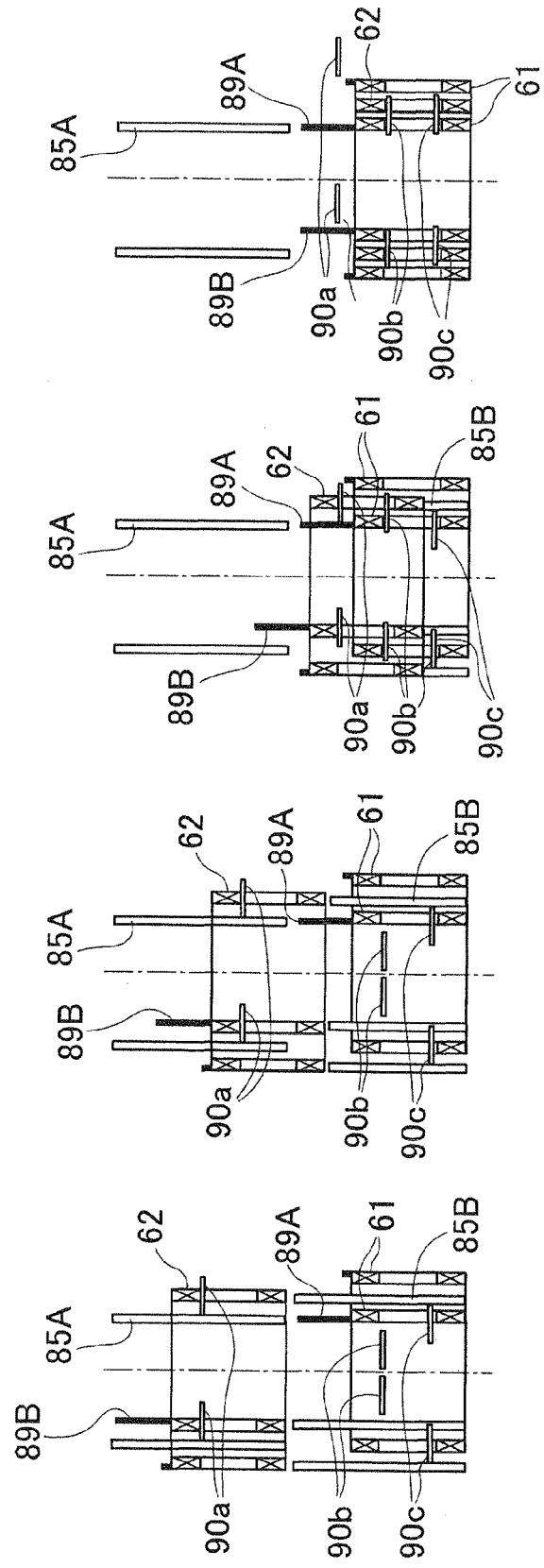

FIG.31
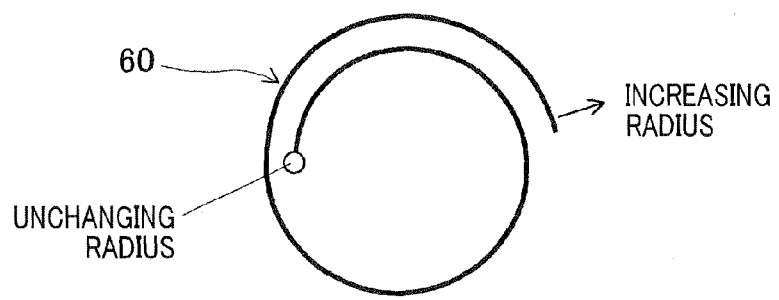
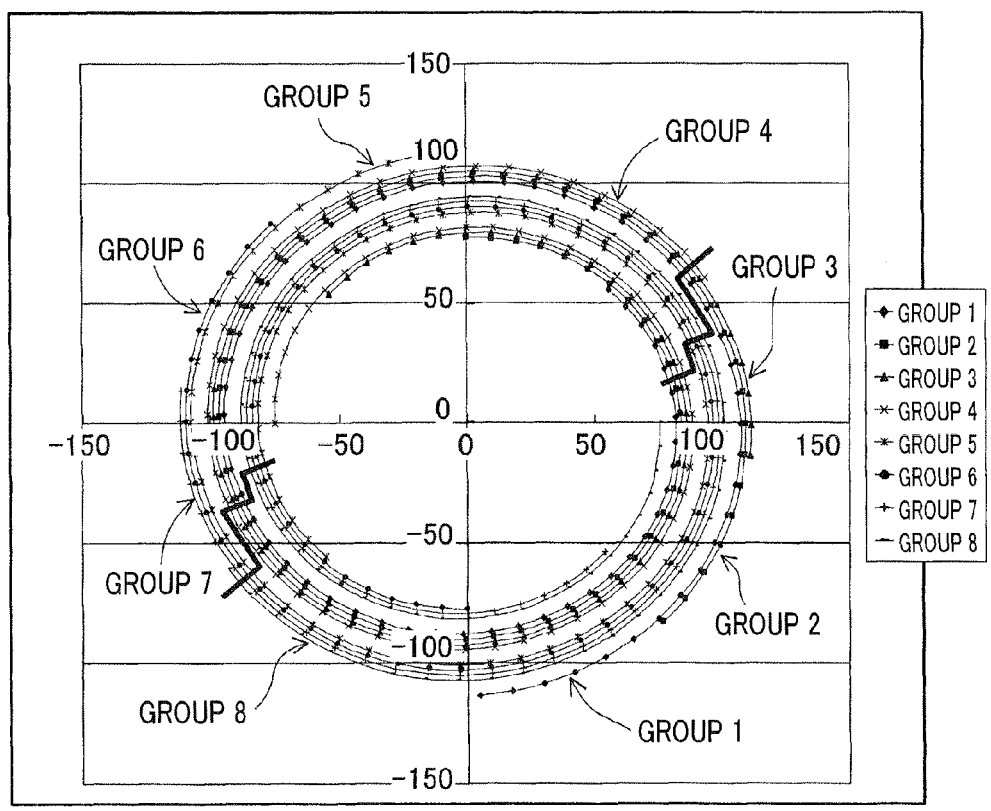

FIG.32
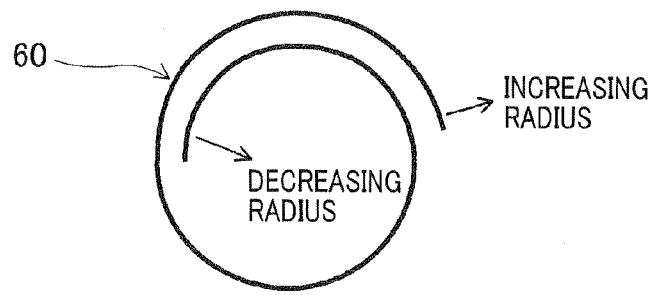
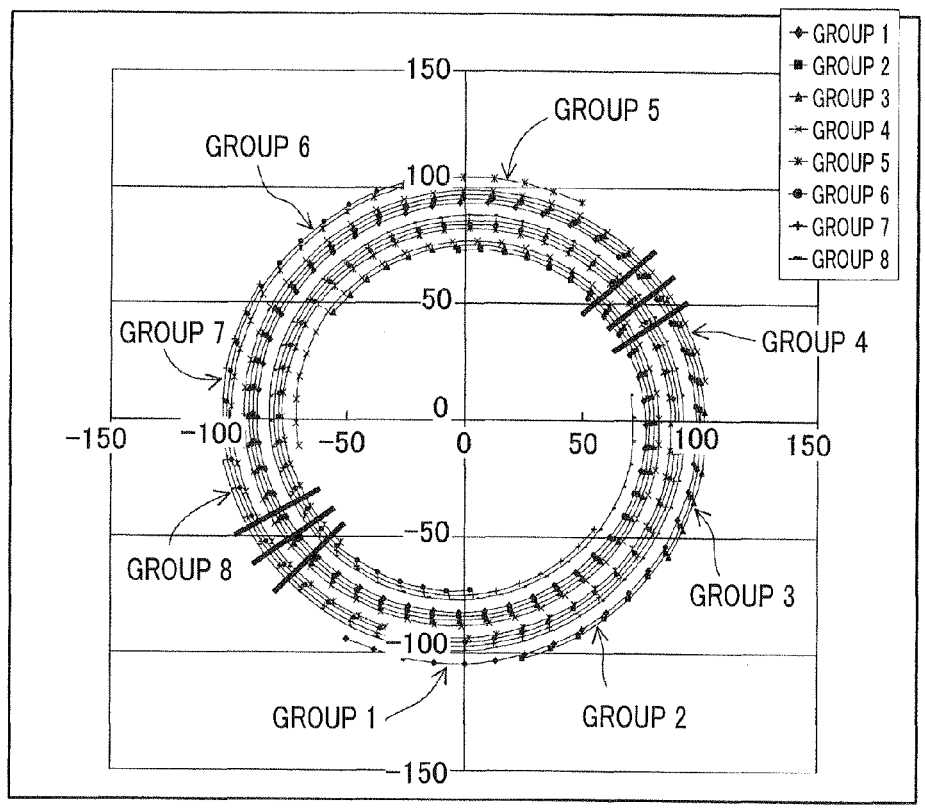

METHOD OF MANUFACTURING STATOR COIL FOR ELECTRIC ROTATING MACHINE

CROSS-REFERENCE TO RELATED APPLICATION

This application is based on and claims priority from Japanese Patent Application No. 2011-154717, filed on Jul. 13, 2011, the content of which is hereby incorporated by reference in its entirety into this application.

BACKGROUND

1. Technical Field

The present invention relates to methods of manufacturing stator coils for electric rotating machines that are used in, for example, motor vehicles as electric motors and electric generators.

2. Description of the Related Art

There are known stators for electric rotating machines which include a hollow cylindrical stator core and a stator coil. The stator core has a plurality of slots that are formed in the radially inner surface of the stator core and spaced at equal intervals in the circumferential direction of the stator core. The stator coil is comprised of a plurality of electric wires mounted on the stator core. Each of the electric wires includes a plurality of in-slot portions and a plurality of turn portions. Each of the in-slot portions is received in a corresponding one of the slots of the stator core. Each of the turn portions is located outside of the slots of the stator core and connects one adjacent pair of the in-slot portions of the electric wire.

Moreover, there is disclosed, for example in Japanese Patent Application Publication No. 2001-145286, a method of manufacturing a stator. According to the method, to improve the space factors of the electric wires in the slots of the stator core, each of the electric wires forming U-phase, V-phase, and W-phase windings of the stator coil is configured to have a rectangular cross section perpendicular to its longitudinal axis and have such an overall shape that when developed on a plane, the electric wire meanders in the form of cranks. Further, the stator coil is formed by: (1) stacking the electric wires together to form a planar electric wire assembly; and (2) rolling the planar electric wire assembly by a predetermined number of turns into a hollow cylindrical shape.

For the thus-formed stator coil, it is necessary for those corresponding in-slot portions of the electric wires which are to be received in the same slot of the stator core to be aligned in a radial direction of the stator coil. However, due to springback of the electric wires which are only elastically deformed during the rolling step, it may be easy for radial misalignment between the corresponding in-slot portions of the electric wires to occur, rendering it difficult to keep the hollow cylindrical shape of the stator coil. Consequently, it may be difficult to easily and accurately assemble the stator coil and the stator core.

Further, to secure higher space factors of the electric wires in the slots of the stator core, it is preferable to more densely arrange the in-slot portions of the electric wires in the corresponding slots of the stator core. However, in this case, insulating coats formed at the surfaces of the in-slot portions of the electric wires may be damaged due to friction which may occur between adjacent pairs of the in-slot portions of the electric wires during the rolling step. Consequently, it may be difficult to ensure electrical insulation between the in-slot portions of the electric wires.

Moreover, with the above method, each of the electric wires is required to have a long length. Accordingly, a large-scale shaping machine is needed for shaping the electric wires. In addition, with the long length of the electric wires, it may be difficult to handle the electric wires during the manufacture of the stator. As a result, it may be difficult to secure a high productivity and a low cost of the stator.

SUMMARY

According to an exemplary embodiment, there is provided a method of manufacturing a stator coil for an electric rotating machine. The electric rotating machine includes a hollow cylindrical stator core having a plurality of slots that are formed in a radially inner surface of the stator core and spaced in a circumferential direction of the stator core. The method includes the sequential steps of: (1) forming a plurality of substantially planar electric wires, each of the planar electric wires including a plurality of in-slot portions to be received in corresponding ones of the slots of the stator core and a plurality of turn portions to be located outside of the slots of the stator core to respectively connect adjacent pairs of the in-slot portions; (2) rolling each of the planar electric wires by a predetermined number of turns into a spiral shape by plastically deforming each of the turn portions of the electric wire into an arc shape; and (3) assembling the rolled electric wires through relative axial movements therebetween to form a hollow cylindrical electric wire assembly that makes up the stator coil, each of the relative axial movements being made by axially moving first and second components relative to each other with both the first and second components radially elastically deformed and with each of the first and second components circumferentially positioned by at least one positioning member, each of the first and second components being made up of either one of the rolled electric wires or an electric wire sub-assembly that is comprised of a plurality of the rolled electric wires.

With the above method, since each of the electric wires is rolled through plastic deformation of the turn portions in the rolling step, no spring back of the electric wires will occur after the rolling step. Consequently, it is possible to reliably prevent radial misalignment between the corresponding in-slot portions of the electric wires from occurring in the resultant stator coil, thereby reliably keeping the hollow cylindrical shape of the stator coil.

Moreover, compared to the method disclosed in Japanese Patent Application Publication No. 2001-145286, it is possible to shorten the length of each of the electric wires. Consequently, the electric wires can be shaped using a smaller-scale shaping machine and be more easily handled during the manufacture of the stator coil. As a result, it is possible to achieve a higher productivity and a lower cost of the stator coil.

Further, since each of the relative axial movements in the assembling step is made with both the first and second components radially elastically deformed, it is possible to prevent interference between the first and second components from occurring during the relative axial movement. Consequently, without interference therebetween, the first and second components can be smoothly moved relative to each other, thereby facilitating the assembly of the first and second components. Moreover, the insulating coats of the electric wires of the first and second components can be reliably prevented from being damaged due to interference between the first and second components.

Furthermore, since each of the relative axial movements in the assembling step is made with each of the first and second components circumferentially positioned by at least one positioning member, it is possible to more reliably ensure that the corresponding in-slot portions of the electric wires of the first and second components be accurately radially aligned with each other. As a result, with the accurately radially-aligned corresponding in-slot portions of the electric wires, it is possible to more easily and accurately assemble the stator core to the resultant stator coil.

Preferably, the at least one positioning member includes a plurality of positioning members that are configured to be radially advanced into and retreated out of the first and second components and located at the same circumferential position but different axial positions from each other. During the relative axial movement, each of the first and second components is always in a state of being circumferentially positioned by at least one of the plurality of positioning members.

It is also preferable that in the assembling step, during each of the relative axial movements, the at least one positioning member circumferentially positioning the second component is axially moved, along with the second component, to the first component.

In the assembling step, at least one of the first and second components may be radially elastically deformed by a volute jig (or helical jig). The volute jig has at least one radially-facing pair of interior surfaces between which the at least one of the first and second components may be inserted. In this case, it is preferable that the at least one of the first and second components is circumferentially positioned in a state of being radially elastically deformed by the volute jig.

Further, the first component may be inserted in the volute jig and thereby radially elastically deformed by the volute jig. In this case, it is preferable that the volute jig has a radial thickness greater than or equal to (n+1) times the radial thickness of the rolled electric wires, where n is the number of layers in which the rolled electric wires of the second component are radially stacked.

Otherwise, in the assembling step, at least one of the first and second components may be radially elastically deformed by a set of rotatable plates. The rotatable plates may be arranged at predetermined intervals in a spirally-extending space formed between different turns of the at least one of the first and second components. Each of the rotatable plates may be rotatable about a rotation axis thereof and mounted with the rotation axis parallel to an axial direction of the at least one of the first and second components.

Further, each of the rotatable plates may have a substantially elliptical cross section perpendicular to its rotation axis. In the assembling step, each of the rotatable plates may be rotated about its rotation axis to have a major axis of the elliptical cross section thereof extending in a radial direction of the at least one of the first and second components, thereby elastically deforming the at least one of the first and second components both radially outward and radially inward.

Alternatively, in the assembling step, at least one of the first and second components may be radially elastically deformed by a set of movable plates. All the movable plates may be disposed within a spirally-extending space formed between different turns of the at least one of the first and second components. Each of the movable plates is movable both radially outward and radially inward.

Further, the set of movable plates may consist of a plurality of first movable plates and a plurality of second movable plates. The first movable plates may be arranged on a radially inner side in the spirally-extending space; the second movable plates may be arranged on a radially outer side in the spirally-extending space. In the assembling step, each of the first movable plates may be advanced radially outward to press and thereby elastically deform the at least one of the first and second components; at the same time, each of the second movable plates may be advanced radially inward to press and thereby elastically deform the at least one of the first and second components.

In the forming step or in the rolling step, a crank-shaped part may be formed in each of the turn portions of the electric wires to radially offset the turn portion.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 11A is a top view of one of the electric wires;

FIG. 11B is a front view of the one of the electric wires;

FIG. 16A is a tabular representation showing the correspondence between slot number and the labels of radially-innermost and outermost electric wires for each slot of the stator core;

FIG. 16B is a schematic view illustrating the connection between those of the electric wires which together form a V-phase winding of the stator coil when viewed from the radially inner side of the stator core;

FIGS. 23A-23D are schematic views illustrating first to fourth stages of an assembly process performed in the assembly step;

FIGS. 24A-24H are schematic views illustrating the first stage and part of the second stage of the assembly process;

FIGS. 27A-27F are schematic views illustrating the remaining part of the fourth stage of the assembly process;

FIGS. 29A-29D are schematic views illustrating the third and fourth stages of an assembly process performed in the assembly step of a method according to a second embodiment;

FIGS. 31 and 32 are schematic views together illustrating an advantage of the method according to the third embodiment over the method according to the first embodiment;

DESCRIPTION OF EMBODIMENTS

Figure 1:
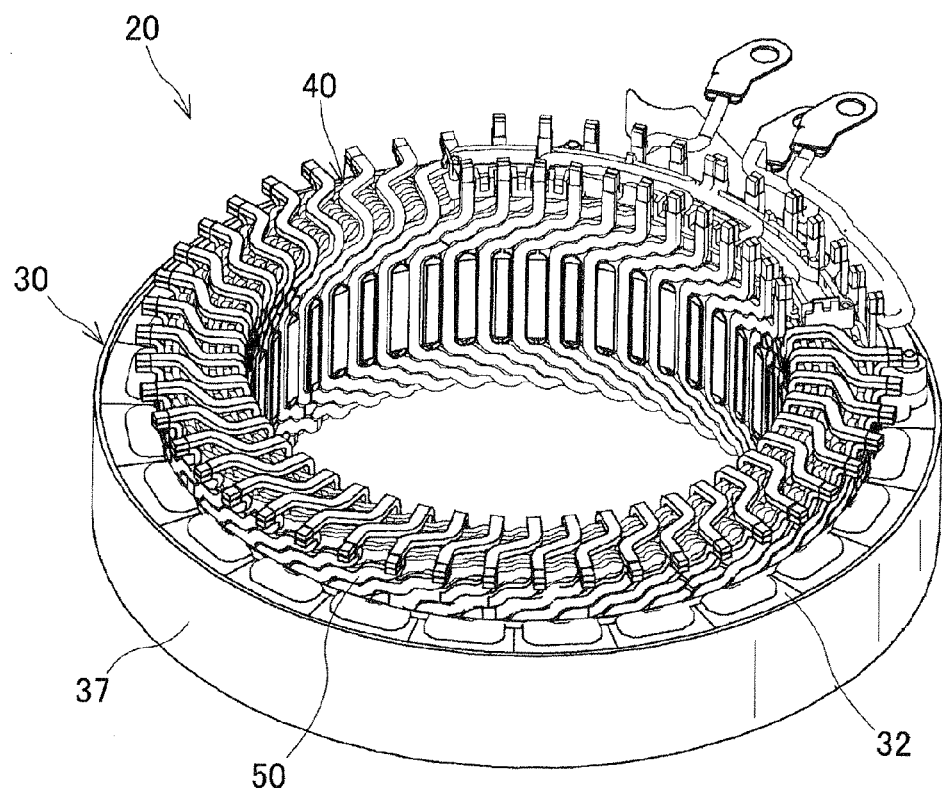
FIG. 1 is a perspective view of a stator which includes a stator coil manufactured by a method according to a first embodiment.

Exemplary embodiments will be described hereinafter with reference to FIGS. 1-34. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

[First Embodiment]

Figure 2:
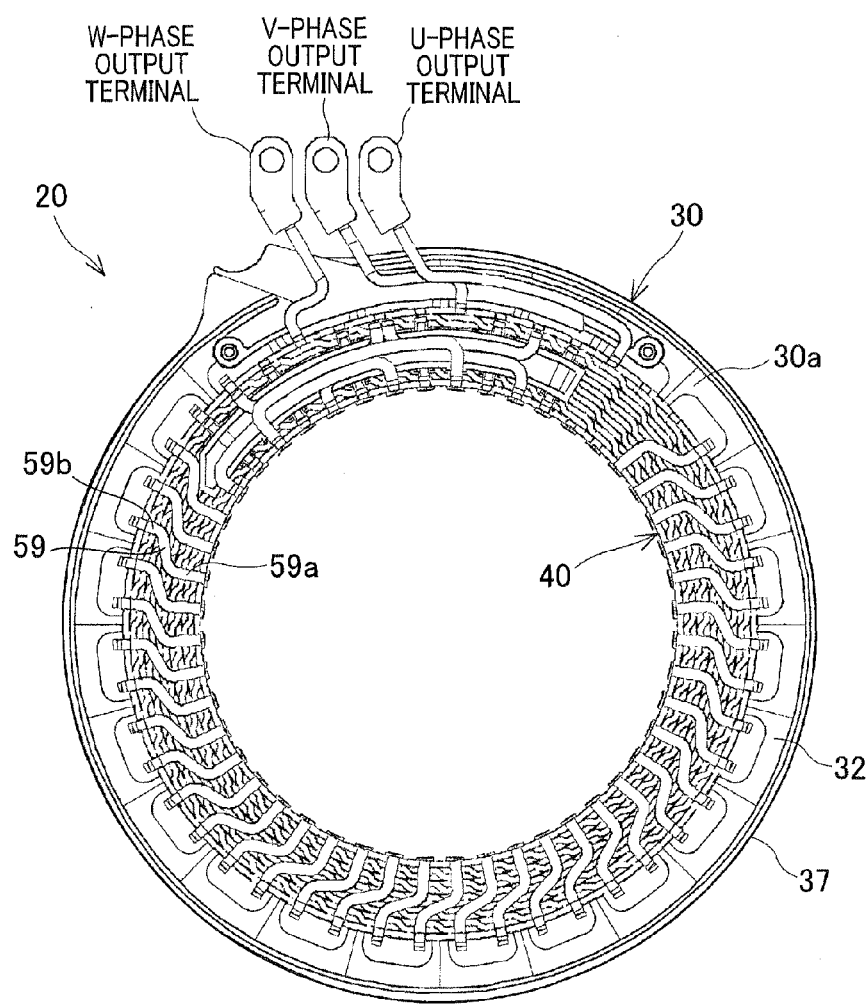
FIG. 2 is a top view of the stator.
Figure 3:
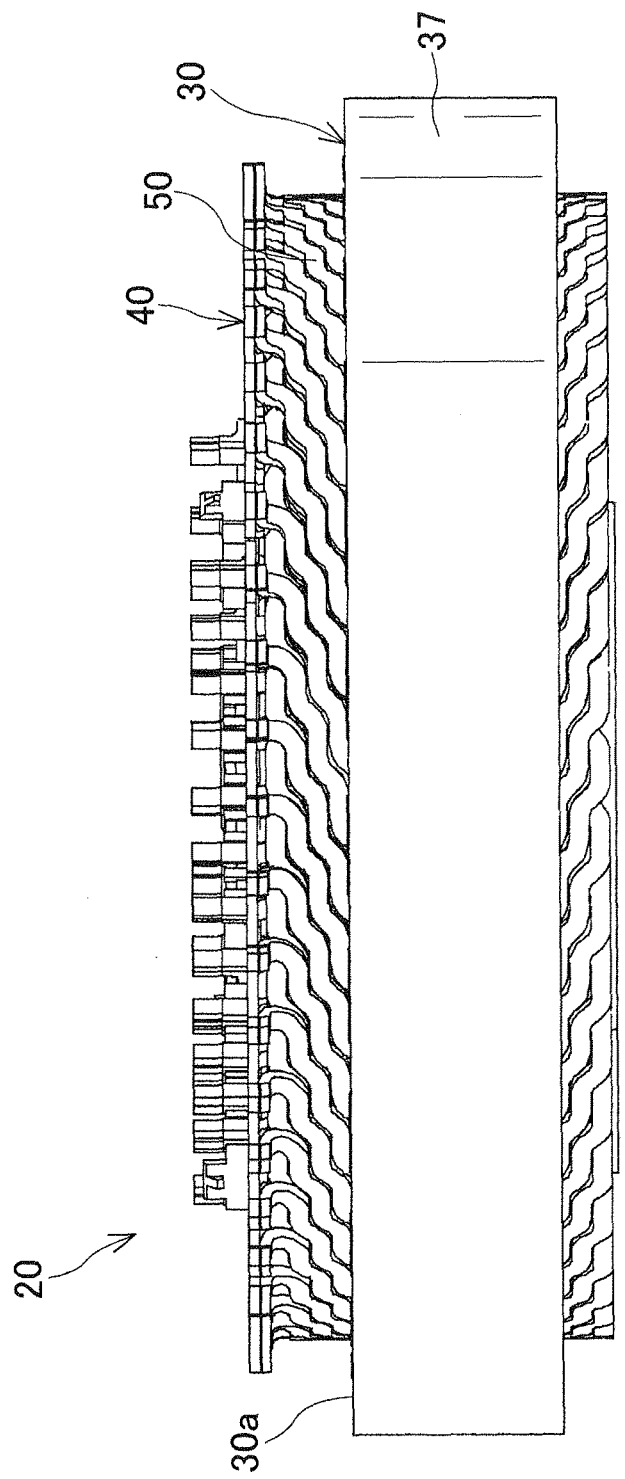
FIG. 3 is a side view of the stator.

FIGS. 1-3 together show the overall configuration of a stator 20 which includes a three-phase stator coil 40 manufactured by a method according a first embodiment.

The stator 20 is designed to be used in, for example, an electric rotating machine (not shown) that can function both as an electric motor and as an electric generator in a motor vehicle.

In addition to the stator 20, the electric rotating machine further includes a rotor (not shown) that is rotatably disposed radially inside of the stator 20. The rotor includes a plurality of permanent magnets that form a plurality of magnetic poles on the radially outer periphery of the rotor to face the radially inner periphery of the stator 20. The magnetic poles are spaced in the circumferential direction of the rotor at predetermined intervals so that the polarities of the magnetic poles alternate between north and south in the circumferential direction. In addition, the number of the magnetic poles formed in the rotor is equal to, for example, eight (i.e., four north poles and four south poles).

As shown in FIGS. 1-3, the stator 20 includes a hollow cylindrical (or annular) stator core 30 and the three-phase stator coil 40 that is comprised of a plurality (e.g., 48 in the present embodiment) of electric wires 50 mounted on the stator core 30. In addition, the stator 20 may further include insulating paper interposed between the stator core 30 and the stator coil 40.

Figure 4:
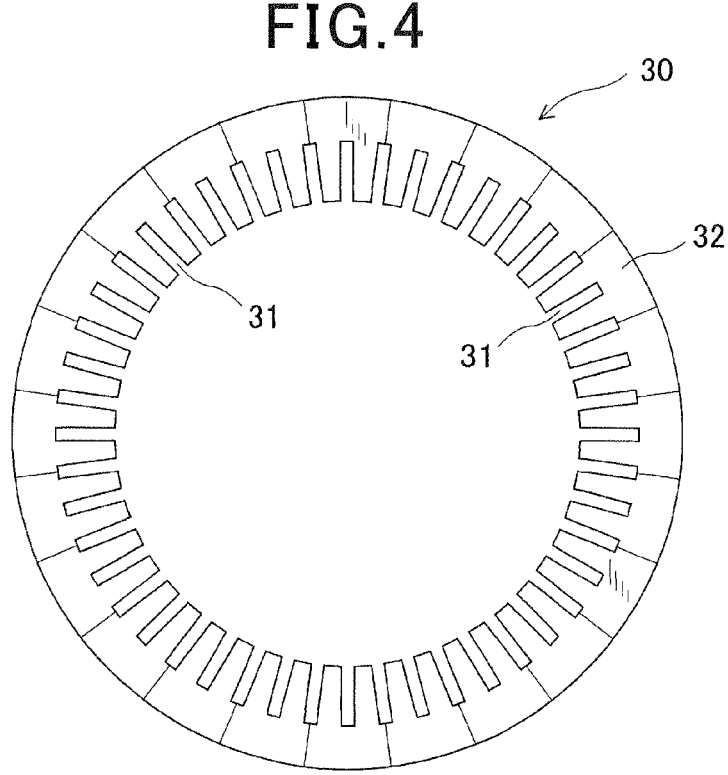
FIG. 4 is a top view of a stator core of the stator.

The stator core 30 has, as shown in FIG. 4, a plurality of slots 31 that are formed in the radially inner surface of the stator core 30 and spaced in the circumferential direction of the stator core 30 at a predetermined pitch. For each of the slots 31, the depth-wise direction of the slot 31 is coincident with a radial direction of the stator core 30. In the present embodiment, there are provided two slots 31 per magnetic pole of the rotor that has the eight magnetic poles and per phase of the three-phase stator coil 40. Accordingly, the total number of the slots 31 provided in the stator core 30 is equal to 48 (i.e., 2×8×3).

Figure 5:
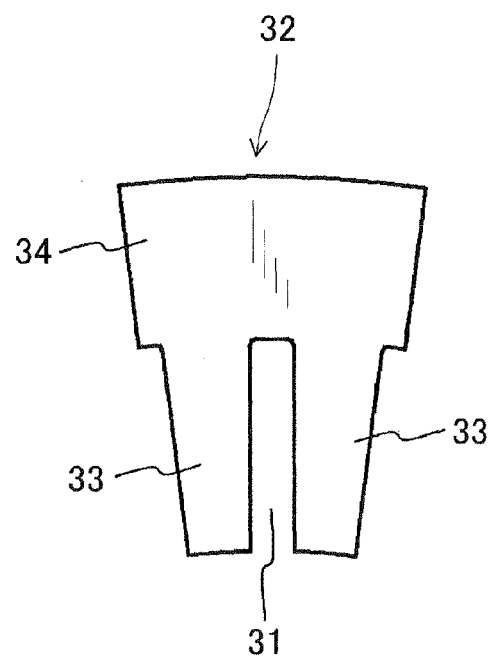
FIG. 5 is a top view of one of stator core segments which together make up the stator core.

Moreover, in the present embodiment, the stator core 30 is comprised of, for example, 24 stator core segments 32 as shown in FIG. 5. The stator core segments 32 are joined together so as to adjoin one another in the circumferential direction of the stator core 30. Each of the stator core segments 32 defines therein one of the slots 31. Further, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is located radially outward of the tooth portions 33 to connect them. In addition, on the radially outer surfaces of the stator core segments 32, there is fitted an outer ring 37 (see FIGS. 1-3).

In the present embodiment, each of the stator core segments 32 is formed by laminating a plurality of magnetic steel sheets with insulating films interposed therebetween. It should be noted that other conventional metal sheets may also be used instead of the magnetic steel sheets.

FIGS. 6-9 together show the configuration of the stator coil 40, which is formed with the electric wires 50 into a hollow cylindrical shape.

As shown in FIGS. 6-9, the stator coil 40 has, as a whole, a straight part 41 to be received in the slots 31 of the stator core 30, and a pair of coil end parts 42 that are respectively formed on opposite axial sides of the straight part 41 and to be located outside the slots 31. Moreover, on one axial side of the straight part 41, U-phase, V-phase, and W-phase output terminals and U-phase, V-phase, and W-phase neutral terminals of the stator coil 40 protrude from the annular axial end face of the coil end part 42, and a plurality of crossover parts 59 of the electric wires 50 cross over the axial end face from the radially inner side to the radially outer side of the axial end face to connect corresponding pairs of the electric wires 50.

Figure 10A:
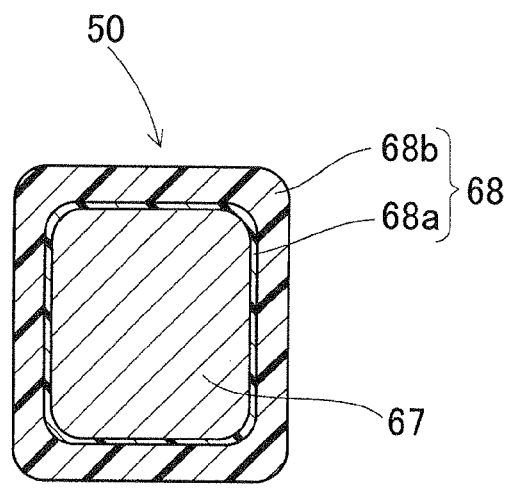
FIG. 10A is a cross-sectional view illustrating the configuration of electric wires forming the stator coil.

Each of the electric wires 50 for forming the stator coil 40 is configured with, as shown in FIG. 10A, an electric conductor 67 and an insulating coat 68 that covers the outer surface of the electric conductor 67. In the present embodiment, the electric conductor 67 is made of copper and has a substantially rectangular cross section perpendicular to its longitudinal axis. The insulating coat 68 is two-layer structured to include an inner layer 68a and an outer layer 68b. The thickness of the insulating coat 68 (i.e., the sum of thicknesses of the inner and outer layers 68a and 68b) is set to be in the range of 100 to 200 μm.

With such a large thickness of the two-layer structured insulating coat 68, it is possible to reliably insulate the electric wires 50 from one another without interposing insulating paper therebetween. However, it is also possible to interpose insulating paper between the electric wires 50 so as to further enhance the electrical insulation therebetween.

Further, the outer layer 68b is made of an insulating material such as nylon. The inner layer 68a is made of a thermoplastic resin having a higher glass transition temperature than the outer layer 68b or an insulating material having no glass transition temperature such as a polyamide-imide resin. Consequently, the outer layers 68b of the electric wires 50 will be solidified by the heat generated by operation of the electric rotating machine earlier than the inner layers 68a. As a result, the surface hardness of the outer layers 68b will be increased, thereby enhancing the electrical insulation between the electric wires 50.

Figure 10B:
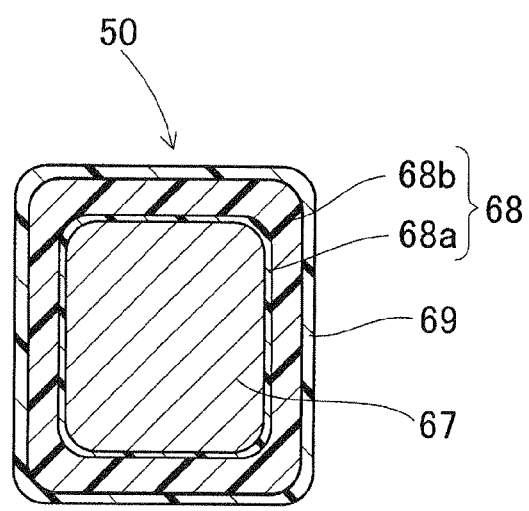
FIG. 10B is a cross-sectional view illustrating a modification of the configuration of the electric wires shown in FIG. 10A.

Furthermore, as shown in FIG. 10B, it is also possible for each of the electric wires 50 to further include a fusible coat 69 to cover the outer surface of the insulating coat 68; the fusible coat 69 may be made, for example, of epoxy resin. In this case, the fusible coats 69 of the electric wires 50 will be fused by the heat generated by operation of the electric rotating machine earlier than the insulating coats 68, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, the outer layers 68b of the insulating coats 68 of the electric wires 50 may also be made of PPS (polyphenylene sulfide).

FIGS. 11A-11B together show the shape of each of the electric wires 50 before the electric wires 50 are rolled into a spiral shape as to be described later.

As shown in FIGS. 11A-11B, each of the electric wires 50 is substantially planar and wave-shaped to include a plurality of in-slot portions 51 and a plurality of turn portions 52. The in-slot portions 51 are spaced in the longitudinal direction Y of the electric wire 50 at predetermined pitches and extend perpendicular to the longitudinal direction Y. Each of the in-slot portions 51 is to be received in a corresponding one of the slots 31 of the stator core 30. Each of the turn portions 52 extends to connect a corresponding adjacent pair of the in-slot portions 51 and is to be located outside the slots 31 of the stator core 30.

Specifically, the plurality of in-slot portions 51 include, at least, a first in-slot portion 51A, a second in-slot portion 51B, and a third in-slot portion 51C. The first, second and third in-slot portions 51A, 51B, and 51C are to be respectively received in three different slots 31 of the stator core 30; the three slots 31 are circumferentially spaced at a pitch of six slots 31. On the other hand, the plurality of turn portions 52 include, at least, a first turn portion 52A and a second turn portion 52B. The first turn portion 52A connects the first and second in-slot portions 51A and 51B and is to be located on one axial side of the stator core 30 outside the slots 31. The second turn portion 52B connects the second and third in-slot portions 51B and 51C and is to be located on the other axial side of the stator core 30 outside the slots 31.

More specifically, in the present embodiment, as shown in FIGS. 11A-11B, the plurality of in-slot portions 51 include first to twelfth in-slot portions 51A-51L which are to be sequentially received in eight slots 31 that are circumferentially spaced at a pitch of six slots 31. In other words, the number of the in-slot portions 51 in each of the electric wires 50 is equal to 12. On the other hand, the plurality of turn portions 52 include first to eleventh turn portions 52A-52K which each connect a corresponding adjacent pair of the in-slot portions 51A-51L and are to be alternately located on the opposite axial sides of the stator core 30 outside the slots 31. In other words, the number of the turn portions 52 in each of the electric wires 50 is equal to 11.

Moreover, the predetermined pitches X between the in-slot portions 51A-51L in the longitudinal direction Y of the electric wire 50 gradually decrease in a direction from the first in-slot portion 51A to the twelfth in-slot portion 51L. That is, X1>X2>X3>X4>X5>X6>X7>X8>X9>X10>X11. In addition, the predetermined pitches X1-X11 are set based on the circumferential distances between the eight slots 31 of the stator core 30 in which the in-slot portions 51A-51L are to be received.

Each of the electric wires 50 further includes a pair of lead portions 53a and 53b that are respectively formed at opposite ends of the electric wire 50 for connecting the electric wire 50 with other electric wires 50. The lead portion 53a is connected to the first in-slot portion 51A via a half-turn portion 52M that extends from the first in-slot portion 51A to return inward (i.e., rightward in FIG. 11B) in the longitudinal direction Y of the electric wire 50. The length of the half-turn portion 52M is substantially half the length of the first turn portion 52A. Consequently, the lead portion 53a is offset inward (i.e., rightward in FIG. 11B) in the longitudinal direction Y from the first in-slot portion 51A by the length of the half-turn portion 52M. On the other hand, the lead portion 53b is connected to the twelfth in-slot portion 51L via a half-turn portion 52N that extends from the twelfth in-slot portion 51L to return inward (i.e., leftward in FIG. 11B) in the longitudinal direction Y of the electric wire 50. The length of the half-turn portion 52N is substantially half the length of the eleventh turn portion 52K. Consequently, the lead portion 53b is offset inward (i.e., leftward in FIG. 11B) in the longitudinal direction Y from the twelfth in-slot portion 51L by the length of the half-turn portion 52N. Further, the lead portion 53b is formed to include therein one of the crossover parts 59 described previously.

Furthermore, as shown in FIG. 11A, each of the turn portions 52 includes, substantially at the center thereof, a crank-shaped part 54 that is bent to offset (or shift the position of) the turn portion 52 in a direction perpendicular to both the longitudinal direction Y of the electric wire 50 and the extending direction of the in-slot portions 51. Consequently, with the crank-shaped parts 54, the electric wire 50 is stepped to successively offset the in-slot portions 51 in the direction perpendicular to both the longitudinal direction Y and the extending direction of the in-slot portions 51. It should be noted that the term "crank-shaped" is used here only for the purpose of describing the overall shape of the parts 54 and does not restrict the internal angles between adjacent sections of the parts 54 to 90°.

Figure 12A:
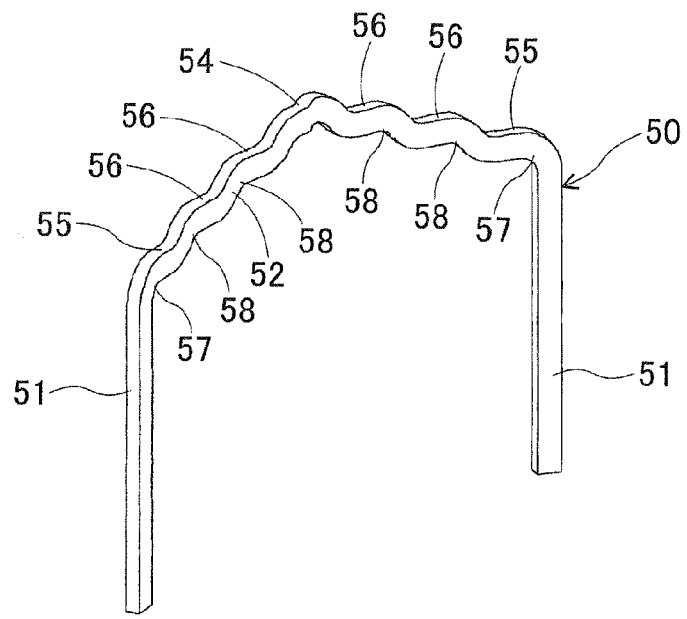
FIG. 12A is a perspective view illustrating a turn portion of one of the electric wires.
Figure 12B:
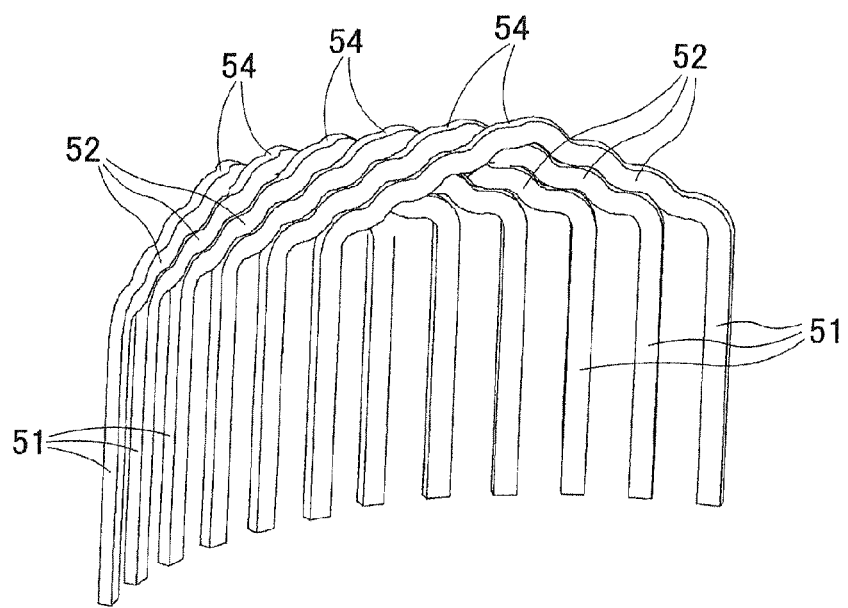
FIG. 12B is a perspective view illustrating a plurality of turn portions of the electric wires which are adjacent to one another.

Referring now to FIGS. 12A-12B, after forming the stator coil 40 with the electric wires 50 and assembling the stator core 30 to the stator coil 40, each of the turn portions 52 (i.e., 52A-52K) of the electric wires 50 is offset by the crank-shaped part 54 formed therein in a radial direction of the stator core 30. In addition, though not shown in FIGS. 12A-12B, each of the crank-shaped parts 54 formed in the turn portions 52 of the electric wires 50 extends parallel to a corresponding axial end face 30a of the stator core 30.

Further, in the present embodiment, the amount of radial offset made by each of the crank-shaped parts 54 is set to be equal to the radial thickness of the in-slot portions 51 of the electric wires 50. Here, the amount of radial offset made by each of the crank-shaped parts 54 is defined as the difference in radial position between the opposite ends of the crank-shaped part 54. Accordingly, for each of the electric wires 50, the difference in radial position between each adjacent pair of the in-slot portions 51, which are connected by a corresponding one of the turn portions 52, is equal to the radial thickness (i.e., thickness in the radial direction of the stator core 30) of the in-slot portions 51.

Setting the amount of radial offset as above, it is possible to arrange each adjacent pair of the turn portions 52 of the electric wires 50 in intimate contact with each other, as shown in FIG. 12B. As a result, the radial thickness of the coil end parts 42 of the stator coil 40 can be minimized. In addition, it is also possible to make each adjacent pair of the turn portions 52 of the electric wires 50 extend in the circumferential direction of the stator core 30 without interference therebetween.

Moreover, as shown in FIGS. 12A-12B, each of the turn portions 52 of the electric wires 50 includes a pair of shoulder parts 55 which respectively adjoin the pair of the in-slot portions 51 connected by the turn portion 52 and both extend substantially perpendicular to the pair of the in-slot portions 51 (or substantially parallel to the corresponding axial end face 30a of the stator core 30). Consequently, with the shoulder parts 55, the protruding height of each of the turn portions 52 from the corresponding axial end face 30a of the stator core 30 can be reduced. As a result, the axial length of the coil end parts 42 of the stator coil 40 can be reduced. In addition, the coil end parts 42 of the stator coil 40 are each comprised of those of the turn portions 52 of the electric wires 50 which are located on the same axial side of the stator core 30.

In the present embodiment, each of the shoulder parts 55 is bent at a substantially right angle to the adjoining in-slot portion 51, forming a bend between the shoulder part 55 and the adjoining in-slot portion 51. Further, as shown in FIG. 12A, a pair of bulges 57 are respectively formed on the radial end faces of the bend so as to be positioned closer to the inside than the outside of the bend. The bulges 57 protrude from the adjoining in-slot portion 51 radially inward and radially outward, respectively.

Furthermore, in the present embodiment, there is specified the following dimensional relationship: $d1 < d2$, where $d1$ is the length of each of the shoulder parts 55 of the electric wires 50 in the circumferential direction of the stator core 30 and $d2$ is the distance between each circumferentially-adjacent pair of the slots 31 of the stator core 30.

Specifying the above relationship, it is possible to prevent interference between each pair of the turn portions 52 of the electric wires 50 which respectively protrude from one circumferentially-adjacent pair of the slots 31 of the stator core 30. Consequently, it is possible to prevent both the axial length and radial thickness of the coil end parts 42 of the stator coil 40 from being increased for preventing the above-described interference.

Moreover, as shown in FIGS. 12A-12B, each of the turn portions 52 of the electric wires 50 further includes two shoulder parts 56 between the crank-shaped part 54 and each of the shoulder parts 55. Accordingly, each of the turn portions 52 of the electric wires 50 includes one crank-shaped part 54, two shoulder parts 55, and four shoulder parts 56. Each of the shoulder parts 56 extends, like the shoulder parts 55, substantially perpendicular to the in-slot portions 51 (or substantially parallel to the corresponding axial end face 30a of the stator core 30). Consequently, with the shoulder parts 56, the protruding height of each of the turn portions 52 from the corresponding axial end face 30a of the stator core 30 can be further reduced. As a result, the axial length of the coil end parts 42 of the stator coil 40 can be further reduced. In addition, each of the turn portions 52 of the electric wires 50 can be seen as being stepped on both sides of the crank-shaped part 54 to reduce its protruding height from the corresponding axial end face 30a of the stator core 30.

Further, as shown in FIG. 12A, for each of bends formed between the shoulder parts 55 and 56, there are formed a pair of bulges 58 respectively on the radial end faces of the bend. The bulges 58 are positioned closer to the inside than the outside of the bend, and protrude from the closest one of the in-slot portions 51 radially inward and radially outward, respectively.

In the present embodiment, the stator coil 40 is formed with the 48 electric wires 50 as shown in FIGS. 11A-11B. It should be noted that the crossover parts 59 may be omitted from some of the electric wires 50 for facilitating the formation of the U-phase, V-phase, and W-phase output terminals and the U-phase, V-phase, and W-phase neutral terminals in the stator coil 40. However, in any case, it is preferable that all of the electric wires 50 have the same shape at least between the lead portions 53a and 53b.

As described previously, each of the turn portions 52 of the electric wires 50 includes, substantially at the center thereof, the crank-shaped part 54 by which the turn portion 52 is radially offset (or shifted in radial position) by the radial thickness of the in-slot portions 51. Accordingly, for each of the electric wires 50, the difference in radial position between each adjacent pair of the in-slot portions 51, which are connected by a corresponding one of the turn portions 52, is equal to the radial thickness of the in-slot portions 51. Moreover, for each of the electric wires 50, the first in-slot portion 51A is located most radially outward while the twelfth in-slot portion 51L is located most radially inward; the predetermined pitches X between the in-slot portions 51A-51L gradually decrease in a direction from the first in-slot portion 51A to the twelfth in-slot portion 51L (see FIG. 11B). Consequently, those of the in-slot portions 51 of the electric wires 50 which are stacked in a radial direction of the stator coil 40 (or a radial direction of the stator core 30) can be aligned straight in the radial direction, thereby allowing the stator coil 40 to have a substantially perfect hollow-cylindrical shape as shown in FIGS. 6-9.

Furthermore, all of the ith in-slot portions 51 of the 48 electric wires 50 are located respectively in the 48 slots 31 of the stator core 30 at the same radial position, where $i=1, 2, \ldots, 12$. For example, all of the first in-slot portions 51A of the 48 electric wires 50 are located respectively in the 48 slots 31 and positioned most radially outward in the respective slots 31; all of the twelfth in-slot portions 51L of the 48 electric wires 50 are located respectively in the 48 slots 31 and positioned most radially inward in the respective slots 31. With the above location of the in-slot portions 51 of the electric wires 50, both the outside and inside diameters of the stator coil 40 can be made uniform in the circumferential direction of the stator core 30.

Figure 13:
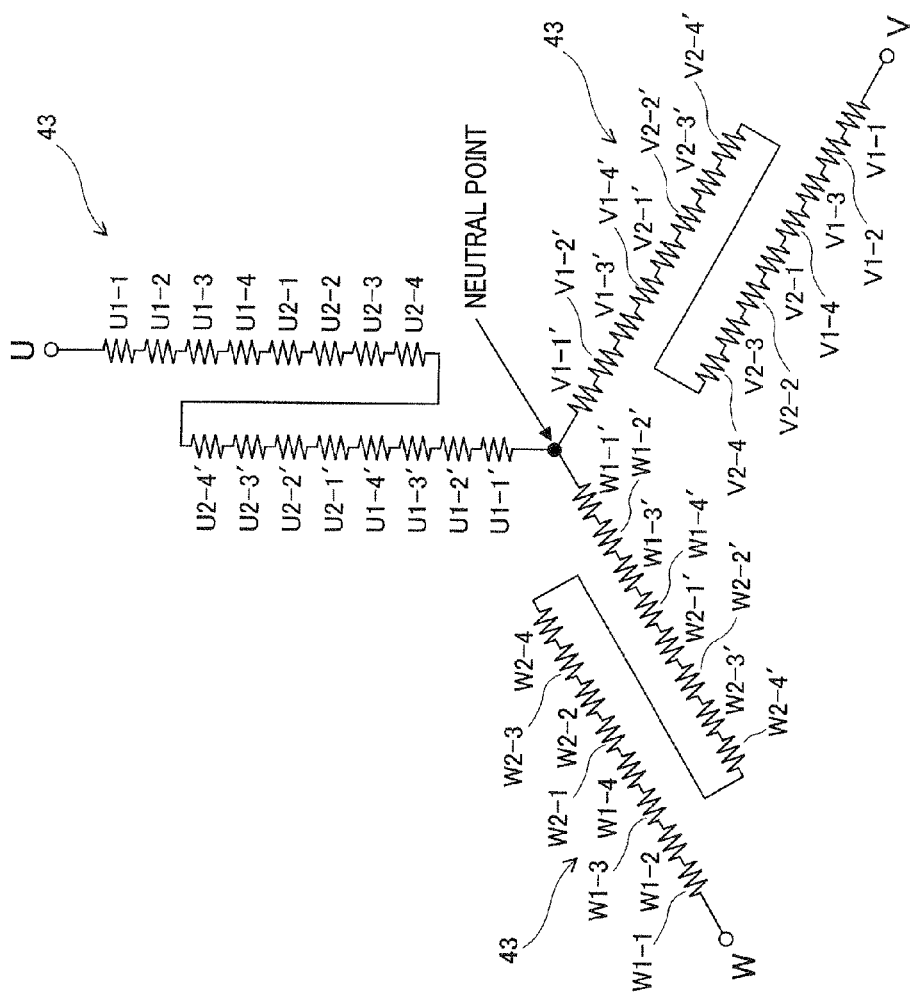
FIG. 13 is a circuit diagram of the stator coil.

In the present embodiment, as shown in FIG. 13, the stator coil 40 is formed as a three-phase coil which is comprised of three phase windings (i.e., U-phase, V-phase, and W-phase windings) 43. Each of the U-phase, V-phase, and W-phase windings 43 is formed by serially connecting 16 electric wires 50. Further, the U-phase output and neutral terminals are respectively formed at the opposite ends of the U-phase winding 43; the V-phase output and neutral terminals are respectively formed at the opposite ends of the V-phase winding 43; and the W-phase output and neutral terminals are respectively formed at the opposite ends of the W-phase winding 43. Furthermore, the U-phase, V-phase, and W-phase windings 43 are Y-connected to define a neutral point therebetween. That is, the U-phase, V-phase, and W-phase neutral terminals of the U-phase, V-phase, and W-phase windings 43 are joined together at the neutral point. Consequently, three-phase AC power is input to or output from the stator coil 40 via the U-phase, V-phase, and W-phase output terminals.

Figure 14:
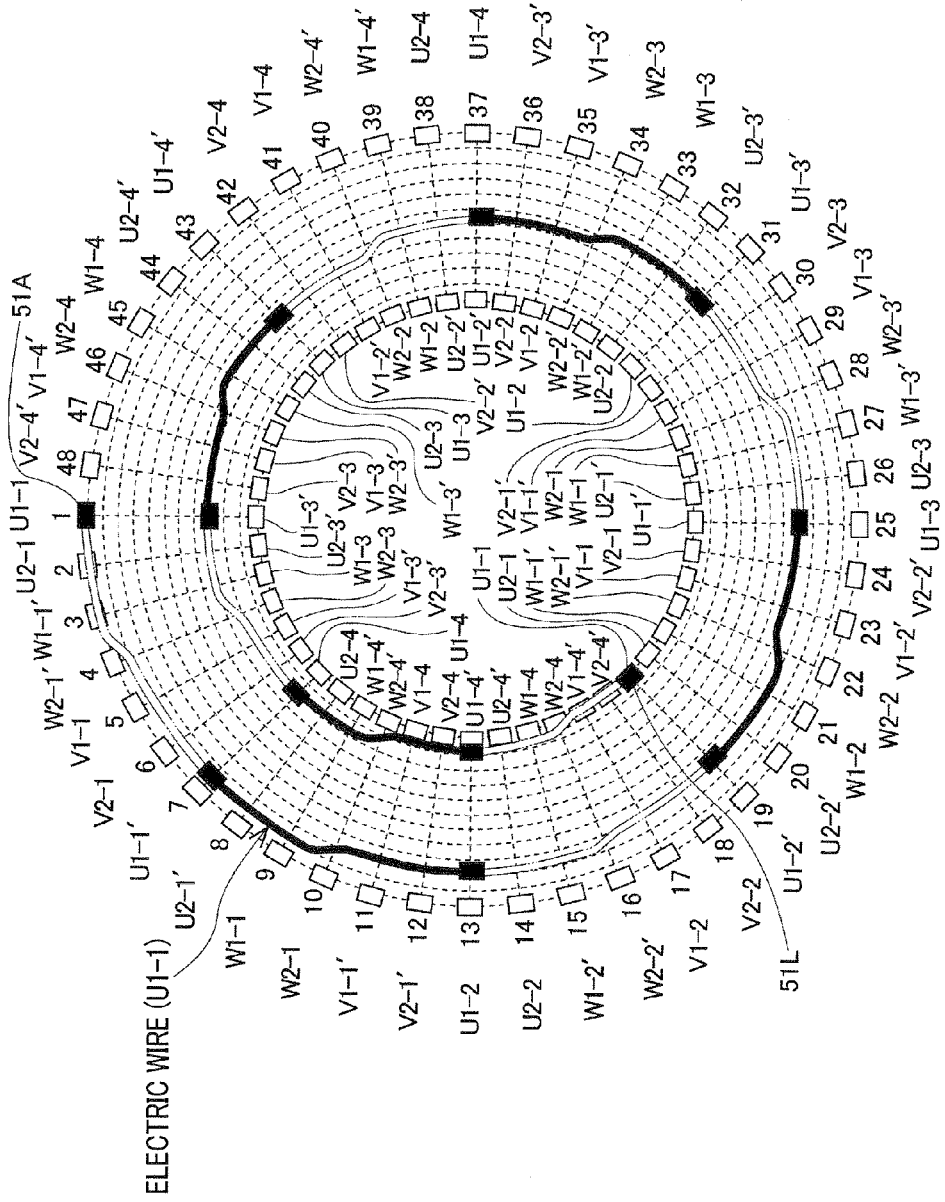
FIG. 14 is a schematic view illustrating the location of the radially outermost in-slot portion of each of the electric wires in the stator core.
Figure 15:
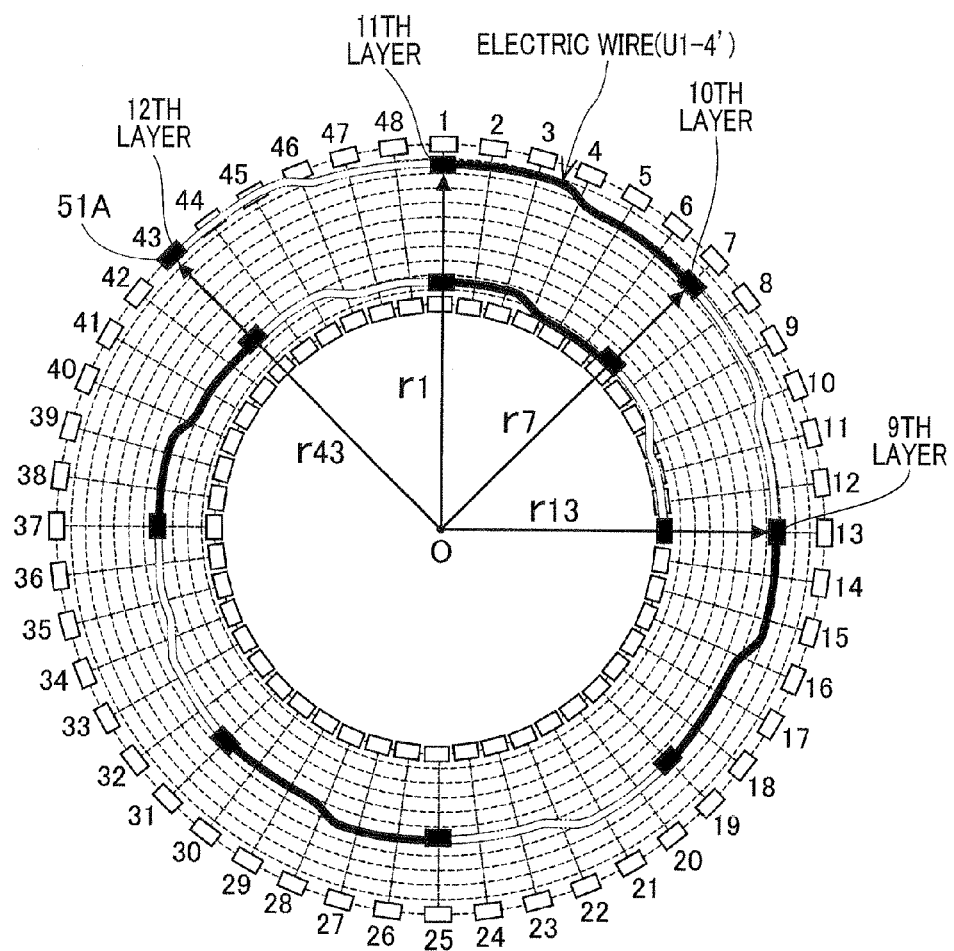
FIG. 15 is a schematic view illustrating the manner of extension of the electric wire labeled (U1-4') when viewed along the longitudinal axis O of the stator core.

In FIGS. 14 and 15, the intersections between 12 dashed-line circles and 48 radially-extending dashed lines represent the positions of the in-slot portions 51 of the electric wires 50. In addition, among the positions of the in-slot portions 51, only the radially outermost and radially-innermost ones are denoted by rectangles.

It can be seen from FIGS. 14 and 15 that in the present embodiment, in each of the slots 31 of the stator core 30, the in-slot portions 51 of the electric wires 50 are radially stacked in 12 layers.

Further, in FIGS. 14 and 15, the numbers 1-48 of the slots 31 of the stator core 30 are respectively shown radially outside the 48 radially-extending dashed lines. In addition, in FIG. 14, each of the 48 electric wires 50 is labeled radially outside the slot 31 in which the first in-slot portion 51A of the electric wire 50 is located most radially outward (i.e., located at the twelfth layer in the slot 31); each of the 48 electric wires 50 is also labeled radially inside the slot 31 in which the twelfth in-slot portion 51L of the electric wire 50 is located most radially inward (i.e., located at the first layer in the slot 31).

In the present embodiment, each of the U-phase, V-phase, and W-phase windings 43 of the stator coil 40 is formed with first and second electric wire groups each consisting of eight electric wires 50. The in-slot portions 51 of the electric wires 50 of the first group are received in eight common slots 31 of the stator core 30. Similarly, the in-slot portions 51 of the electric wires 50 of the second group are also received in another eight common slots 31 of the stator core 30. That is, the in-slot portions 51 of the electric wires 50 of the first group are received in different slots 31 from the in-slot portions 51 of the electric wires 50 of the second group.

For example, the U-phase winding 43 is formed with a first electric wire group, which consists of the electric wires 50 labeled (U1-1) to (U1-4) and (U1-1') to (U1-4'), and a second electric wire group that consists of the electric wires 50 labeled (U2-1) to (U2-4) and (U2-1') to (U2-4'). The in-slot portions 51 of the (U1-1) to (U1-4) and (U1-1') to (U1-4') electric wires 50 are received in the Nos. 1, 7, 13, 19, 25, 31, 37, and 43 slots 31 of the stator core 30. On the other hand, the in-slot portions 51 of the (U2-1) to (U2-4) and (U2-1') to (U2-4') electric wires 50 are received in the Nos. 2, 8, 14, 20, 26, 32, 38, and 44 slots 31 of the stator core 30.

FIG. 14 illustrates, from one axial side of the stator core 30, the arrangement of each of the 48 electric wires 50 by taking the (U1-1) electric wire 50 as an example. Specifically, in FIG. 14, the positions of the in-slot portions 51 of the (U1-1) electric wire 50 are denoted by black rectangles; those of the turn portions 52 of the (U1-1) electric wire 50 which are located on the one axial side of the stator core 30 (i.e., on the front side of the paper surface of FIG. 14) are denoted by circumferentially-extending heavy lines; and those of the turn portions 52 of the (U1-1) electric wire 50 which are located on the other axial side of the stator core 30 (i.e., on the rear side of the paper surface of FIG. 14) are denoted by circumferentially-extending two-dot dashed lines. As seen from FIG. 14, for the (U1-1) electric wire 50, the first in-slot portion 51A is located at the twelfth layer (i.e., the radially outermost layer) in the No. 1 slot 31; the twelfth in-slot portion 51L is located at the first layer (i.e., the radially-innermost layer) in the No. 19 slot 31; the first to the twelfth in-slot portions 51A-51L are circumferentially spaced at a six-slot pitch; and the radial positions of the in-slot portions 51A-51L are successively offset radially inward by one layer each time.

FIG. 15 illustrates, from the other axial side of the stator core 30, the arrangement of each of the 48 electric wires 50 by taking the (U1-4') electric wire 50 as an example. Specifically, in FIG. 15, the positions of the in-slot portions 51 of the (U1-4') electric wire 50 are denoted by black rectangles; those of the turn portions 52 of the (U1-4') electric wire 50 which are located on the other axial side of the stator core 30 (i.e., on the front side of the paper surface of FIG. 15) are denoted by circumferentially-extending heavy lines; and those of the turn portions 52 of the (U1-4') electric wire 50 which are located on the one axial side of the stator core 30 (i.e., on the rear side of the paper surface of FIG. 15) are denoted by circumferentially-extending two-dot dashed lines. As seen from FIG. 15, for the (U1-4') electric wire 50, the first in-slot portion 51A is located at the twelfth layer in the No. 43 slot 31; the twelfth in-slot portion 51L is located at the first layer in the No. 13 slot 31; the first to the twelfth in-slot portions 51A-51L are circumferentially spaced at a six-slot pitch; and the radial positions of the in-slot portions 51A-51L are successively offset by one layer each time.

As described previously, in the present embodiment, the stator core 30 has the 48 slots 31 formed therein, while the stator coil 40 is formed with the 48 electric wires 50. The electric wires 50 are mounted on the stator core 30 so that they are offset from one another in the circumferential direction of the stator core 30 by one slot pitch of the stator core 30. Consequently, the first in-slot portions 51A of the 48 electric wires 50 are respectively located at the radially outermost layers (i.e., the twelfth layers) in the 48 slots 31; the twelfth in-slot portions 51L of the 48 electric wires 50 are respectively located at the radially-innermost layers (i.e., the first layers) in the 48 slots 31.

FIG. 16A shows both the label of the electric wire 50 located at the radially outermost layer and the label of the electric wire 50 located at the radially-innermost layer in each of the slots 31 of the stator core 30.

In the present embodiment, for each of the 48 electric wires 50 forming the stator coil 40, the radial distances from the longitudinal axis O of the stator core 30 to the in-slot portions 51 of the electric wire 50 successively decrease in the sequence from the first in-slot portion 51A to the twelfth in-slot portion 51L. Moreover, for each of the 48 electric wires 50, the difference in radial distance from the axis O of the stator core 30 between each adjacent pair of the in-slot portions 51, which are connected by a corresponding one of the turn portions 52, is equal to the radial thickness of the in-slot portions 51.

For example, referring back to FIG. 15, for the (U1-4') electric wire 50, there is satisfied the following relationship: $r43>r1>r7>r13$. Here, r43 represents the radial distance from the axis O of the stator core 30 to the first in-slot portion 51A that is located at the twelfth layer in the No. 43 slot 31; r1 represents the radial distance from the axis O to the second in-slot portion 51B that is located at the eleventh layer in the No. 1 slot 31; r7 represents the radial distance from the axis O to the third in-slot portion 51C that is located at the tenth layer in the No. 7 slot 31; and r13 represents the radial distance from the axis O to the fourth in-slot portion 51D that is located at the ninth layer in the No. 13 slot 31. Further, the radial distances r43, r1, r7, and r13 successively decrease in decrements of the radial thickness of the in-slot portions 51.

Next, with reference to FIGS. 13 and 16A-16B, the manner of serially connecting the 16 electric wires 50 for forming the V-phase winding 43 of the stator coil 40 will be described. In addition, it should be noted that the electric wires 50 for forming the U-phase and W-phase windings 43 of the stator coil 40 are also connected in the same manner as those for forming the V-phase winding 43.

As shown in FIG. 13, the V-phase winding 43 is formed by serially connecting the (V1-1) to (V1-4), (V1-1') to (V1-V4'), (V2-1) to (V2-4), and (V2-1') to (V2-4') electric wires 50.

Specifically, to the V-phase output terminal, there is connected the first in-slot portion 51A-side end of the (V1-1) electric wire 50. Moreover, as shown in FIGS. 16A-16B, for the (V1-1) electric wire 50, the first in-slot portion 51A is located at the radially outermost layer (i.e., the twelfth layer) in the No. 5 slot 31 of the stator core 30, while the twelfth in-slot portion 51L is located at the radially-innermost layer (i.e., the first layer) in the No. 23 slot 31.

To the twelfth in-slot portion 51L-side end of the (V1-1) electric wire 50, there is connected the first in-slot portion 51A-side end of the (V1-2) electric wire 50. Moreover, for the (V1-2) electric wire 50, the first in-slot portion 51A is located at the radially outermost layer in the No. 17 slot 31, while the twelfth in-slot portion 51L is located at the radially innermost layer in the No. 35 slot 31.

To the twelfth in-slot portion 51L-side end of the (V1-2) electric wire 50, there is connected the first in-slot portion 51A-side end of the (V1-3) electric wire 50. Moreover, for the (V1-3) electric wire 50, the first in-slot portion 51A is located at the radially outermost layer in the No. 29 slot 31, while the twelfth in-slot portion 51L is located at the radially innermost layer in the No. 47 slot 31.

To the twelfth in-slot portion 51L-side end of the (V1-3) electric wire 50, there is connected the first in-slot portion 51A-side end of the (V1-4) electric wire 50. Moreover, for the (V1-4) electric wire 50, the first in-slot portion 51A is located at the radially outermost layer in the No. 41 slot 31, while the twelfth in-slot portion 51L is located at the radially innermost layer in the No. 11 slot 31.

To the twelfth in-slot portion 51L-side end of the (V1-4) electric wire 50, there is connected the first in-slot portion 51A-side end of the (V2-1) electric wire 50. Moreover, for the (V2-1) electric wire 50, the first in-slot portion 51A is located at the radially outermost layer in the No. 6 slot 31, while the twelfth in-slot portion 51L is located at the radially innermost layer in the No. 24 slot 31.

To the twelfth in-slot portion 51L-side end of the (V2-1) electric wire 50, there is connected the first in-slot portion 51A-side end of the (V2-2) electric wire 50. Moreover, for the (V2-2) electric wire 50, the first in-slot portion 51A is located at the radially outermost layer in the No. 18 slot 31, while the twelfth in-slot portion 51L is located at the radially innermost layer in the No. 36 slot 31.

To the twelfth in-slot portion 51L-side end of the (V2-2) electric wire 50, there is connected the first in-slot portion 51A-side end of the (V2-3) electric wire 50. Moreover, for the (V2-3) electric wire 50, the first in-slot portion 51A is located at the radially outermost layer in the No. 30 slot 31, while the twelfth in-slot portion 51L is located at the radially innermost layer in the No. 48 slot 31.

To the twelfth in-slot portion 51L-side end of the (V2-3) electric wire 50, there is connected the first in-slot portion 51A-side end of the (V2-4) electric wire 50. Moreover, for the (V2-4) electric wire 50, the first in-slot portion 51A is located at the radially outermost layer in the No. 42 slot 31, while the twelfth in-slot portion 51L is located at the radially innermost layer in the No. 12 slot 31.

To the twelfth in-slot portion 51L-side end of the (V2-4) electric wire 50, there is connected the twelfth in-slot portion 51L-side end of the (V2-4') electric wire 50. Moreover, for the (V2-4') electric wire 50, the first in-slot portion 51A is located at the radially outermost layer in the No. 48 slot 31, while the twelfth in-slot portion 51L is located at the radially innermost layer in the No. 18 slot 31.

To the first in-slot portion 51A-side end of the (V2-4') electric wire 50, there is connected the twelfth in-slot portion 51L-side end of the (V2-3') electric wire 50. Moreover, for the (V2-3') electric wire 50, the first in-slot portion 51A is located at the radially outermost layer in the No. 36 slot 31, while the twelfth in-slot portion 51L is located at the radially innermost layer in the No. 6 slot 31.

To the first in-slot portion 51A-side end of the (V2-3') electric wire 50, there is connected the twelfth in-slot portion 51L-side end of the (V2-2') electric wire 50. Moreover, for the (V2-2') electric wire 50, the first in-slot portion 51A is located at the radially outermost layer in the No. 24 slot 31, while the twelfth in-slot portion 51L is located at the radially innermost layer in the No. 42 slot 31.

To the first in-slot portion 51A-side end of the (V2-2') electric wire 50, there is connected the twelfth in-slot portion 51L-side end of the (V2-1') electric wire 50. Moreover, for the (V2-1') electric wire 50, the first in-slot portion 51A is located at the radially outermost layer in the No. 12 slot 31, while the twelfth in-slot portion 51L is located at the radially innermost layer in the No. 30 slot 31.

To the first in-slot portion 51A-side end of the (V2-1') electric wire 50, there is connected the twelfth in-slot portion 51L-side end of the (V1-4') electric wire 50. Moreover, for the (V1-4') electric wire 50, the first in-slot portion 51A is located at the radially outermost layer in the No. 47 slot 31, while the twelfth in-slot portion 51L is located at the radially innermost layer in the No. 17 slot 31.

To the first in-slot portion 51A-side end of the (V1-4') electric wire 50, there is connected the twelfth in-slot portion 51L-side end of the (V1-3') electric wire 50. Moreover, for the (V1-3') electric wire 50, the first in-slot portion 51A is located at the radially outermost layer in the No. 35 slot 31, while the twelfth in-slot portion 51L is located at the radially innermost layer in the No. 5 slot 31.

To the first in-slot portion 51A-side end of the (V1-3') electric wire 50, there is connected the twelfth in-slot portion 51L-side end of the (V1-2') electric wire 50. Moreover, for the (V1-2') electric wire 50, the first in-slot portion 51A is located at the radially outermost layer in the No. 23 slot 31, while the twelfth in-slot portion 51L is located at the radially innermost layer in the No. 41 slot 31.

To the first in-slot portion 51A-side end of the (V1-2') electric wire 50, there is connected the twelfth in-slot portion 51L-side end of the (V1-1') electric wire 50. Moreover, for the (V1-1') electric wire 50, the first in-slot portion 51A is located at the radially outermost layer in the No. 11 slot 31, while the twelfth in-slot portion 51L is located at the radially innermost layer in the No. 29 slot 31. In addition, the first in-slot portion 51A-side end of the (V1-1') electric wire 50 is connected to the V-phase neutral terminal of the stator coil 40.

Further, as described previously, each of the electric wires 50 has the lead portion 53a formed at the first in-slot portion 51A-side end thereof and the lead portion 53b formed at the twelfth in-slot portion 51L-side end thereof (see FIGS. 11A-11B). The lead portion 53a is connected to the first in-slot portion 51A via the half-turn portion 52M, and the lead portion 53b is connected to the twelfth in-slot portion 51L via the half-turn portion 52N. The lead portion 53b also has the crossover part 59 formed therein. In the present embodiment, the connection between the electric wires 50 is made by welding corresponding pairs of the lead portions 53a and 53b of the electric wires 50.

For example, the (V1-1) electric wire 50 has the first in-slot portion 51A located at the radially outermost layer in the No. 5 slot 31 of the stator core 30 and the twelfth in-slot portion 51L located at the radially innermost layer in the No. 23 slot 31. The lead portion 53b of the (V1-1) electric wire 50 is offset, by the length of the half-turn portion 52N in the circumferential direction of the stator core 30, from the No. 23 slot 31 to the vicinity of the No. 20 slot 31. On the other hand, the (V1-2) electric wire 50 has the first in-slot portion 51A located at the radially outermost layer in the No. 17 slot 31 and the twelfth in-slot portion 51L located at the radially innermost layer in the No. 35 slot 31. The lead portion 53a of the (V1-2) electric wire 50 is offset, by the length of the half-turn portion 52M in the circumferential direction of the stator core 30, from the No. 17 slot 31 to the vicinity of the No. 20 slot 31. Further, as shown in FIGS. 6-9, the lead portion 53b of the (V1-1) electric wire 50 is bent radially outward at a substantially right angle to extend from the radially inner periphery of the stator coil 40 to the lead portion 53a of the (V1-2) electric wire 50 which is located on the radially outer periphery of the stator coil 40; then, the lead portion 53b of the (V1-1) electric wire 50 is welded to the lead portion 53a of the (V1-2) electric wire 50. In other words, the twelfth in-slot portion 51L-side end of the (V1-1) electric wire 50 is joined to the first in-slot portion 51A-side end of the (V1-2) electric wire 50 by welding.

Moreover, in the present embodiment, all of the corresponding pairs of the lead portions 53a and 53b of the electric wires 50 are welded radially outside the radially outermost turn portions 52 of the electric wires 50. To this end, each of the lead portions 53b of the electric wires 50 is configured to include the crossover part 59 that crosses over the annular axial end face of the stator coil 40 (more specifically, the annular axial end face of the coil end part 42 of the stator coil 40 which is comprised of the turn portions 52 of the electric wires 50) from the radially inside to the radially outside of the axial end face. Consequently, it is possible to reliably prevent the twelfth in-slot portions 51L of the electric wires 50, which are located most radially inward in the slots 31 of the stator core 30, from protruding radially inward. As a result, it is possible to reliably prevent the stator coil 40 from interfering with the rotor of the electric rotating machine which is located radially inside the stator 20.

Figure 8:
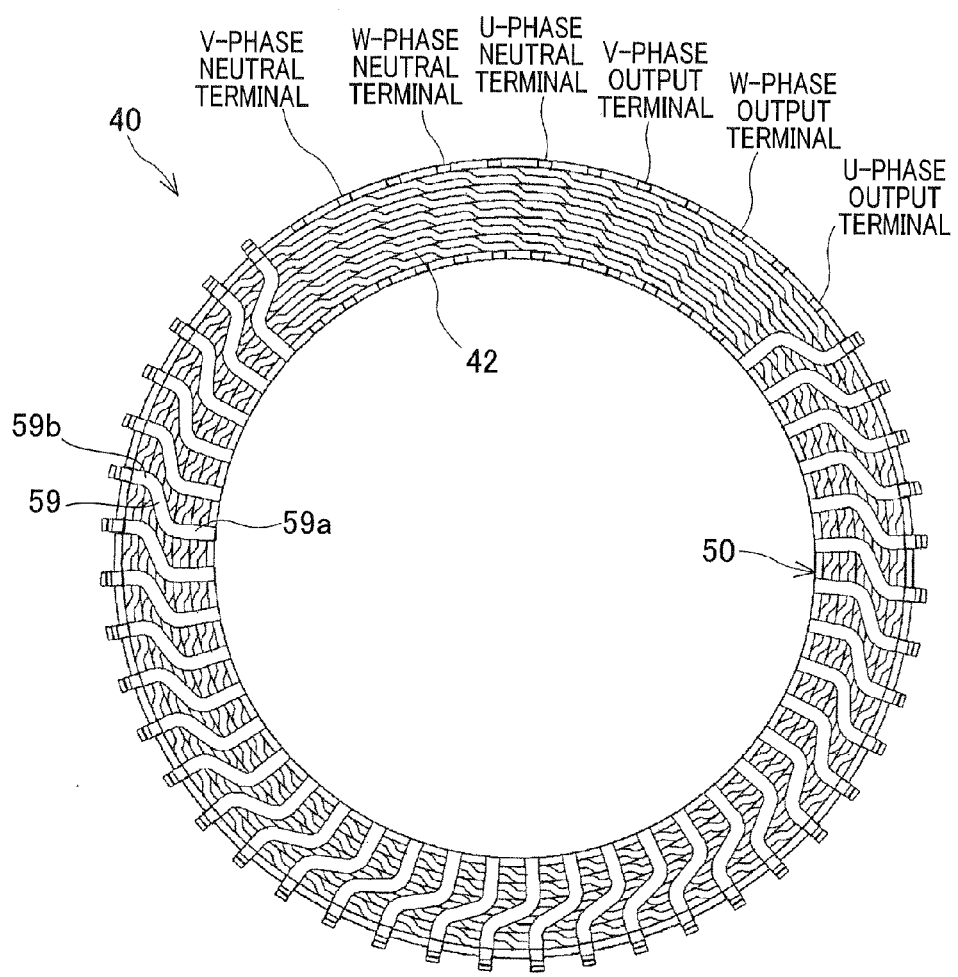
FIG. 8 is a top view of the stator coil.
Figure 9:
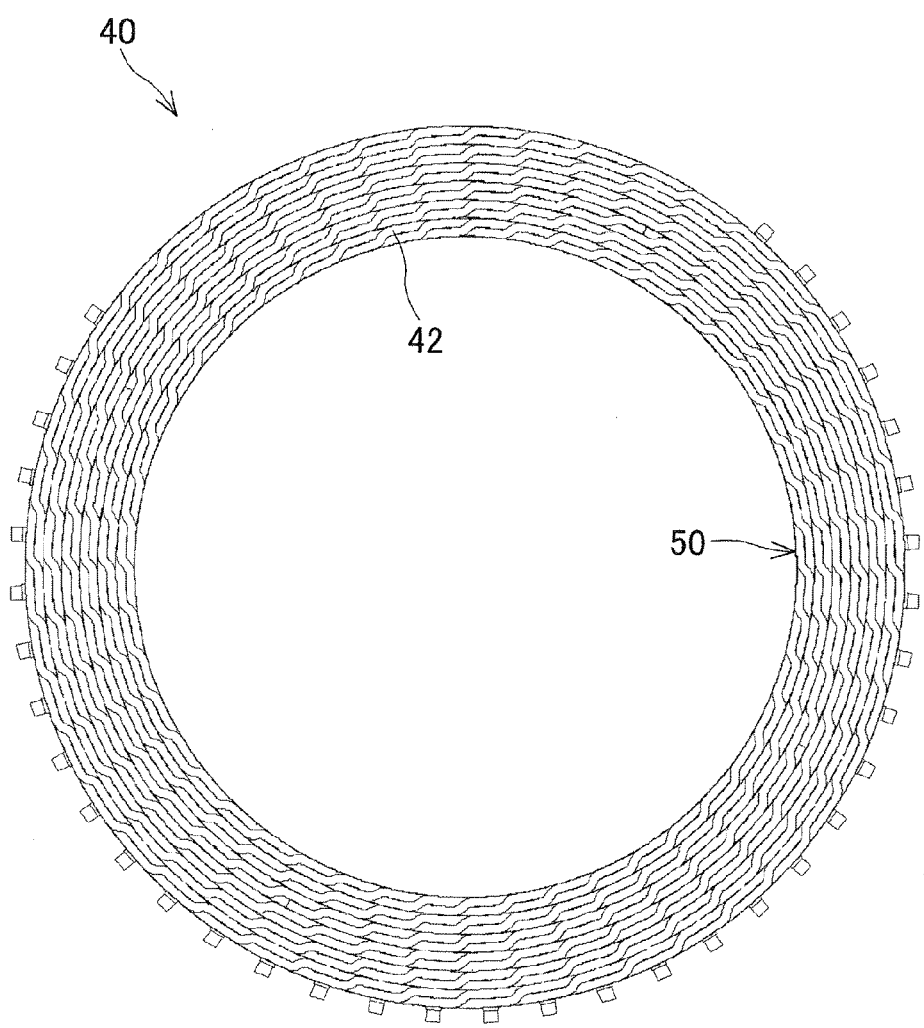
FIG. 9 is a bottom view of the stator coil.

Furthermore, in the present embodiment, as shown in FIG. 8, each of the crossover parts 59 of the electric wires 50 is crank-shaped to include a pair of radially-extending end sections 59a and 59b. With such a shape, it is possible to facilitate the bending of the lead portions 53b of the electric wires 50 for forming the crossover parts 59 and the welding of the corresponding pairs of the lead portions 53a and 53b of the electric wires 50.

Figure 6:
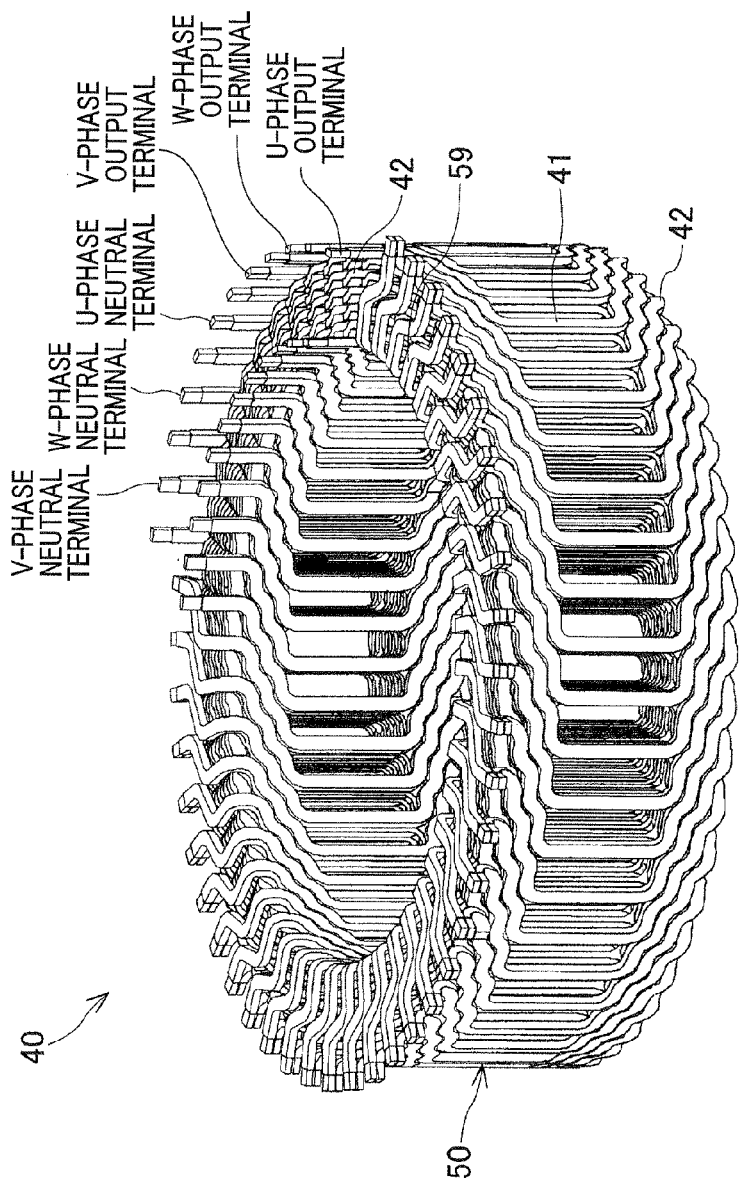
FIG. 6 is a perspective view of the stator coil.
Figure 7:
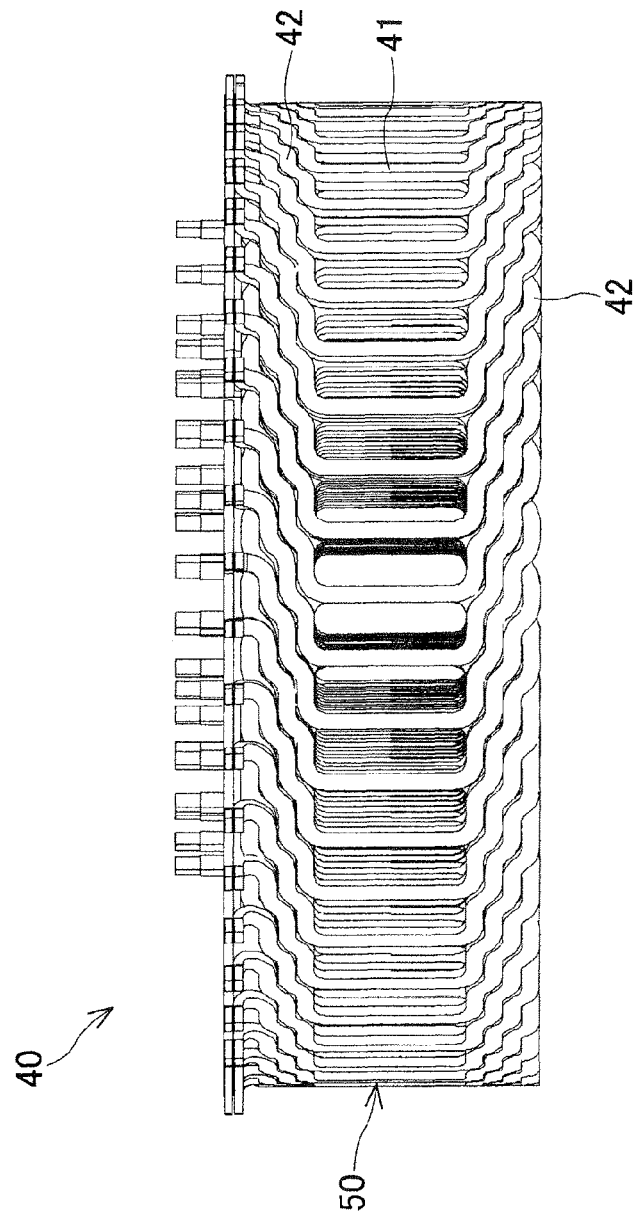
FIG. 7 is a side view of the stator coil.

In addition, as shown in FIGS. 6 and 8, on the annular axial end face of the stator coil 40, the crossover parts 59 occupy substantially ¾ of the full angular range of the axial end face; the full angular range is 360°. Further, within the remaining ¼ of the full angular range, there are sequentially arranged the V-phase neutral terminal, the W-phase output terminal, the U-phase neutral terminal, the V-phase output terminal, the W-phase neutral terminal, and the U-phase output terminal of the stator coil 40. That is, on the axial end face of the stator coil 40, the U-phase, V-phase, and W-phase output terminals are arranged in the same angular range as the U-phase, V-phase, and W-phase neutral terminals; the crossover parts 59 are arranged in a different angular range from the U-phase, V-phase, and W-phase output terminals and the U-phase, V-phase, and W-phase neutral terminals.

The stator core 30 is assembled to the above-described stator coil 40 by inserting the tooth portions 33 of the stator core segments 32 respectively into the spaces formed between the stacks of the in-slot portions 51 of the electric wires 50 from the radially outside of the stator coil 40. Consequently, each of the in-slot portions 51 of the electric wires 50 forming the stator coil 40 is received in a corresponding one of the slots 31 of the stator core 30. More specifically, for each of the electric wires 50, each adjacent pair of the in-slot portions 51 are respectively received in a corresponding pair of the slots 31 of the stator core 30 which are circumferentially spaced at a six-slot pitch. Moreover, each of the turn portions 52, which connects a corresponding pair of the in-slot portions 51, protrudes from a corresponding one of the axial end faces of the stator core 30.

Next, the method of manufacturing the stator coil 40 according to the present embodiment will be described.

Figure 17:
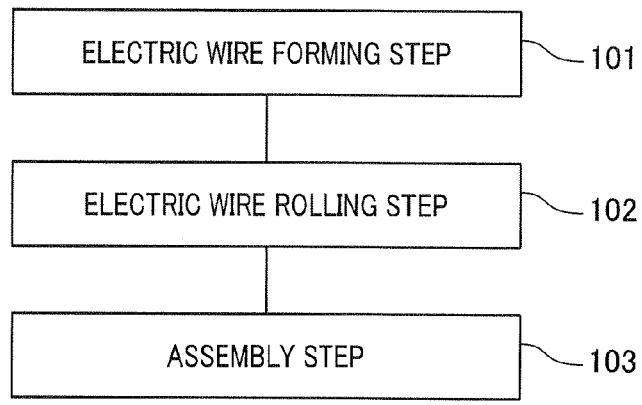
FIG. 17 is a flow chart illustrating the method of manufacturing the stator coil according to the first embodiment.

Referring to FIG. 17, in the present embodiment, the method of manufacturing the stator coil 40 includes an electric wire forming step 101, an electric wire rolling step 102 and an assembly step 103.

First, in the electric wire forming step 101, the electric wires 50 as shown in FIGS. 11A-11B are formed by shaping a plurality of (e.g., 48 in the present embodiment) electric wire materials 50a.

Figure 18:
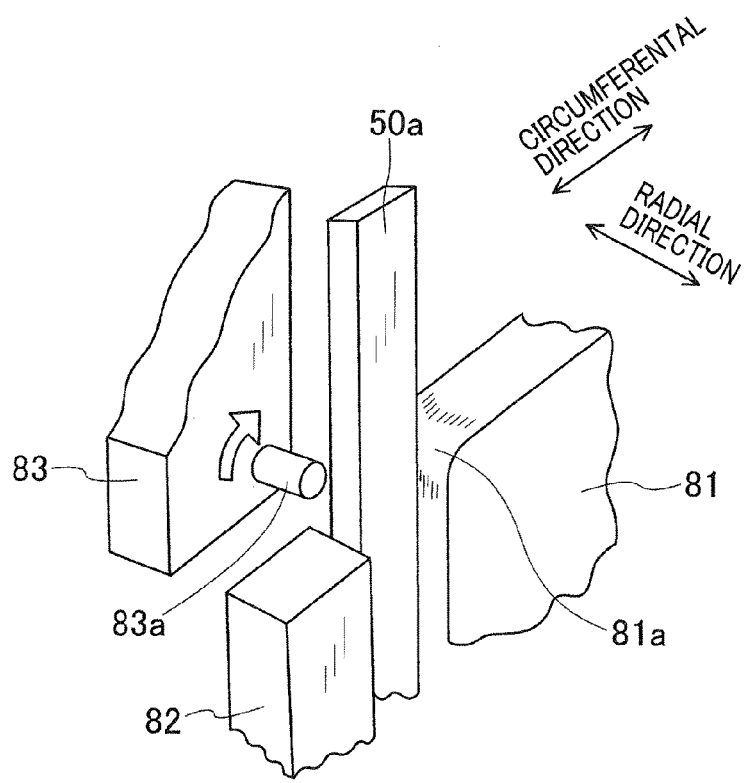
FIG. 18 is a perspective view illustrating an electric wire forming step of the method.
Figure 19A:
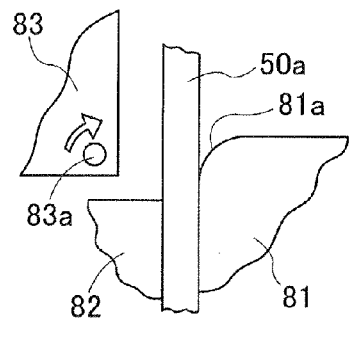
FIGS. 19A and 19B are schematic views respectively illustrating an electric wire material for forming one of the electric wires before and after being bent in the electric wire forming step.
Figure 19B:
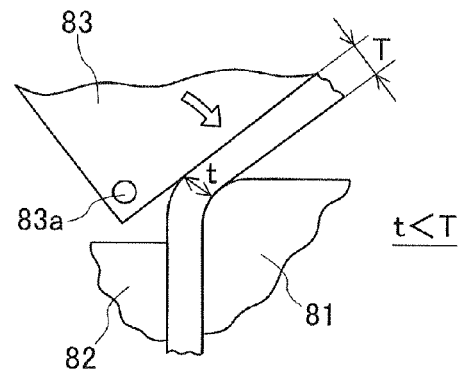

Specifically, referring to FIGS. 18 and 19A-19B, each of the electric wire materials 50a is shaped to form one of the electric wires 50 using a pair of first and second fixed jigs 81 and 82 and a rotating jig 83. The first and second fixed jigs 81 and 82 are opposed to each other so as to hold the electric wire material 50a therebetween. The rotating jig 83 is rotatably mounted to a supporting shaft 83a, so as to bend the electric wire material 50a held between the first and second fixed jigs 81 and 82 toward the first fixed jig 81. The first fixed jig 81 has a substantially right-angled corner portion 81a which makes contact with, during the bending of the electric wire material 50a, the bent portion of the electric wire material 50a. The corner portion 81a is rounded with a predetermined radius of curvature. In addition, as shown in FIG. 18, the direction in which the first and second fixed jigs 81 and 82 are opposed to each other corresponds to the circumferential direction of the stator core 30; the axis of the supporting shaft 83a, about which the rotating jig 83 is rotated, corresponds to a radial direction of the stator core 30.

More specifically, in this step, as shown in FIG. 19A, a portion of the electric wire material 50a which makes up one of the in-slot portions 51 of the electric wire 50 is first held between the first and second fixed jigs 81 and 82. Then, as shown in FIG. 19B, the rotating jig 83 is rotated about the supporting axis 83a toward the first fixed jig 81, thereby pressing the electric wire material 50a against the corner portion 81a of the first fixed jig 81. Consequently, that portion of the electric wire material 50a which adjoins the portion held between the first and second fixed jigs 81 and 82 is bent along the surface of the corner portion 81a at a substantially right angle to the portion held between the jigs 81 and 82, thereby forming a shoulder part 55 of the electric wire 50. Moreover, during the bending, a pair of bulges 57, which are shown in FIG. 12A but omitted from FIG. 19B, are respectively formed on the radial end faces (i.e., the surfaces parallel to the paper surface of FIG. 19B) of the bend. The bulges 57 are positioned closer to the inside than the outside of the bend and protrude from the portion of the electric wire material 50a held between the first and second fixed jigs 81 and 82 radially inward and radially outward, respectively. In addition, as shown in FIG. 19B, the width of the electric wire material 50a is reduced at the bend from an initial value T to a smaller value t due to the formation of the bulges 57.

Further, in this step, by repeatedly operating the jigs 81-83 in the same manner as described above for that portion of the electric wire material 50*a* which adjoins the just-formed shoulder part 55, a shoulder part 56 is obtained with a bend formed between the shoulder parts 55 and 56. Moreover, a pair of bulges 58 are shown in FIG. 12A are respectively formed on the radial end faces of the bend. The bulges 58 are positioned closer to the inside than the outside of the bend and protrude from that portion of the electric wire material 50*a* which makes up the in-slot portion 51 of the electric wire 50.

Furthermore, in this step, by repeatedly operating the jigs 81-83 in the same manner as described above for each of all the electric wire materials 50*a*, planar and wave-shaped electric wires 50 which have no crank-shaped parts 54 formed in the turn portions 52 are obtained.

Thereafter, using a crank-shaping apparatus (not shown), for each of the turn portions 52 of the above-obtained electric wires 50, the crank-shaped part 54 is formed substantially at the center of the turn portion 52.

As a result, the electric wires 50 as shown in FIGS. 11A-11B are obtained.

In the electric wire rolling step 102, each of the electric wires 50 is further rolled by a predetermined number of turns into a spiral shape by plastically deforming each of the turn portions 52 of the electric wire 50 into an arc shape using a rolling apparatus (not shown).

Figure 20:
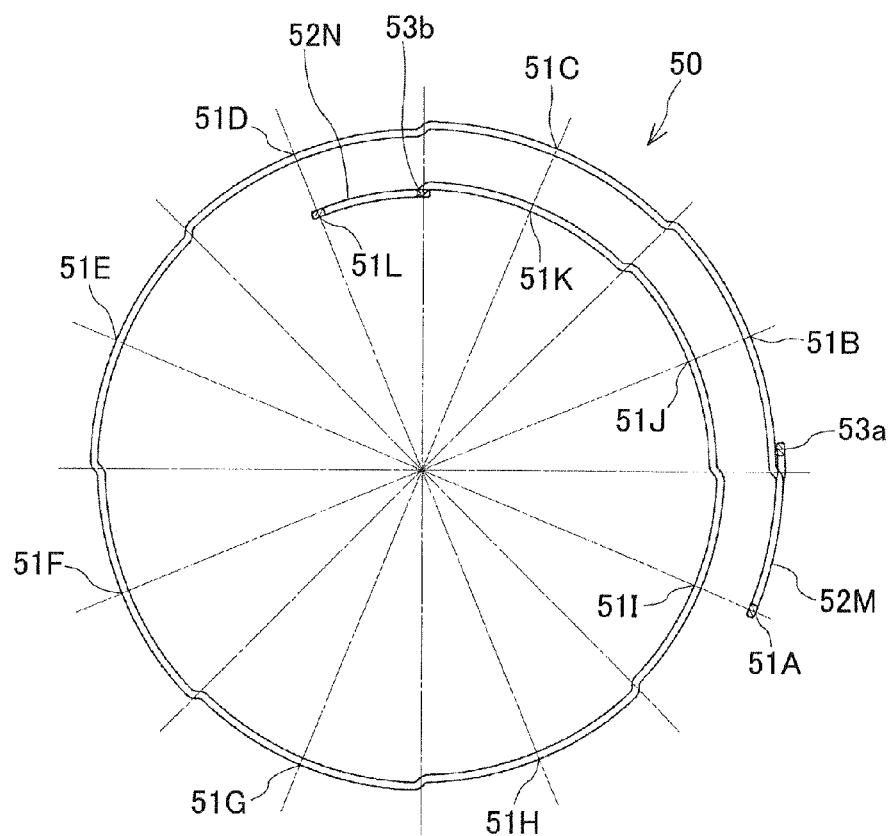
FIG. 20 is an axial view of one of the electric wires after being rolled into a spiral shape in an electric wire rolling step of the method.
Figure 21:
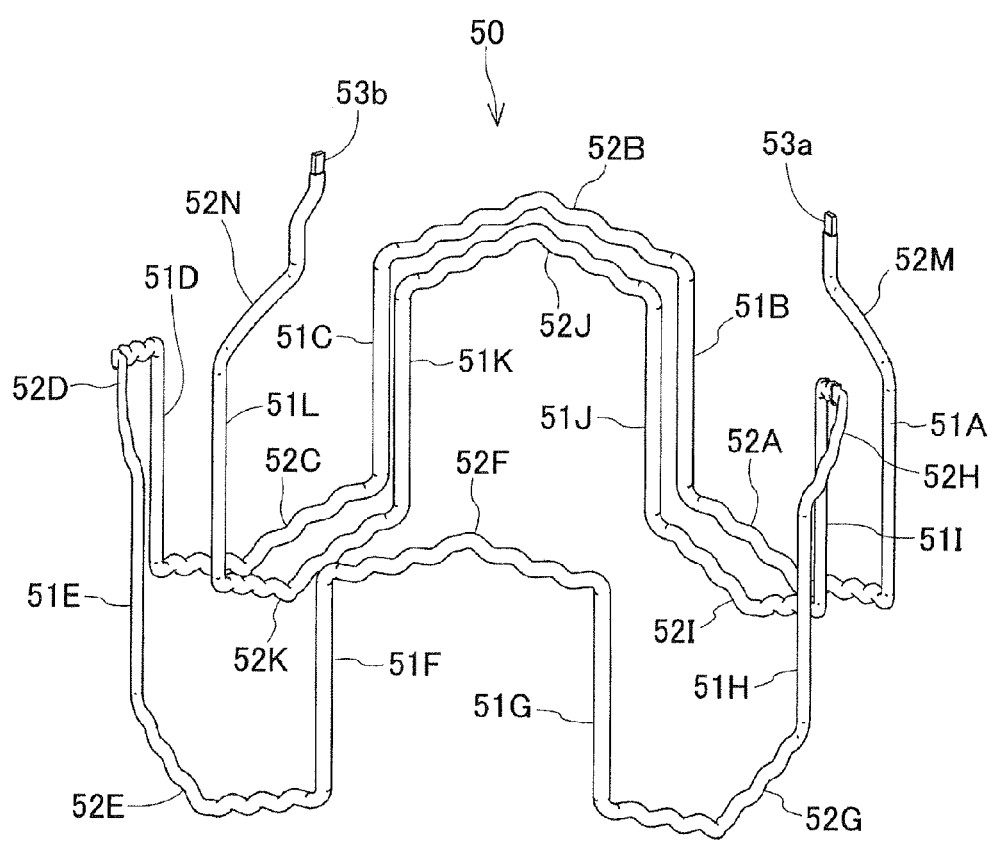
FIG. 21 is a perspective view of the rolled electric wire shown in FIG. 20.

More specifically, in the present embodiment, as shown in FIGS. 20 and 21, each of the electric wires 50 is rolled by 11/8 turns (i.e., 1.375 turns) with the twelfth in-slot portion 51L of the electric wire 50 located at the rolling start end and the first in-slot portion 51A of the electric wire 50 located at the rolling finish end. Consequently, in the rolled electric wire 50, a rolling start-side end portion and a rolling finish-side end portion of the electric wire 50 radially overlap each other for an angular range corresponding to ⅜ turn. The rolling start-side end portion is positioned radially inside of the rolling finish-side end portion. Further, the rolling start-side end portion includes the ninth to the twelfth in-slot portions 51I-51L, while the rolling finish-side end portion includes the first to the fourth in-slot portions 51A-51D. Accordingly, the circumferential distances between adjacent pairs of the in-slot portions 51 are smaller in the rolling start-side end portion than in the rolling finish-side end portion. Furthermore, the in-slot portions 51I-51L included in the rolling start-side end portion are respectively in radial alignment with the in-slot portions 51A-51D included in the rolling finish-side end portion.

In addition, the predetermined number of turns, by which each of the electric wires 50 is rolled, is not limited to 11/8 and may be suitably set to other values according to the design specification of the stator coil 40.

Figure 28:
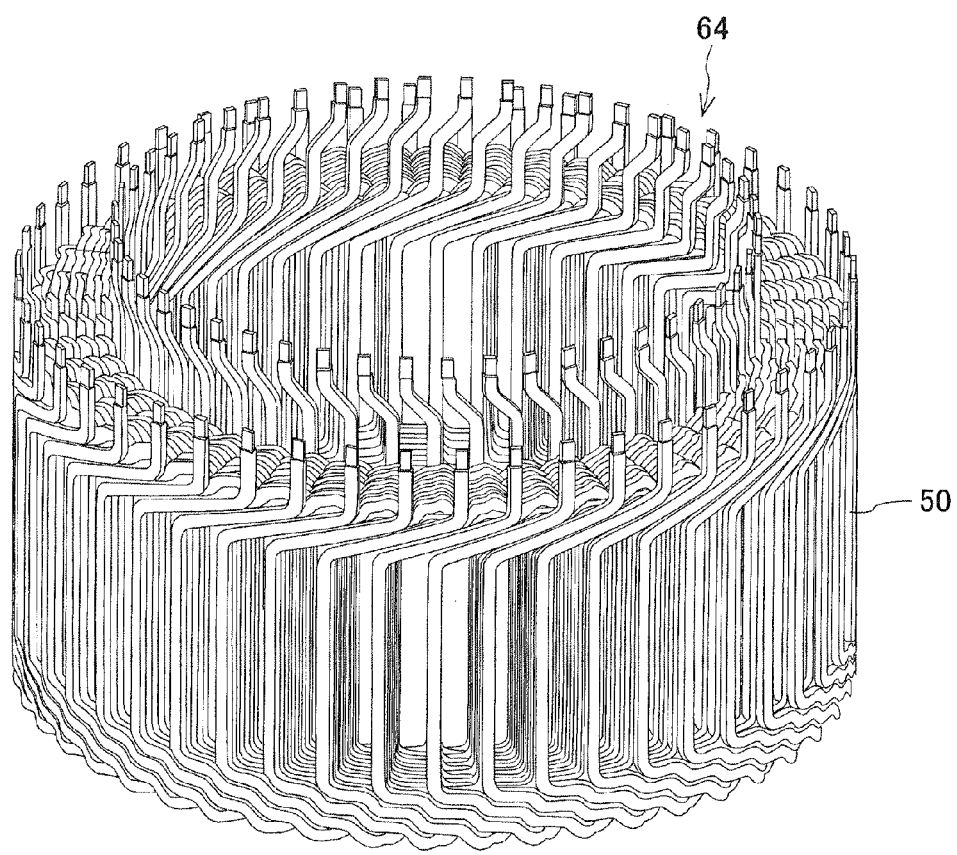
FIG. 28 is a perspective view of a final electric wire assembly obtained at the end of the assembly step.

In the subsequent assembly step 103, the 48 rolled electric wires 50 are assembled together through relative axial movements therebetween, thereby forming a final electric wire assembly 64 as shown in FIG. 28.

Specifically, in this step, the final electric wire assembly 64 is formed by sequentially performing a plurality of assembly processes. In each of the assembly processes, a first component 61 and a second component 62 are assembled in four stages as shown in FIGS. 23A-23D.

More specifically, each of the first and second components 61 and 62 is made up of either one of the rolled electric wires 50 or an electric wire sub-assembly 63 that is comprised of a plurality of the rolled electric wires 50. The first and second components 61 and 62 are assembled, by axially moving the second component 62 relative to the first component 61 with both the first and second components 61 and 62 radially elastically deformed, to form a new electric wire sub-assembly 63. The number of the rolled electric wires 50 included in the new electric wire sub-assembly 63 is equal to the sum of the numbers of the rolled electric wires 50 included in the first and second components 61 and 62.

Accordingly, in the present embodiment, there are four different types of the assembly processes. The first type is such that each of the first and second components 61 and 62 is made up of only one of the rolled electric wires 50. The second type is such that the first component 61 is made up of an electric wire sub-assembly 63 comprised of a plurality of the rolled electric wires 50 while the second component 62 is made up of only one of the rolled electric wires 50. The third type is such that the first component 61 is made up of only one of the rolled electric wires 50 while the second component 62 is an electric wire sub-assembly 63 comprised of a plurality of the rolled electric wires 50. The fourth type is such that each of the first and second components 61 and 62 is made up of an electric wire sub-assembly 63 comprised of a plurality of the rolled electric wires 50.

Figure 22A:
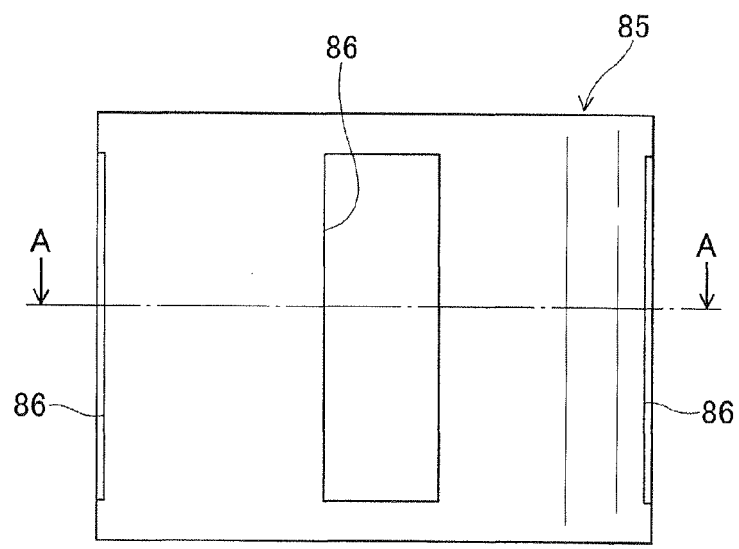
FIG. 22A is a side view of a volute jig used in an assembly step of the method.
Figure 22B:
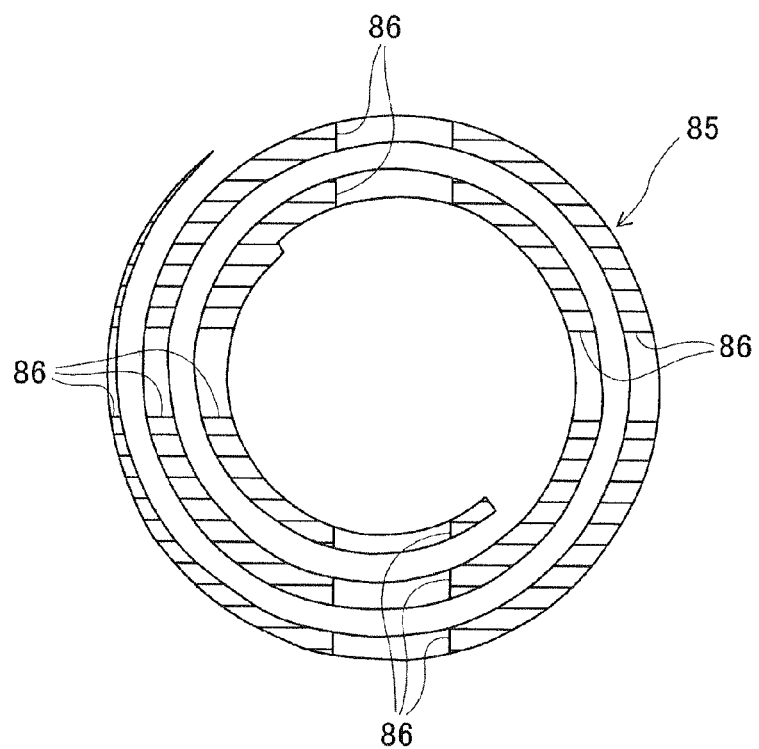
FIG. 22B is a cross-sectional view taken along the line A-A in FIG. 22A.

In the present embodiment, a pair of volute jigs (or helical jigs) 85 is used to radially elastically deform both the first and second components 61 and 62. As shown in FIGS. 22A-22B, each of the volute jigs 85 is shaped so that when viewed along the axial direction of the volute jig 85 (i.e., the direction perpendicular to the paper surface of FIG. 22B), the volute jig 85 spirally extends by, for example, about 2.5 turns. Into the spaces between radially-facing pairs of the interior surfaces of the volute jig 85, a corresponding one of the first and second components 61 and 62 can be axially inserted.

Moreover, in the present embodiment, each of the volute jigs 85 is configured so that the volute jig 85 can be enlarged overall in diameter by increasing the radius of a radially-outer end portion of the volute jig 85 while keeping the radius of a radially-inner end portion of the volute jig 85 unchanged. In addition, during the overall enlargement in diameter of the volute jig 85, the radially-inner end portion of the volute jig 85 may be circumferentially moved without changing the radius of the radially-inner end portion.

Consequently, by enlarging the volute jigs 85 overall in diameter, it is possible to enlarge the first and second components 61 and 62 respectively inserted in the volute jigs 85 overall in diameter to have a desired radial size. Moreover, a first controller (not shown) is provided to control the operation and amount of enlarging the volute jigs 85 in diameter.

In addition, each of the volute jigs 85 may also be configured so that the volute jig 85 can be reduced overall in diameter by decreasing the radius of the radially-inner end portion of the volute jig 85 while keeping the radius of the radially-outer end portion of the volute jig 85 unchanged.

In the present embodiment, each of the volute jigs 85 has a plurality of windows 86 formed at four different circumferential (or angular) positions. More specifically, as shown in FIG. 22B, each of the windows 86 is formed in a wall portion of the volute jig 85 so as to radially penetrate the wall portion. Further, at each of the four circumferential positions, there are radially aligned two or three windows 86. Moreover, as shown in FIG. 22A, each of the windows 86 has a rectangular shape with its longitudinal direction parallel to the axial direction of the volute jig 85.

The windows 86 are provided in the volute jigs 85 so that during the assembly processes, positioning members 90 can be radially inserted in the windows 86, thereby circumferential positioning the first and second components 61 and 62 inserted in the spaces between the radially-facing pairs of the interior surfaces of the volute jigs 85. Further, at each of the four circumferential positions, there are arranged a plurality (e.g., six in the present embodiment) of positioning members 90 so as to be spaced from one another in the axial direction of the volute jigs 85. In addition, the positioning members 90 are controlled by a second controller (not shown) so that they can be radially advanced and retreated severally.

More specifically, referring to FIGS. 24A-27F, for one of the two volute jigs 85 (to be referred to as first volute jig 85A hereinafter), there are provided four pairs of first and second positioning members 90a and 90b. Each pair of the first and second positioning members 90a and 90b is located at one of the four circumferential positions where the windows 86 of the first volute jig 85A is formed. Moreover, for each of the four pairs, the first and second positioning members 90a and 90b of the pair are axially spaced from each other by a predetermined distance. On the other hand, for the other volute jig 85 (to be referred to as second volute jig 85B hereinafter), there are provided four sets of third to sixth positioning members 90c, 90d, 90e and 90f. Each set of the third to the sixth positioning members 90c-90f is located at one of the four circumferential positions where the windows 86 of the second volute jig 85B is formed. Moreover, for each of the four sets, the third to the sixth positioning members 90c-90f of the set are axially spaced from one another at predetermined intervals.

It should be noted that in each of FIGS. 24A-27F, the vertical direction represents the axial direction of the first and second volute jigs 85A and 85B (or the axial direction of the first and second components 61 and 62) and the horizontal direction represents a radial direction of the first and second volute jigs 85A and 85B (or a radial direction of the first and second components 61 and 62). Accordingly, the circumferential direction of the first and second volute jigs 85A and 85B (or the circumferential direction of the first and second components 61 and 62) is perpendicular to the paper surface of each of FIGS. 24A-27F. Moreover, it also should be noted that for the sake of simplicity, only part of the first and second volute jigs 85A and 85B and only part of the first and second components 61 and 62 are shown in each of FIGS. 24A-27F.

In the present embodiment, the positioning members 90a-90f are, for example, substantially wedge-shaped so as to be inserted into the spaces between the corresponding circumferentially-adjacent in-slot portions 51 of the rolled electric wires 50 of the first and second components 61 and 62.

In addition, the second volute jig 85B has a radial thickness that is set to be greater than or equal to (n+1) times the radial thickness of the rolled electric wires 50, where n is the number of layers in which the rolled electric wires 50 of the second component 2 are radially stacked.

In the present embodiment, in the assembly step 103, 24 first-level assembly processes are first performed in each of which a first component 61 made up of one of the 48 rolled electric wires 50 and a second component 62 made up of another one of the 48 rolled electric wires 50 are assembled together to form a first electric wire sub-assembly 63. Consequently, a total of 24 first electric wire sub-assemblies 63 are obtained each of which is comprised of two rolled electric wires 50.

Then, eight second-level assembly processes are performed in each of which a first component 61 made up of one of the 24 first electric wire sub-assemblies 63 and a second component 62 made up of another one of the 24 first electric wire sub-assemblies 63 are assembled together to form a second electric wire sub-assembly 63. Consequently, a total of eight second electric wire sub-assemblies 63 are obtained each of which is comprised of four rolled electric wires 50.

Next, eight third-level assembly processes are performed in each of which a first component 61 made up of one of the remaining eight first electric wire sub-assembly 63 and a second component 62 made up of one of the eight second electric wire sub-assemblies 63 are assembled together to form a third electric wire sub-assembly 63. Consequently, a total of eight third electric wire sub-assemblies 63 are obtained each of which is comprised of six rolled electric wires 50.

Then, four fourth-level assembly processes are performed in each of which a first component 61 made up of one of the eight third electric wire sub-assemblies 63 and a second component 62 made up of another one of the eight third electric wire sub-assemblies 63 are assembled together to form a fourth electric wire sub-assembly 63. Consequently, a total of four fourth electric wire sub-assemblies 63 are obtained each of which is comprised of 12 rolled electric wires 50.

Thereafter, two fifth-level assembly processes are performed in each of which a first component 61 made up of one of the four fourth electric wire sub-assemblies 63 and a second component 62 made up of another one of the four fourth electric wire sub-assemblies 63 are assembled together to form a fifth electric wire sub-assembly 63. Consequently, a total of two fifth electric wire sub-assemblies 63 are obtained each of which is comprised of 24 rolled electric wires 50.

Finally, a sixth-level assembly process is performed in which a first component 61 made up of one of the two fifth electric wire sub-assemblies 63 and a second component 62 made up of the other fifth electric wire sub-assembly 63 are assembled together to form the final electric wire assembly 64 as shown in FIG. 28. Consequently, the final electric wire assembly 64 is comprised of all the 48 rolled electric wires 50.

Hereinafter, for the sake of avoiding redundancy, among all of the first-level to the sixth-level assembly processes, only one of the fourth-level assembly processes will be described in detail with reference to FIGS. 23A-27F.

In the fourth-level assembly process, each of the first and second components 61 and 62 is made up of one of the third electric wire sub-assemblies 63. The first and second components 61 and 62 are assembled, in four stages as shown in FIGS. 23A-23D, to form the fourth electric wire sub-assembly 63 that is comprised of 12 rolled electric wires 50.

Referring to FIG. 23A, in the first stage of the assembly process, the first component 61 is inserted into the spaces between the radially-facing pairs of the interior surfaces of the first volute jig 85A, thereby being mounted to the first volute jig 85A. The first volute jig 85A is arranged above the second volute jig 85B so as to be coaxial with the second volute jig 85B. Further, under control of the first controller, both the first and second volute jigs 85A and 85B are enlarged overall in diameter to have the same radial size and adjusted to have the same circumferential phase. Consequently, with the enlargement in diameter of the first volute jig 85A, the first component 61 mounted to the first volute jig 85A is also enlarged overall in diameter to have a predetermined radial size.

Then, as shown in FIG. 24A, under control of the second controller, the first and second positioning members 90a and 90b are radially advanced into the spaces between the corresponding circumferentially-adjacent in-slot portions 51 of the rolled electric wires 50 of the first component 61 via the windows 86 of the first volute jig 85A, thereby circumferentially positioning the rolled electric wires 50 of the first component 61.

Referring to FIG. 23B, in the second stage of the assembly process, the first component 61 is axially moved with the rolled electric wires 50 of the first component 61 being circumferentially positioned by the first to the sixth positioning members 90a-90f, thereby being transferred from the first volute jig 85A to the second volute jig 85B.

More specifically, after completion of the first stage (see FIG. 24A), under control of the second controller, the first positioning members 90a are radially retreated out of the spaces between the corresponding circumferentially-adjacent in-slot portions 51 of the rolled electric wires 50 of the first component 61, as shown in FIG. 24B. Consequently, the first positioning members 90a are disabled from circumferentially positioning the rolled electric wires 50 of the first component 61.

Then, as shown in FIG. 24C, with the rolled electric wires 50 of the first component 61 circumferentially positioned by the second positioning members 90b, the first component 61 is pressed downward by a first pressing member 89A, thereby being moved downward by a predetermined distance. Consequently, a part of the first component 61 is extruded from the first volute jig 85A and inserted into the spaces between the radially-facing pairs of the interior surfaces of the second volute jig 85B.

Next, as shown in FIG. 24D, under control of the second controller, the third positioning members 90c are radially advanced into the spaces between the corresponding circumferentially-adjacent in-slot portions 51 of the rolled electric wires 50 of the first component 61. Consequently, the rolled electric wires 50 of the first component 61 are circumferentially positioned by both the second positioning members 90b and the third positioning members 90c.

Then, as shown in FIG. 24E, under control of the second controller, the second positioning members 90b are radially retreated out of the spaces between the corresponding circumferentially-adjacent in-slot portions 51 of the rolled electric wires 50 of the first component 61. Consequently, the second positioning members 90b are disabled from circumferentially positioning the rolled electric wires 50 of the first component 61.

Thereafter, as shown in FIG. 24F, with the rolled electric wires 50 of the first component 61 circumferentially positioned by the third positioning members 90c, the first component 61 is further pressed downward by the first pressing member 89A, thereby being further moved downward by the predetermined distance. Consequently, a further part of the first component 61 is extruded from the first volute jig 85A and inserted into the spaces between the radially-facing pairs of the interior surfaces of the second volute jig 85B.

Next, as shown in FIG. 24G, under control of the second controller, the fourth positioning members 90d are radially advanced into the spaces between the corresponding circumferentially-adjacent in-slot portions 51 of the rolled electric wires 50 of the first component 61. Consequently, the rolled electric wires 50 of the first component 61 are circumferentially positioned by both the third positioning members 90c and the fourth positioning members 90d.

Then, as shown in FIG. 24H, under control of the second controller, the third positioning members 90c are radially retreated out of the spaces between the corresponding circumferentially-adjacent in-slot portions 51 of the rolled electric wires 50 of the first component 61. Consequently, the third positioning members 90c are disabled from circumferentially positioning the rolled electric wires 50 of the first component 61.

Figures 25A, 25B, 25C, 25D, 25E:
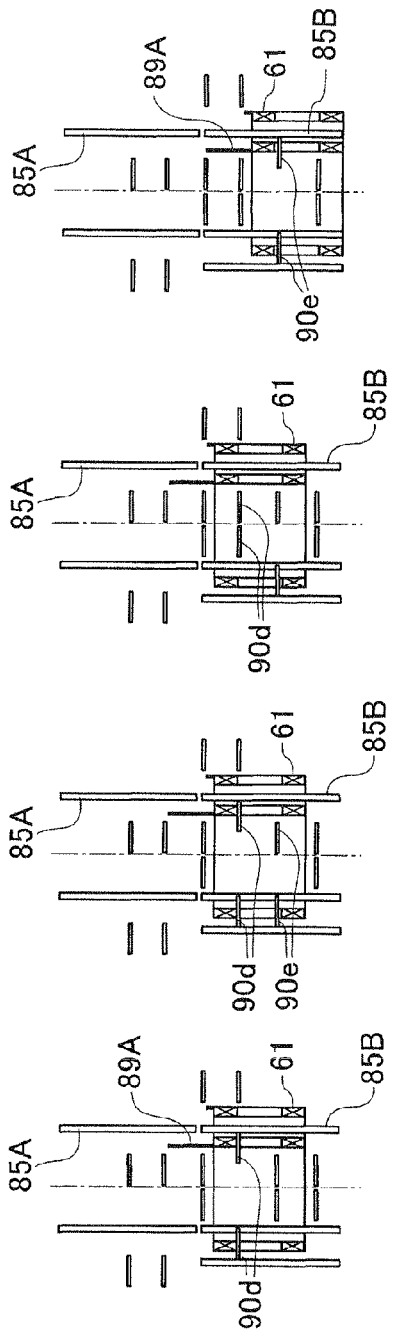
FIGS. 25A-25E are schematic views illustrating the remaining part of the second stage of the assembly process.

Thereafter, as shown in FIG. 25A, with the rolled electric wires 50 of the first component 61 circumferentially positioned by the fourth positioning members 90d, the first component 61 is further pressed downward by the first pressing member 89A, thereby being further moved downward by the predetermined distance. Consequently, all the part of the first component 61 having remained in the first volute jig 85A is extruded from the first volute jig 85A and inserted into the spaces between the radially-facing pairs of the interior surfaces of the second volute jig 85B. That is, the entire first component 61 is transferred from the first volute jig 85A to the second volute jig 85B.

Next, as shown in FIG. 25B, under control of the second controller, the fifth positioning members 90e are radially advanced into the spaces between the corresponding circumferentially-adjacent in-slot portions 51 of the rolled electric wires 50 of the first component 61. Consequently, the rolled electric wires 50 of the first component 61 are circumferentially positioned by both the fourth positioning members 90d and the fifth positioning members 90e.

Then, as shown in FIG. 25C, under control of the second controller, the fourth positioning members 90d are radially retreated out of the spaces between the corresponding circumferentially-adjacent in-slot portions 51 of the rolled electric wires 50 of the first component 61. Consequently, the fourth positioning members 90d are disabled from circumferentially positioning the rolled electric wires 50 of the first component 61.

Thereafter, as shown in FIG. 25D, with the rolled electric wires 50 of the first component 61 circumferentially positioned by the fifth positioning members 90e, the first component 61 is further pressed downward by the first pressing member 89A, thereby being further moved downward by the predetermined distance to the lower end of the second volute jig 85B.

Next, as shown in FIG. 25E, under control of the second controller, the sixth positioning members 90f are radially advanced into the spaces between the corresponding circumferentially-adjacent in-slot portions 51 of the rolled electric wires 50 of the first component 61. Consequently, the rolled electric wires 50 of the first component 61 are circumferentially positioned by both the fifth positioning members 90e and the sixth positioning members 90f. Then, the second stage (see FIG. 23B) of the assembly process is completed.

Referring back to FIG. 23C, in the third stage of the assembly process, the second component 62 is inserted into the spaces between the radially-facing pairs of the interior surfaces of the first volute jig 85A, thereby being mounted to the first volute jig 85A. Further, under control of the first controller, the first volute jig 85A is enlarged overall in diameter so as to have a predetermined radial size and adjusted to have an opposite circumferential phase to the second volute jig 85B. In other words, the difference in circumferential phase between the first and second volute jigs 85A and 85B is equal to 180°. Thus, the first volute jig 85A does not overlap the second volute jig 85B in the axial direction of the first and second volute jigs 85A and 85B that are coaxial with each other. Consequently, with the enlargement in diameter of the first volute jig 85A, the second component 62 mounted to the first volute jig 85A is also enlarged overall in diameter to have a predetermined radial size. Moreover, with the difference in circumferential phase between the first and second volute jigs 85A and 85B equal to 180°, the second component 62 overlaps the second volute jig 85B in the axial direction.

Figure 26D:
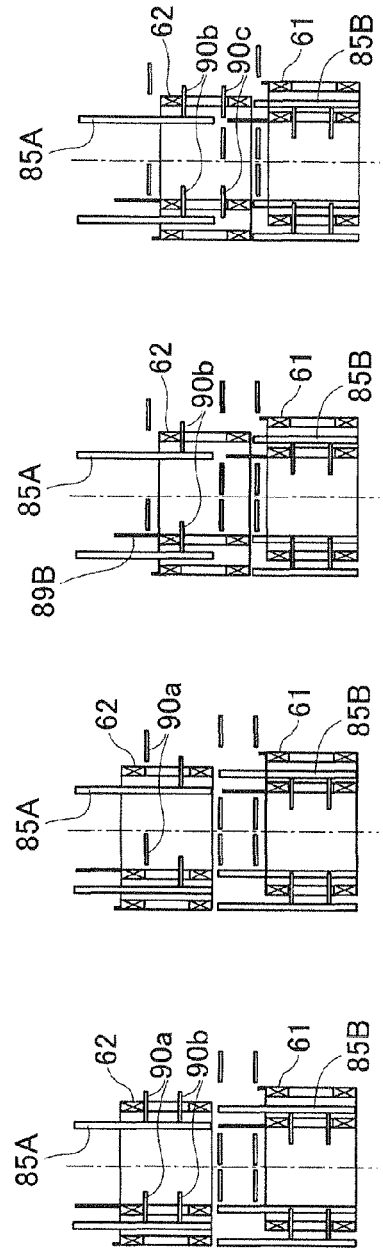
FIGS. 26A-26H are schematic views illustrating the third stage and part of the fourth stage of the assembly process.
Figure 26C:
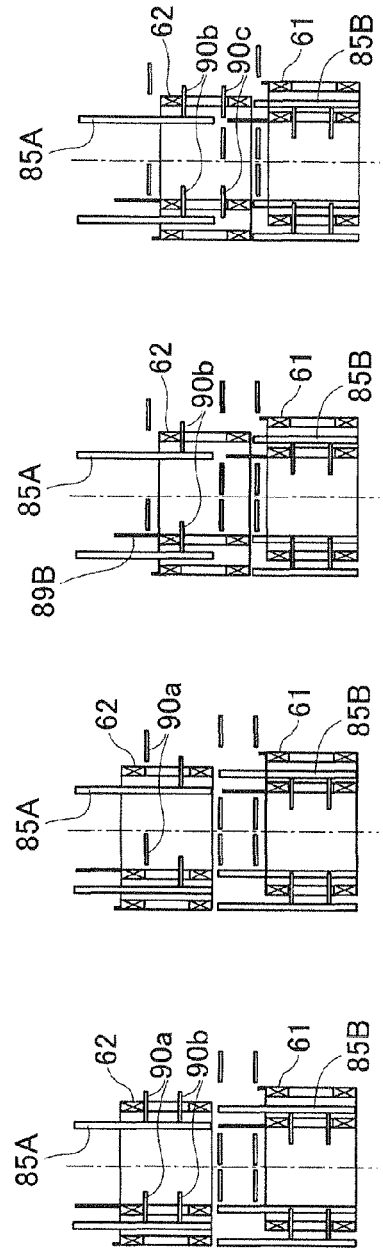
Figure 26B:
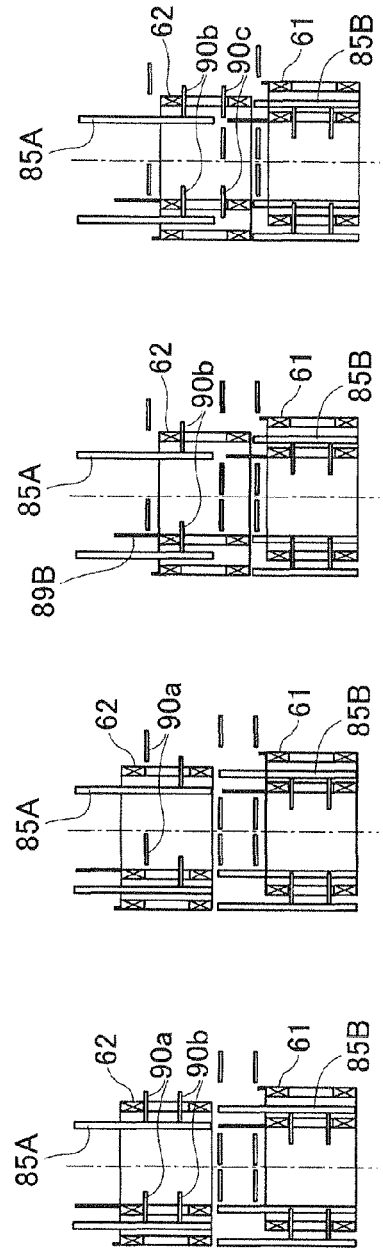
Figure 26A:
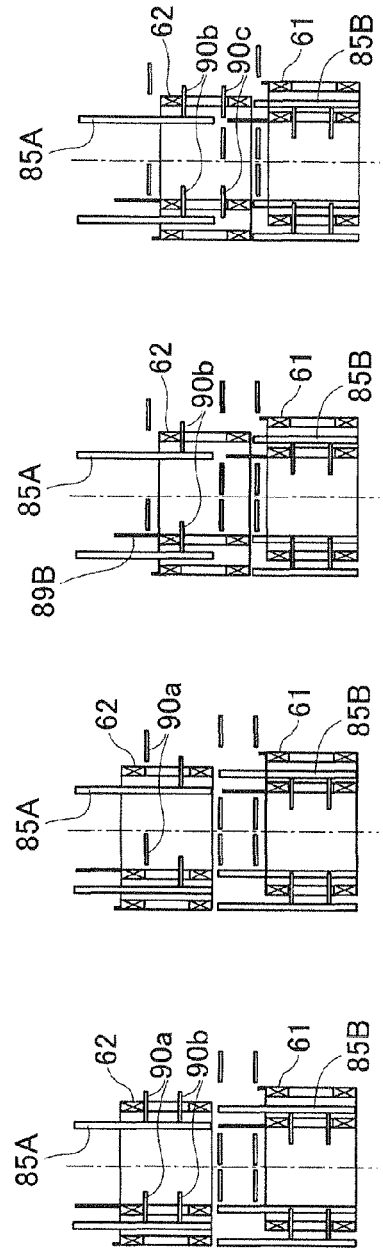

Then, as shown in FIG. 26A, under control of the second controller, the first and second positioning members 90a and 90b are radially advanced into the spaces between the corresponding circumferentially-adjacent in-slot portions 51 of the rolled electric wires 50 of the second component 62 via the windows 86 of the first volute jig 85A, thereby circumferentially positioning the rolled electric wires 50 of the second component 62.

Referring to FIG. 23D, in the fourth stage of the assembly process, the second component 62 is axially moved with the rolled electric wires 50 of the second component 62 being circumferentially positioned by the first to the sixth positioning members 90a-90f, thereby being assembled to the first component 61.

More specifically, after completion of the third stage (see FIG. 26A), under control of the second controller, the first positioning members 90a are radially retreated out of the spaces between the corresponding circumferentially-adjacent in-slot portions 51 of the rolled electric wires 50 of the second component 62, as shown in FIG. 26B. Consequently, the first positioning members 90a are disabled from circumferentially positioning the rolled electric wires 50 of the second component 62.

Then, as shown in FIG. 26C, with the rolled electric wires 50 of the second component 62 circumferentially positioned by the second positioning members 90b, the second component 62 is pressed downward by a second pressing member 89B, thereby being moved downward by a predetermined distance. Consequently, a part of the second component 62 is extruded from the first volute jig 85A, displacing the second volute jig 85B downward by the predetermined distance.

Next, as shown in FIG. 26D, under control of the second controller, the third positioning members 90c are radially advanced into the spaces between the corresponding circumferentially-adjacent in-slot portions 51 of the rolled electric wires 50 of the second component 62. Consequently, the rolled electric wires 50 of the second component 62 are circumferentially positioned by both the second positioning members 90b and the third positioning members 90c.

Figure 26H:
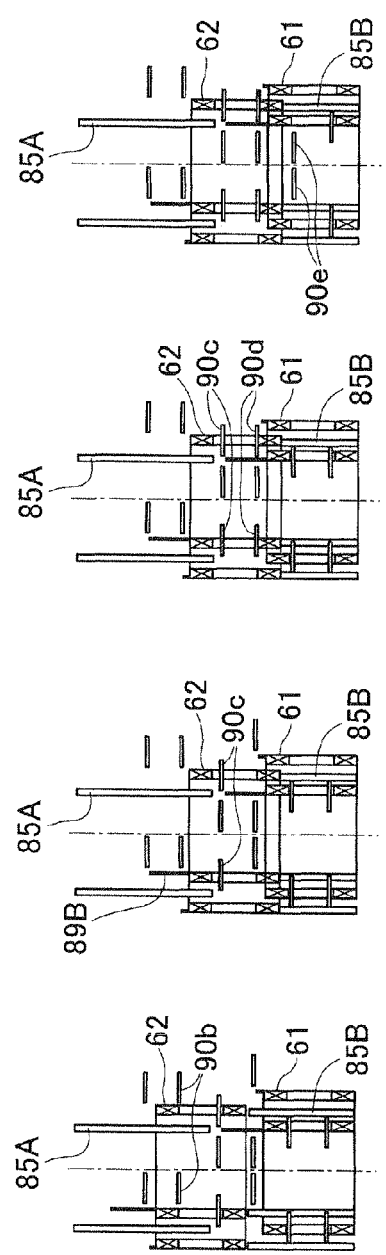
Figure 26G:
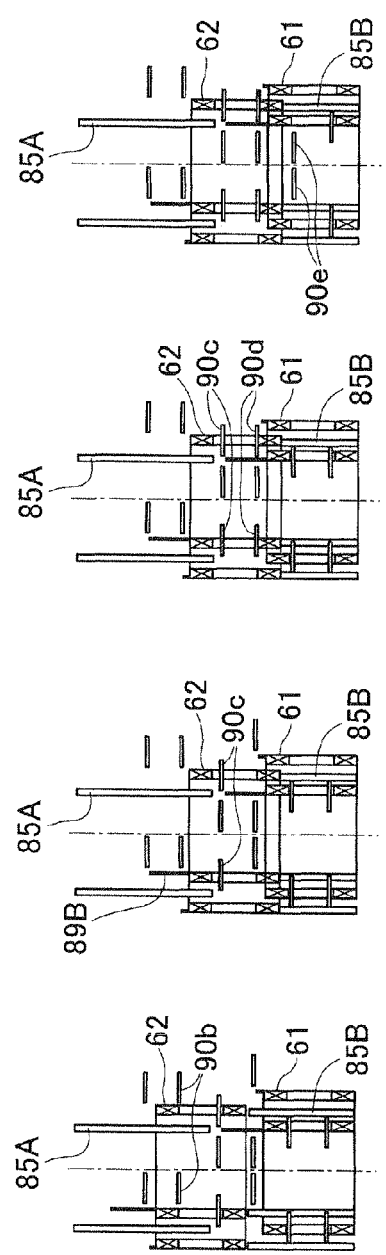
Figure 26F:
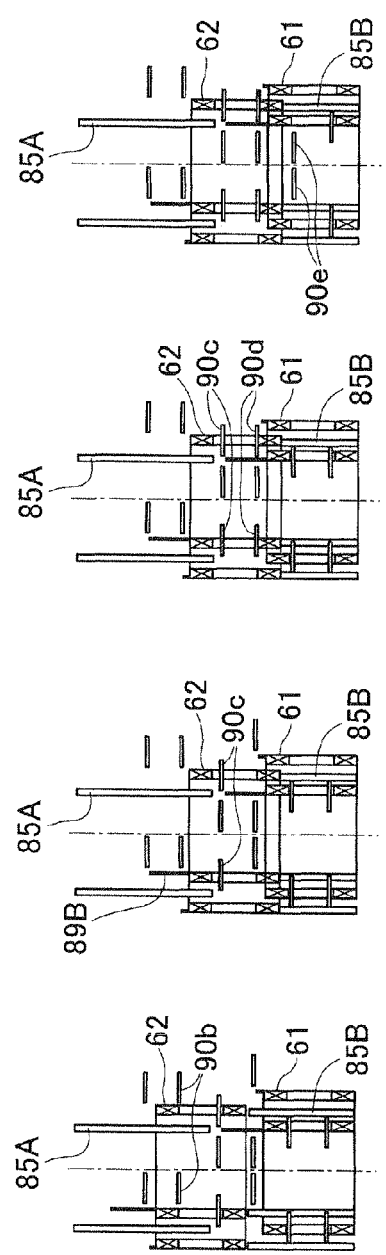
Figure 26E:
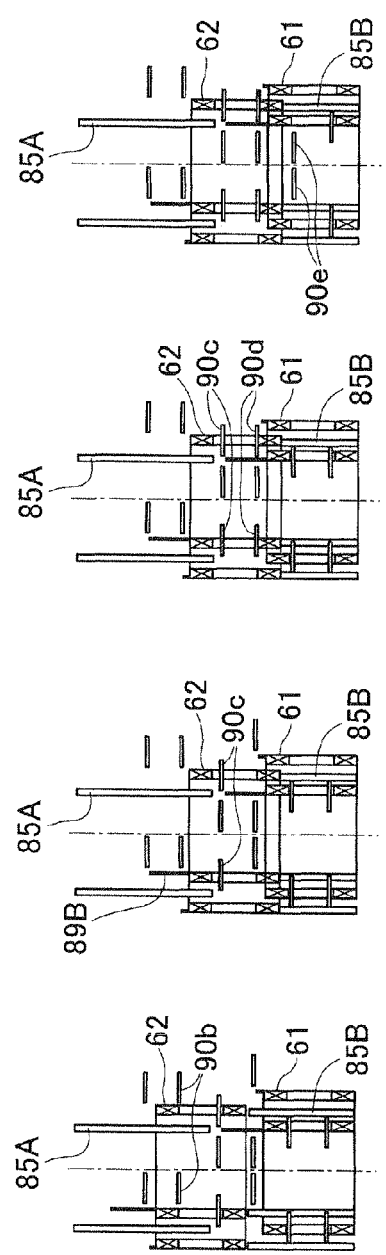

Then, as shown in FIG. 26E, under control of the second controller, the second positioning members 90b are radially retreated out of the spaces between the corresponding circumferentially-adjacent in-slot portions 51 of the rolled electric wires 50 of the second component 62. Consequently, the second positioning members 90b are disabled from circumferentially positioning the rolled electric wires 50 of the second component 62.

Thereafter, as shown in FIG. 26F, with the rolled electric wires 50 of the second component 62 circumferentially positioned by the third positioning members 90c, the second component 62 is further pressed downward by the second pressing member 89B, thereby being further moved downward by the predetermined distance. Consequently, a further part of the second component 62 is extruded from the first volute jig 85A, displacing the second volute jig 85B further downward by the predetermined distance. As a result, a lower end part of the second component 62 is brought into radial overlap with the first component 61, rendering the first and second components 61 and 62 partially assembled with each other.

Next, as shown in FIG. 26G, under control of the second controller, the fourth positioning members 90d are radially advanced into the spaces between the corresponding circumferentially-adjacent in-slot portions 51 of the rolled electric wires 50 of the second component 62. Consequently, the rolled electric wires 50 of the second component 62 are circumferentially positioned by both the third positioning members 90c and the fourth positioning members 90d.

Then, as shown in FIG. 26H, under control of the second controller, the fifth positioning members 90e are radially retreated out of the spaces between the corresponding circumferentially-adjacent in-slot portions 51 of the rolled electric wires 50 of the first component 61. Consequently, the fifth positioning members 90e are disabled from circumferentially positioning the rolled electric wires 50 of the first component 61.

Further, as shown in FIG. 27A, under control of the second controller, the third positioning members 90c are radially retreated out of the spaces between the corresponding circumferentially-adjacent in-slot portions 51 of the rolled electric wires 50 of the second component 62. Consequently, the third positioning members 90c are disabled from circumferentially positioning the rolled electric wires 50 of the second component 62.

Thereafter, as shown in FIG. 27B, with the rolled electric wires 50 of the second component 62 circumferentially positioned by the fourth positioning members 90d, the second component 62 is further pressed downward by the second pressing member 89B, thereby being further moved downward by the predetermined distance. Consequently, all the part of the second component 62 having remained in the first volute jig 85A is extruded from the first volute jig 85A, displacing the second volute jig 85B further downward by the predetermined distance. As a result, a further part of the second component 62 is brought into radial overlap with the first component 61, increasing the axial range in which the first and second components 61 and 62 assembled with each other.

Next, as shown in FIG. 27C, under control of the second controller, the fifth positioning members 90e are radially advanced into the spaces between the corresponding circumferentially-adjacent in-slot portions 51 of the rolled electric wires 50 of the second component 62 as well as into the spaces between the corresponding circumferentially-adjacent in-slot portions 51 of the rolled electric wires 50 of the first component 61. Consequently, the rolled electric wires 50 of the second component 62 are circumferentially positioned by both the fourth positioning members 90d and the fifth positioning members 90e, while the rolled electric wires 50 of the first component 61 are circumferentially positioned by both the fifth positioning members 90e and the sixth positioning members 90f.

Then, as shown in FIG. 27D, under control of the second controller, the fourth positioning members 90d are radially retreated out of the spaces between the corresponding circumferentially-adjacent in-slot portions 51 of the rolled electric wires 50 of the second component 62; the sixth positioning members 90f are radially retreated out of the spaces between the corresponding circumferentially-adjacent in-slot portions 51 of the rolled electric wires 50 of the first component 61. Consequently, the fourth positioning members 90d are disabled from circumferentially positioning the rolled electric wires 50 of the second component 62; the sixth positioning members 90f are disabled from circumferentially positioning the rolled electric wires 50 of the first component 61.

Thereafter, as shown in FIG. 27E, with the rolled electric wires 50 of both the first and second components 61 and 62 circumferentially positioned by the fifth positioning members 90e, the second component 62 is further pressed downward by the second pressing member 89B, thereby being further moved downward by the predetermined distance to the lower end of the first component 61. Consequently, the second volute jig 85B is further displaced by the second component 62 downward by the predetermined distance, thereby being completely detached from the first component 61. As a result, the first and second components 61 and 62 are brought into radial overlap with each other for the entire axial length thereof.

Next, as shown in FIG. 27F, under control of the second controller, the sixth positioning members 90f are radially advanced into the spaces between the corresponding circumferentially-adjacent in-slot portions 51 of the rolled electric wires 50 of the second component 62 as well as into the spaces between the corresponding circumferentially-adjacent in-slot portions 51 of the rolled electric wires 50 of the first component 61. Consequently, all the rolled electric wires 50 of the first and second components 61 and 62 are circumferentially positioned by the fifth and sixth positioning members 90e and 90f. Then, the fourth stage (see FIG. 23D) of the assembly process is completed.

As a result, as shown in FIG. 23D, the first and second components 61 and 62, each of which is made up of one of the third electric wire sub-assemblies 63 and thus includes sixth rolled electric wires 50, are completely assembled together, forming the fourth electric wire sub-assembly 63 that is comprised of 12 rolled electric wires 50.

In the assembly process 103 of the method according to the present embodiment, by sequentially performing all the first-level to the sixth-level assembly processes in the same manner as the above-described fourth-level assembly process, the final electric wire assembly 64 as shown in FIG. 28 is finally obtained which includes all the 48 rolled electric wires 50.

After the assembly step 103, the corresponding pairs of the lead portions 53a and 53b of the electric wires 50 included in the final electric wire assembly 64 are joined by, for example, welding. As a result, the stator coil 40 as shown in FIGS. 6-9 is obtained.

The above-described method of manufacturing the stator coil 40 according to the present embodiment has the following advantages.

In the present embodiment, the method of manufacturing the stator coil 40 includes the electric wire forming step 101, the electric wire rolling step 102 and the assembly step 103. In the electric wire forming step 101, the substantially planar, wave-shaped electric wires 50 as shown in FIGS. 11A-11B are formed by shaping the electric wire materials 50a. Each of the planar electric wires 50 includes the in-slot portions 51 and the turn portions 52. Each of the in-slot portions 51 is to be received in a corresponding one of the slots 31 of the stator core 30. Each of the turn portions 52 connects one adjacent pair of the in-slot portions 51 and is to be located outside of the slots 31 of the stator core 30. In the electric wire rolling step 102, each of the planar electric wires 50 is rolled by 11/8 turns into the spiral shape as shown in FIGS. 20-21 by plastically deforming each of the turn portions 52 of the electric wire 50 into an arc shape. In the assembly step 103, the rolled electric wires 50 are assembled through relative axial movements therebetween to form the final electric wire assembly 64 as shown in FIG. 28 which makes up the stator coil 40 as shown in FIGS. 6-9. Each of the relative axial movements is made by axially moving the first and second components 61 and 62 relative to each other with both the first and second components 61 and 62 radially elastically deformed and with each of the first and second components 61 and 62 circumferentially positioned by the positioning members 90. Each of the first and second components 61 and 62 is made up of either one of the rolled electric wires 50 or an electric wire sub-assembly 63 that is comprised of a plurality of the rolled electric wires 50.

With the above method, since each of the electric wires 50 is rolled through plastic deformation of the turn portions 52 in the electric wire rolling step 102, no spring back of the electric wires 50 will occur after the step 102. Consequently, it is possible to reliably prevent radial misalignment between the corresponding in-slot portions 51 of the electric wires 50 from occurring in the resultant stator coil 40, thereby reliably keeping the hollow cylindrical shape of the stator coil 40.

Moreover, compared to the method disclosed in Japanese Patent Application Publication No. 2001-145286, it is possible to shorten the length of each of the electric wires 50. Consequently, the electric wires 50 can be shaped using a smaller-scale shaping machine and be more easily handled during the manufacture of the stator coil 40. As a result, it is possible to achieve a higher productivity and a lower cost of the stator coil 40.

Further, since each of the relative axial movements in the assembly step 103 is made with both the first and second components 61 and 62 radially elastically deformed, it is possible to prevent interference between the first and second components 61 and 62 from occurring during the relative axial movement. Consequently, without interference therebetween, the first and second components 61 and 62 can be smoothly moved relative to each other, thereby facilitating the assembly of the first and second components 61 and 62. Moreover, the insulating coats 68 of the electric wires 50 of the first and second components 61 and 62 can be reliably prevented from being damaged due to interference between the first and second components 61 and 62.

Furthermore, since each of the relative axial movements in the assembly step 103 is made with each of the first and second components 61 and 62 circumferentially positioned by the positioning members 90, it is possible to more reliably ensure that those corresponding in-slot portions 51 of the rolled electric wires 50 of the first and second components 61 and 62 which are to be received in the same slot 31 of the stator core 30 be accurately radially aligned with each other. As a result, with the accurately radially-aligned corresponding in-slot portions 51 of the electric wires 50, it is possible to more easily and accurately assemble the stator core 30 to the resultant stator coil 40.

In the present embodiment, the positioning members 90 include those positioning members 90a-90f which are located at the same circumferential position but different axial positions from each other. Moreover, those positioning members 90a-90f are configured to be radially advanced into and retreated out of the first and second components 61 and 62. Further, during the relative axial movement between the first and second components 61 and 62, each of the first and second components 61 and 62 is always in a state of being circumferentially positioned by at least one of the positioning members 90a-90f.

With the above configuration, it is possible to circumferentially position each of the first and second components 61 and 62 at any given time during the relative axial movement therebetween. Moreover, since the positioning members 90a-90f are configured to be radially advanced into and retreated out of the first and second components 61 and 62, the direction of movement of the positioning members 90a-90f is perpendicular to that of the first and second components 61 and 62. Therefore, it is possible to accurately mount the positioning members 90a-90f on the same stationary base but separately from the first and second volute jigs 85A and 85B. Consequently, it is possible for the second controller to accurately control the radial advancing and retreating of the positioning members 90a-90f without being influenced by operation of the first and second volute jigs 85A and 85B and by the axial movement of the first and second components 61 and 62.

In the present embodiment, the first and second components 61 and 62 are radially elastically deformed by the first and second volute jigs 85A and 85B. Each of the first and second volute jigs 85A and 85B has its radially-facing pairs of the interior surfaces between which one of the first and second components 61 and 62 is inserted. Further, each of the first and second components 61 and 62 is circumferentially positioned by the positioning members 90 in a state of being radially elastically deformed by one of the first and second volute jigs 85A and 85B.

Consequently, with the first and second components 61 and 62 constrained between the radially-facing pairs of the interior surfaces of the first and second volute jigs 85A and 85B, it is possible to more accurately position the first and second components 61 and 62 by the positioning members 90.

In the present embodiment, the second volute jig 85B has a radial thickness that is set to be greater than or equal to (n+1) times the radial thickness of the rolled electric wires 50, where n is the number of layers in which the rolled electric wires 50 of the second component 2 are radially stacked.

Setting the radial thickness of the second volute jig 85B (i.e., the radial thickness of a wall portion of the second volute jig 85B) as above, though there are the crank-shaped parts 54 formed in the turn portions 52 of the electric wires 50, it is still possible to smoothly axially move the second component 62 into the first component 61, thereby displacing the second volute jig 85B. As a result, it is possible to easily assemble the first and second components 61 and 62 without interference between the turn portions 52 of the electric wires 50 of the first and second components 61 and 62.

In addition, to more reliably prevent interference between the turn portions 52 of the electric wires 50 during the assembly of the first and second components 61 and 62, it is preferable that the radial thickness of the second volute jig 85B is greater than or equal to (n+2) times the radial thickness of the rolled electric wires 50.

In the present embodiment, in the electric wire forming step 101, for each of the turn portions 52 of the electric wires 50, the crank-shaped part 54 is formed substantially at the center of the turn portion 52 to radially offset (or to shift the radial position of) the turn portion 52.

However, as described above, even with the crank-shaped parts 54 formed in the turn portions 52, it is still possible to assemble the first and second components 61 and 62 without interference between the turn portions 52 of the electric wires 50 of the first and second components 61 and 62 by axially moving the first and second components 61 and 62 relative to each other with both the first and second components 61 and 62 radially elastically deformed.

[Second Embodiment]

This embodiment illustrates a method of manufacturing the stator coil 40 which is similar to the method according to the first embodiment; accordingly, only the differences therebetween will be described hereinafter.

In the first embodiment, the first to the sixth positioning members 90a-90f are used in the assembly step 103. The first and second positioning members 90a and 90b are axially located on the side of the first volute jig 85A, while the third to the sixth positioning members 90c-90f are axially located on the side of the second volute jig 85B. Each of the first and second volute jigs 85A and 85B has the windows 86 formed therein. All the first to the sixth positioning members 90a-90f are configured to be radially advanced and retreated without moving in the axial direction.

In comparison, in the present embodiment, referring to FIGS. 29A-29D, only the first to the third positioning members 90a-90c are used in the assembly step 103. The first positioning members 90a are axially located on the side of the first volute jig 85A, while the second and third positioning members 90b and 90c are axially located on the side of the second volute jig 85B. The first volute jig 85A has no windows 86 formed therein, whereas the second volute jig 85B has the windows 86 formed therein. Moreover, the first positioning members 90a are configured to be radially advanced and retreated and be axially moved along with the second component 62. On the other hand, both the second and third positioning members 90b and 90c are configured to be radially advanced and retreated without moving in the axial direction. In addition, all the first positioning members 90a are located at the same axial position but circumferentially spaced from one another. The second positioning members 90b are axially spaced from the third positioning members 90c by a predetermined distance. Each of the second and third positioning members 90b and 90c is located at one of the four circumferential positions where the windows 86 of the second volute jig 85B are formed.

It should be noted that in each of FIGS. 29A-29D, the vertical direction represents the axial direction of the first and second volute jigs 85A and 85B (or the axial direction of the first and second components 61 and 62) and the horizontal direction represents a radial direction of the first and second volute jigs 85A and 85B (or a radial direction of the first and second components 61 and 62). Accordingly, the circumferential direction of the first and second volute jigs 85A and 85B (or the circumferential direction of the first and second components 61 and 62) is perpendicular to the paper surface of each of FIGS. 29A-29D. Moreover, it also should be noted that for the sake of simplicity, only part of the first and second volute jigs 85A and 85B and only part of the first and second components 61 and 62 are shown in each of FIGS. 29A-29D.

Specifically, in the present embodiment, referring to FIG. 29A, in the third stage of an assembly process in the assembly step 103, the second component 62 is inserted into the spaces between the radially-facing pairs of the interior surfaces of the first volute jig 85A, thereby being mounted to the first volute jig 85A. In addition, the first component 61 has been previously mounted to the second volute jig 85B in the second stage of the assembly process.

Further, under control of the first controller, the first volute jig 85A is enlarged overall in diameter so as to have a predetermined radial size and adjusted to have an opposite circumferential phase to the second volute jig 85B. In other words, the difference in circumferential phase between the first and second volute jigs 85A and 85B is equal to 180°. Thus, the first volute jig 85A does not overlap the second volute jig 85B in the axial direction of the first and second volute jigs 85A and 85B that are coaxial with each other. Consequently, with the enlargement in diameter of the first volute jig 85A, the second component 62 mounted to the first volute jig 85A is also enlarged overall in diameter to have a predetermined radial size. Moreover, with the difference in circumferential phase between the first and second volute jigs 85A and 85B equal to 180°, the second component 62 overlaps the second volute jig 85B in the axial direction.

Then, under control of the second controller, the third positioning members 90c are radially advanced into the spaces between the corresponding circumferentially-adjacent in-slot portions 51 of the rolled electric wires 50 of the first component 61, thereby circumferentially positioning the rolled electric wires 50 of the first component 61. In addition, the first component 61 is pressed downward by the first pressing member 89A, thereby being axially positioned.

Thereafter, under control of the second controller, the first positioning members 90a are radially advanced into the spaces between the corresponding circumferentially-adjacent in-slot portions 51 of the rolled electric wires 50 of the second component 62, thereby circumferentially positioning the rolled electric wires 50 of the second component 62.

In addition, though not shown in FIGS. 29A-29D in detail for the sake of simplicity, in circumferential positioning the respective rolled electric wires 50, the first positioning members 90a are pressed against the radially innermost or outermost wall portion of the first volute jig 85A, whereas the second and third positioning members 90b and 90c are inserted through the windows 86 of the second volute jig 85B.

Referring to FIG. 29B, in the fourth stage of the assembly process, with the rolled electric wires 50 of the second component 62 circumferentially positioned by the first positioning members 90a, the second component 62 is pressed downward by the second pressing member 89B, thereby being moved downward. At the same time, under control of the second controller, the first positioning members 90a are also moved downward along with the second component 62. Consequently, the second component 62 is partially extruded from the first volute jig 85A, displacing the second volute jig 85B downward.

Next, as shown in FIG. 29C, when the second component 62 has been moved downward to reach a predetermined axial position, the second controller controls the second positioning members 90b so as to radially advance them into the spaces between the corresponding circumferentially-adjacent in-slot portions 51 of the rolled electric wires 50 of the second component 62 as well as into the spaces between the corresponding circumferentially-adjacent in-slot portions 51 of the rolled electric wires 50 of the first component 61. In addition, at the predetermined axial position, the lower turn portions 52 of the rolled electric wires 50 of the second component 62 have been moved downward below the second positioning members 90b and the first and second components 61 and 62 radially overlap each other for about half the axial length of the first and second components 61 and 62.

Consequently, the rolled electric wires 50 of the second component 62 are circumferentially positioned by both the first positioning members 90a and the second positioning members 90b, while the rolled electric wires 50 of the first component 61 are circumferentially positioned by both the second positioning members 90b and the third positioning members 90c.

Then, though not shown in the figures, under control of the second controller, the third positioning members 90c are radially retreated out of the spaces between the corresponding circumferentially-adjacent in-slot portions 51 of the rolled electric wires 50 of the first component 61. Consequently, the third positioning members 90c are disabled from circumferentially positioning the rolled electric wires 50 of the first component 61.

Next, as shown in FIG. 29D, under control of the second controller, the first positioning members 90a are radially retreated out of the spaces between the corresponding circumferentially-adjacent in-slot portions 51 of the rolled electric wires 50 of the second component 62. Consequently, the first positioning members 90a are disabled from circumferentially positioning the rolled electric wires 50 of the second component 62.

Then, with the rolled electric wires 50 of both the first and second components 61 and 62 circumferentially positioned by the second positioning members 90b, the second component 62 is further pressed downward by the second pressing member 89B, thereby being moved downward to the lower end of the first component 61. Consequently, the second volute jig 85B is further displaced downward by the second component 62, thereby being completely detached from the first component 61. As a result, the first and second components 61 and 62 are brought into radial overlap with each other for the entire axial length thereof.

Thereafter, under control of the second controller, the third positioning members 90c are radially advanced into the spaces between the corresponding circumferentially-adjacent in-slot portions 51 of the rolled electric wires 50 of the second component 62 as well as into the spaces between the corresponding circumferentially-adjacent in-slot portions 51 of the rolled electric wires 50 of the first component 61. Consequently, all the rolled electric wires 50 of the first and second components 61 and 62 are circumferentially positioned by the second and third positioning members 90b and 90c. Then, the fourth stage of the assembly process is completed.

The above-described method according to the present embodiment has the same advantages as the method according to the first embodiment.

In addition, in the assembly step 103 of the method according to the present embodiment, during each of the assembly processes, the first positioning members 90a circumferentially positioning the second component 62 are axially moved along with the second component 62 to the first component 61. Consequently, it is possible to shorten the cycle time of the assembly processes, thereby improving the productivity of the stator coil 40. Moreover, it is also possible to reduce the number of the positioning members 90 necessary for the assembly processes, thereby lowering the manufacturing cost of the stator coil 40.

[Third Embodiment]

This embodiment illustrates a method of manufacturing the stator coil 40 which is similar to the method according to the first embodiment; accordingly, only the differences therebetween will be described hereinafter.

In the first embodiment, the first and second volute jigs 85A and 85B are used to respectively radially elastically deform the first and second components 61 and 62 during each of the assembly processes in the assembly step 103 (see FIGS. 22A-22B).

In comparison, in the present embodiment, first and second sets of rotatable plates are used to respectively radially elastically deform the first and second components 61 and 62 during each of the assembly processes in the assembly step 103.

Figure 30A:
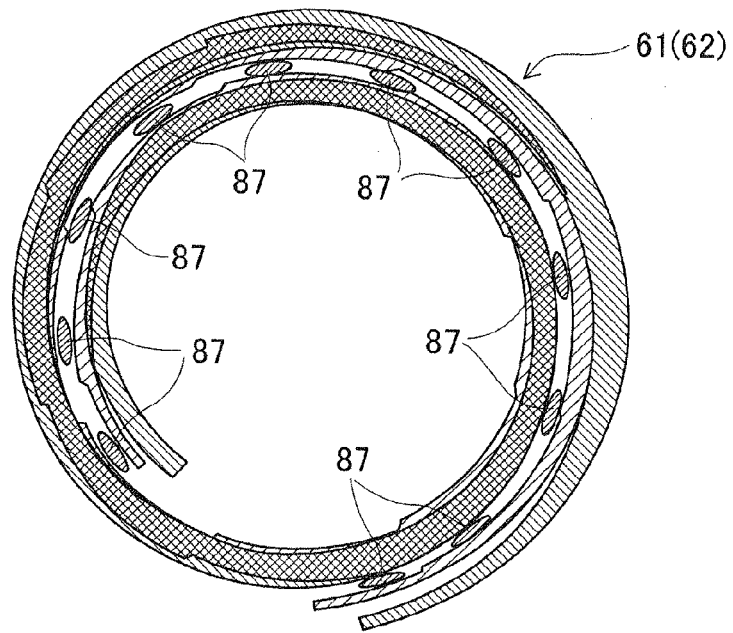
FIG. 30A is a schematic view showing a set of rotatable plates used in the assembly step of a method according to a third embodiment, wherein the set of rotatable plates are in a standby mode.
Figure 30B:
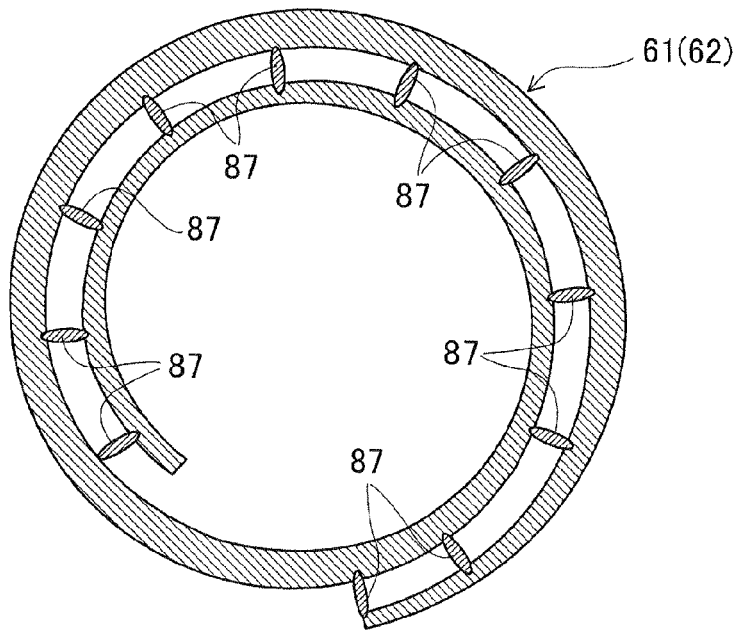
FIG. 30B is a schematic view illustrating the set of rotatable plates in a deforming mode.

Specifically, as shown in FIGS. 30A-30B, each of the first and second rotatable plate sets consists of a plurality (e.g., 11 in the present embodiment) of rotatable plates 87 that are spirally arranged. Each of the rotatable plates 87 has a substantially elliptical cross section perpendicular to its longitudinal direction (i.e., the direction perpendicular to the paper surface of FIGS. 30A-30B). The rotatable plates 87 have the centers of their respective elliptical cross-sections arranged at predetermined intervals along a spiral imaginary line that conforms to the spiral shape of the rolled electric wires 50 of the component. Further, all the rotatable plates 87 are disposed within the spirally-extending space formed between different turns of the component with their respective longitudinal directions parallel to the axial direction of the component. Furthermore, under control of a third controller (not shown), each of the rotatable plates 87 is rotatable about a rotation axis thereof by 90° in both clockwise and counterclockwise directions.

As shown in FIG. 30A, in a standby mode (i.e., before being put into operation to radially elastically deform the component), each of the rotatable plates 87 is oriented so that the major axis of the elliptical cross-section of the rotatable plate 87 is perpendicular to a radial direction of the component. On the other hand, as shown in FIG. 30B, in a deforming mode (i.e., after being put into operation to radially elastically deform the component), each of the rotatable plates 87 is oriented so that the major axis of the elliptical cross-section of the rotatable plate 87 extends in the radial direction of the component. That is, to shift each of the rotatable plates 87 between its standby and deforming modes, it is necessary to rotate the rotatable plate 87 about its rotation axis by 90°.

In addition, for each of the rotatable plates 87, the rotation axis of the rotatable plate 87 is not necessarily positioned at the center of the major axis of the elliptical cross section of the rotatable plate 87. In other words, the rotation axis of the rotatable plate 87 may be suitably positioned on the major axis of the elliptical cross section of the rotatable plate 87 based on the necessary amounts of radially elastically deforming the component. Moreover, the length of the major axis of the elliptical cross section of the rotatable plate 87 may also be suitably set based on the location of the rotatable plate 87, the size of the component and the number of the rolled electric wires 50 included in the component.

In the present embodiment, in performing each of the assembly processes in the assembly step 103, the first component 61 is first mounted to the first set of the rotatable plates 87 so that the rotatable plates 87 are interposed between different turns of the first component 61. In addition, at this stage, the rotatable plates 87 are in the standby mode as shown in FIG. 30A.

Then, under control of the third controller, each of the rotatable plates 87 is rotated, for example clockwise, by 90°, thereby entering the deforming mode as shown in FIG. 30B. In the deforming mode, each of the rotatable plates 87 presses radially outward an outer turn of the first component 61 which is positioned radially outside of the rotatable plate 87 while pressing radially inward an inner turn of the first component 61 which is positioned radially inside of the rotatable plate 87. Consequently, the outer turn of the first component 61 is elastically deformed and thereby enlarged in diameter, while the inner turn of the first component 61 is elastically deformed and thereby reduced in diameter.

Next, in the same manner as described above, the second component 62 is mounted to and radially elastically deformed by the second set of the rotatable plates 87.

Thereafter, the first and second components 61 and 62 that are radially elastically deformed respectively by the first and second sets of the rotatable plates 87 are moved relative to each other, thereby being assembled together.

In addition, though not shown in the figures, the relative axial movement between the first and second components 61 and 62 is made with each of the first and second components 61 and 62 circumferentially positioned by at least one positioning member in a similar manner to those described in the first and second embodiments.

The above-described method according to the present embodiment has the same advantages as the method according to the first embodiment.

Further, in the assembly step 103 of the method according to the present embodiment, the first and second components 61 and 62 are radially elastically deformed respectively by the first and second sets of the rotatable plates 87. Consequently, it is possible to easily set the amounts of radial elastic deformation of the first and second components 61 and 62 to desired values, thereby obtaining desired shapes of the first and second components 61 and 62.

Furthermore, for each of the first and second components 61 and 62, the outer turn of the component is enlarged in diameter at the same time as the inner turn of the component is reduced in diameter. Consequently, it is possible to more accurately radially align those corresponding in-slot portions 51 of the rolled electric wires 50 of the first and second components 61 and 62 which are to be received in the same slot 31 of the stator core 30, without performing an additional step of radially aligning the corresponding in-slot portions 51.

Hereinafter, the advantage of the method according to the present embodiment in radially aligning the corresponding in-slot portions 51 of the rolled electric wires 50 over the method according to the first embodiment will be described in detail by taking the six-level assembly process as an example.

As described previously in the first embodiment, in the sixth-level assembly process, the first and second components 61 and 62 each of which is comprised of 24 rolled electric wires 50 are assembled together to form the final electric wire assembly 64 as shown in FIG. 28 which is comprised of all the 48 rolled electric wires 50.

FIG. 31 illustrates the final electric wire assembly 64 which is obtained by the method according to the first embodiment. FIG. 32 illustrates the final electric wire assembly 64 which is obtained by the method according to the third embodiment.

In addition, all the 48 rolled electric wires 50 that together make up the final electric wire assembly 64 are divided into first to eighth groups each consisting of six rolled electric wires 50. The first to the fourth groups of the rolled electric wires 50 are included in the first component 61, while the fifth to the eighth groups of the rolled electric wires 50 are included in the second component 62. In each of FIGS. 31 and 32, the positions of the in-slot portions 51 of the rolled electric wires 50 of the same group are denoted by the same symbol.

As shown in FIG. 31, with the method according to the first embodiment, for each of the rolled electric wires 50 of the first and second components 61 and 62, the radius of a radially-outer end portion of the rolled electric wire 50 is increased without changing the radius of a radially-inner end portion of the rolled electric wire 50 during the radial elastic deformation of the first and second components 61 and 62. Consequently, in the resultant final electric wire assembly 64, those corresponding in-slot portions 51 of the rolled electric wires 50 of the first and second components 61 and 62 which are to be received in the same slot 31 of the stator core 30 may be out of radial alignment with each other as indicated with two bold solid lines in FIG. 31. In this case, it would be necessary to perform, after the assembly step 103, an additional step of radially aligning the corresponding in-slot portions 51 of the rolled electric wires 50 of the first and second components 51 and 52.

In comparison, as shown in FIG. 32, with the method according to the present embodiment, for each of the rolled electric wires 50 of the first and second components 61 and 62, the radius of the radially-outer end portion of the rolled electric wire 50 is increased at the same time as the radius of the radially-inner end portion of the rolled electric wire 50 is decreased during the radial elastic deformation of the first and second components 61 and 62. Consequently, in the resultant final electric wire assembly 64, those corresponding in-slot portions 51 of the rolled electric wires 50 of the first and second components 61 and 62 which are to be received in the same slot 31 of the stator core 30 are almost in radial alignment with each other as indicated with six bold solid lines in FIG. 32. As a result, it is unnecessary to perform, after the assembly step 103, an additional step of radially aligning the corresponding in-slot portions 51 of the rolled electric wires 50 of the first and second components 51 and 52.

[Fourth Embodiment]

This embodiment illustrates a method of manufacturing the stator coil 40 which is similar to the method according to the first embodiment; accordingly, only the differences therebetween will be described hereinafter.

In the first embodiment, the first and second volute jigs 85A and 85B are used to respectively radially elastically deform the first and second components 61 and 62 during each of the assembly processes in the assembly step 103 (see FIGS. 22A-22B).

In comparison, in the present embodiment, first and second sets of movable plates are used to respectively radially elastically deform the first and second components 61 and 62 during each of the assembly processes in the assembly step 103.

Figure 33:
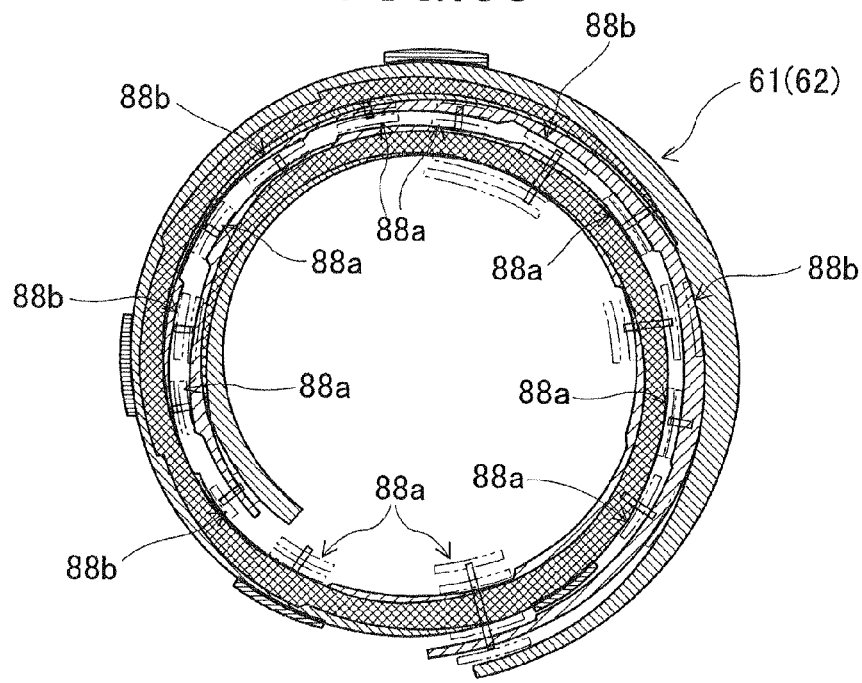
FIG. 33 is a schematic view showing a set of movable plates used in the assembly step of a method according to a fourth embodiment.

Specifically, as shown in FIG. 33, each of the first and second movable plate sets consists of a plurality of first movable plates 88a and a plurality of second movable plates 88b. Each of the first and second movable plates 88a and 88b has a cross section that is perpendicular to a longitudinal direction of the movable plate (i.e., the direction perpendicular to the paper surface of FIG. 33) and has the shape of a rectangle bent radially outward. All the first and second movable plates 88a and 88b are disposed within the spirally-extending space formed between different turns of the component with their respective longitudinal directions parallel to the axial direction of the rolled electric wires 50. Moreover, the first movable plates 88a are configured to press an outer turn (more specifically, approximately one turn positioned on the radially outer side) of the component radially outward, thereby radially elastically deforming the component; the second movable plates 88b are configured to press an inner turn (more specifically, ¾ turn positioned on the radially inner side) of the component radially inward, thereby radially elastically deforming the component.

More specifically, under control of a fourth controller (not shown), each of the first movable plates 88a is movable both radially outward and radially inward. In a standby mode (i.e., before being put into operation to radially elastically deform the component), each of the first movable plates 88a is positioned on the radially inner side in the spirally-extending space formed between different turns of the component. Moreover, in a deforming mode (i.e., after being put into operation to radially elastically deform the component), each of the first movable plates 88a is advanced radially outward to press the outer tern of the component radially outward, thereby elastically deforming the component.

On the other hand, under control of the fourth controller, each of the second movable plates 88b is movable both radially inward and radially outward. In a standby mode, each of the second movable plates 88b is positioned on the radially outer side in the spirally-extending space formed between different turns of the component. Moreover, in a deforming mode, each of the second movable plates 88b is advanced radially inward to press the inner tern of the component radially inward, thereby elastically deforming the component.

It should be noted that in FIG. 33, each of the first and second movable plates 88a and 88b is depicted as being in its standby mode.

In the present embodiment, in performing each of the assembly processes in the assembly step 103, the first component 61 is first mounted to the first set of the movable plates 88a and 88b so that the movable plates 88a and 88b are interposed between different turns of the first component 61. In addition, at this stage, each of the movable plates 88a and 88b is in its standby mode as shown in FIG. 33.

Then, under control of the fourth controller, each of the first movable plates 88a enters its deforming mode, in which the first movable plate 88a is advanced radially outward to press the outer tern of the first component 61 radially outward. At the same time, each of the second movable plates 88b also enters its deforming mode, in which the second movable plate 88b is advanced radially inward to press the inner tern of the first component 61 radially inward. Consequently, the outer turn of the first component 61 is elastically deformed and thereby enlarged in diameter, while the inner turn of the first component 61 is elastically deformed and thereby reduced in diameter.

Next, in the same manner as described above, the second component 62 is mounted to and radially elastically deformed by the second set of the movable plates 88a and 88b.

Thereafter, the first and second components 61 and 62 that are radially elastically deformed respectively by the first and second sets of the movable plates 88a and 88b are moved relative to each other, thereby being assembled together.

In addition, though not shown in the figures, the relative axial movement between the first and second components 61 and 62 is made with each of the first and second components 61 and 62 circumferentially positioned by at least one positioning member in a similar manner to those described in the first and second embodiments.

The above-described method according to the present embodiment has the same advantages as the method according to the first embodiment.

In addition, in the assembly step 103 of the method according to the present embodiment, the first and second components 61 and 62 are radially elastically deformed respectively by the first and second sets of the movable plates 88a and 88b. Consequently, it is possible to easily set the amounts of radial elastic deformation of the first and second components 61 and 62 to desired values, thereby obtaining desired shapes of the first and second components 61 and 62.

Furthermore, for each of the first and second components 61 and 62, the outer turn of the component is enlarged in diameter by the first movable plates 88a while the inner turn of the component is reduced in diameter by the second movable plates 88b. Consequently, it is possible to more accurately radially align those corresponding in-slot portions 51 of the rolled electric wires 50 of the first and second components 61 and 62 which are to be received in the same slot 31 of the stator core 30, without performing an additional step of radially aligning the corresponding in-slot portions 51.

Figure 34:
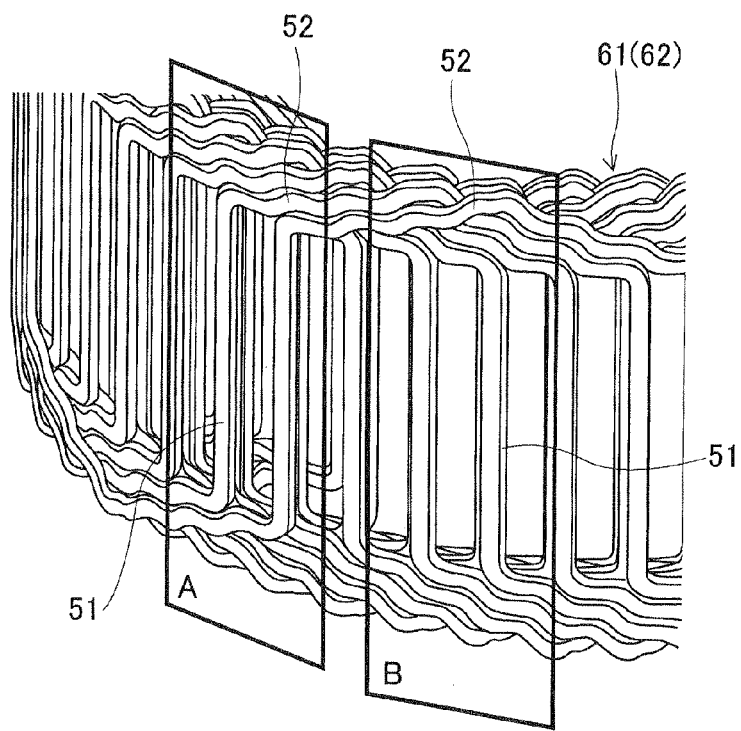
FIG. 34 is a schematic view illustrating a preferable arrangement of the set of movable plates.

In addition, referring to FIG. 34, for each of the first and second components 61 and 62, it is preferable to arrange each of the movable plates 88a and 88b at a circumferential position where there is no layer change in the rolled electric wires 50 of the component. More specifically, in the area A which is enclosed with a bold solid line in FIG. 34, there is no layer change in the rolled electric wires 50 of the component and thus each of the in-slot portions 51 is located on the same layer as an adjacent one of the turn portions 52. Therefore, arranging each of the movable plates 88a and 88b in such an area A, it is possible to more reliably radially elastically deform the rolled electric wires 50. In comparison, in the area B which is enclosed with a bold solid line in FIG. 34, there are layer changes in the rolled electric wires 50 of the component and thus each of the in-slot portions 51 is located on a different layer from an adjacent one of the turn portions 52. Therefore, if each of the movable plates 88a and 88b was arranged in such an area B, it would be difficult to reliably radially elastically deform the rolled electric wires 50.

While the above particular embodiments have been shown and described, it will be understood by those skilled in the art that various modifications, changes, and improvements may be made without departing from the spirit of the invention.

For example, in the first embodiment, the crank-shaped part 54 is formed in each of the turn portions 52 of the electric wires 50 in the electric wire forming step 101. However, it is also possible to form the crank-shaped part 54 in each of the turn portions 52 of the electric wires 50 during the plastic deformation of the turn portions 52 in the electric wire rolling step 102.

In the third embodiment, the first and second components 61 and 62 are radially elastically deformed respectively by the first and second sets of the rotatable plates 87. However, it is also possible to radially elastically deform only one of the first and second components 61 and 62 with a set of the rotatable plates 87 while radially elastically deforming the other with a volute jig 85 as described in the first embodiment.

In the fourth embodiment, the first and second components 61 and 62 are radially elastically deformed respectively by the first and second sets of the movable plates 88a and 88b. However, it is also possible to radially elastically deform only one of the first and second components 61 and 62 with a set of the movable plates 88a and 88b while radially elastically deforming the other with a volute jig 85 as described in the first embodiment.

In the first embodiment, in the assembly step 103, the final electric wire assembly 64 is obtained by sequentially performing the 24 first-level assembly processes, the eight second-level assembly processes, the eight third-level assembly processes, the four fourth-level assembly processes, the two fifth-level assembly processes, and the one sixth-level assembly processes. However, it is also possible to obtain the final electric wire assembly 64 in other manners.

For example, the final electric wire assembly 64 may be obtained by assembling the 48 rolled electric wires 50 one by one. More specifically, in this case, the final electric wire assembly 64 is obtained by each time assembling only one rolled electric wire 50 to another rolled electric wire 50 or to an electric wire sub-assembly 63 that is comprised of a plurality of the rolled electric wires 50.

Otherwise, the final electric wire assembly 64 may be obtained by: first assembling the 48 rolled electric wires 50 in pairs to form 24 electric wire sub-assemblies 63 each of which is comprised of two rolled electric wires 50; and then assembling the 24 electric wire sub-assemblies 63 one by one.

Alternatively, the final electric wire assembly 64 may be obtained by: first assembling the 48 rolled electric wires 50 in trios to form 16 electric wire sub-assemblies 63 each of which is comprised of three rolled electric wires 50; and then assembling the 16 electric wire sub-assemblies 63 one by one.

What is claimed is:

1. A method of manufacturing a stator coil for an electric rotating machine, the electric rotating machine including a hollow cylindrical stator core having a plurality of slots that are formed in a radially inner surface of the stator core and spaced in a circumferential direction of the stator core, the method comprising the sequential steps of:

forming a plurality of substantially planar electric wires, each of the planar electric wires including a plurality of in-slot portions to be received in corresponding ones of the slots of the stator core and a plurality of turn portions to be located outside of the slots of the stator core to respectively connect adjacent pairs of the in-slot portions;

rolling each of the planar electric wires by a predetermined number of turns into a spiral shape by plastically deforming each of the turn portions of the electric wire into an arc shape; and assembling the rolled electric wires through relative axial movements therebeween to form a hollow cylindrical electric wire assembly that makes up the stator coil, each of the relative axial movements being made by axially moving first and second components relative to each other with both the first and second components radially elastically deformed and with each of the first and second components circumferentially positioned by at least one positioning member, each of the first and second components being made up of either one of the rolled electric wires or an electric wire sub-assembly that is comprised of a plurality of the rolled electric wires, wherein the at least one positioning member comprises a plurality of positioning member that are configured to be radially advanced into and retreated out of the first and second components and located at the same circumferential position but different axial positions from each other, and during the relative axial movement, each of the first and second components is always in a state of being circumferentially positioned by at least one of the plurality of positioning member.

2. The method as set forth in claim 1, wherein in the assembling step, during each of the relative axial movements, the at least one positioning member circumferentially positioning the second component is axially moved, along with the second component, to the first component.

3. The method as set forth in claim 1, wherein in the assembling step, at least one of the first and second components is radially elastically deformed by a volute jig, the volute jig has at least one radially-facing pair of interior surfaces between which the at least one of the first and second components is inserted, and the at least one of the first and second components is circumferentially positioned in a state of being radially elastically deformed by the volute jig.

4. The method as set forth in claim 3, wherein the first component is inserted in the volute jig and thereby radially elastically deformed by the volute jig, and the volute jig has a radial thickness that is greater than or equal to (n+1) times the radial thickness of the rolled electric wires, where n is the number of layers in which the rolled electric wires of the second component are radially stacked.

5. The method as set forth in claim 1, wherein in the assembling step, at least one of the first and second components is radially elastically deformed by a set of rotatable plates, the rotatable plates are arranged at predetermined intervals in a spirally-extending space formed between different turns of the at least one of the first and second components, and each of the rotatable plates is rotatable about a rotation axis thereof and mounted with the rotation axis parallel to an axial direction of the at least one of the first and second components.

6. The method as set forth in claim 5, wherein each of the rotatable plates has a substantially elliptical cross section perpendicular to its rotation axis, and in the assembling step, each of the rotatable plates is rotated about its rotation axis to have a major axis of the elliptical cross section thereof extending in a radial direction of the at least one of the first and second components, thereby elastically deforming the at least one of the first and second components both radially outward and radially inward.

7. The method as set forth in claim 1, wherein in the assembling step, at least one of the first and second components is radially elastically deformed by a set of movable plates, all the movable plates are disposed within a spirally-extending space formed between different turns of the at least one of the first and second components, and each of the movable plates is movable both radially outward and radially inward.

8. The method as set forth in claim 7, wherein the set of movable plates consists of a plurality of first movable plates and a plurality of second movable plates, the first movable plates are arranged on a radially inner side in the spirally-extending space, and the second movable plates are arranged on a radially outer side in the spirally-extending space, and in the assembling step, each of the first movable plates is advanced radially outward to press and thereby elastically deform the at least one of the first and second components, while each of the second movable plates is advanced radially inward to press and thereby elastically deform the at least one of the first and second components.

9. The method as set forth in claim 1, wherein in the forming step or in the rolling step, a crank-shaped part is formed in each of the turn portions of the electric wires to radially offset the turn portion.

10. A method of manufacturing a stator coil for an electric rotating machine, the electric rotating machine including a hollow cylindrical stator core having a plurality of slots that are formed in a radially inner surface of the stator core and spaced in a circumferential direction of the stator core, the method comprising the sequential steps of:

forming a plurality of substantially planar electric wires, each of the planar electric wires including a plurality of in-slot portions to be received in corresponding ones of the slots of the stator core and a plurality of turn portions to be located outside of the slots of the stator core to respectively connect adjacent pairs of the in-slot portions;

rolling each of the planar electric wires by a predetermined number of turns into a spiral shape by plastically deforming each of the turn portions of the electric wire into an arc shape; and assembling the rolled electric wires through relative axial movements therebeween to form a hollow cylindrical electric wire assembly that makes up the stator coil, each of the relative axial movements being made by axially moving first and second components relative to each other with both the first and second components radially elastically deformed and with each of the first and second components circumferentially positioned by at least one positioning member, each of the first and second components being made up of either one of the rolled electric wires or an electric wire sub-assembly that is comprised of a plurality of the rolled electric wires;

wherein in the assembling step, at least one of the first and second components is radially elastically deformed by a set of movable plates, all the movable plates are disposed within a spirally-extending space formed between different turns of the at least one of the first and second components, and each of the movable plates is movable both radially outward and radially inward.

11. The method as set forth in claim 10, wherein the set of movable plates consists of a plurality of first movable plates and a plurality of second movable plates, the first movable plates are arranged on a radially inner side in the spirally-extending space, and the second movable plates are arranged on a radially outer side in the spirally-extending space, and in the assembling step, each of the first movable plates is advanced radially outward to press and thereby elastically deform the at least one of the first and second components, while each of the second movable plates is advanced radially inward to press and thereby elastically deform the at least one of the first and second components.

* * * * *